United States Patent [19]
Debe et al.

[11] Patent Number: 5,758,097
[45] Date of Patent: *May 26, 1998

[54] SYSTEM FOR VOTING STOCK COMPONENT INTERESTS

[75] Inventors: A. Joseph Debe, Garden City, N.Y.; Peter A. Broms, Glen Ridge, N.J.

[73] Assignee: Americus Stock Process Corp., Wilmington, Del.

[ * ] Notice: The term of this patent shall not extend beyond the expiration date of Pat. No. 5,671,358.

[21] Appl. No.: 467,054

[22] Filed: May 18, 1995

Related U.S. Application Data

[63] Continuation of Ser. No. 109,366, Aug. 19, 1993, abandoned, which is a continuation-in-part of Ser. No. 95,051, Jul. 20, 1993, abandoned, which is a continuation-in-part of Ser. No. 979,068, Nov. 19, 1992, abandoned, which is a continuation-in-part of Ser. No. 945,101, Sep. 15, 1992, abandoned, which is a continuation-in-part of Ser. No. 631,324, Dec. 20, 1990, abandoned.

[51] Int. Cl.$^6$ .............................. G06F 17/60; G06G 7/52
[52] U.S. Cl. .............................. 395/235; 395/212
[58] Field of Search .............................. 364/400, 401, 364/406, 408, 409; 235/386

[56] References Cited

U.S. PATENT DOCUMENTS

| 4,093,276 | 6/1978 | Debe . |
| 4,412,287 | 10/1983 | Braddock . |
| 4,674,044 | 6/1987 | Kalmus et al. . |
| 4,823,265 | 4/1989 | Nelson . |

OTHER PUBLICATIONS

Steinberg, Don, "When Corporate Votes Come Down to the Wire", PC Week, V5, N23, P30, Jun. 7, 1988.

Kulkosky, Victor, "Technology Aids Raiders Who Stalk the Boardroom", Wall Street, Computer Review, V7, N10, P 8(4), Jul., 1990.

Eckerson, Wayne, "Users Enthused About Electronic Meetings", Network World, v9n24, p. 43, Jun. 15, 1992.

Nurmi, Hannu, "Secret Ballot Elections in Computer Networks", Computers & Security, v10n6, pp. 553–560, Oct. 1991.

Sebestyen, Istvan, et al., "Public Videotex—A Democratic Use of New Technology/The Basic Froms of Videotex Systems", Computer World, v17n42, Oct. 1993.

*Primary Examiner*—Gail O. Hayes
*Assistant Examiner*—George Stevens
*Attorney, Agent, or Firm*—Felfe & Lynch

[57] ABSTRACT

A data processing system for processing the voting of partial stock interests via equity components comprising computer means for calculating and storing component factors for equity component interests and vote component factors corresponding to each of said component factors, wherein each said vote component factor is indicative of the right to receive a partial vote attributed to each of said equity component factors, wherein said equity component factors are at least two of: (i) a component interest indicative of the right to receive a partial share of stock equal in value to a stipulated price or a fall share of stock of the company on a predetermined future date, whichever is the lesser value; (ii) a component interest indicative of the right to receive a partial share of stock equal in value to the appreciation, if any, of the share of stock above the stipulated price on the predetermined date; and (iii) a component interest indicative of the right to receive substitute payments equal in amount to dividends declared with respect to a given date which is prior to the predetermined future date and which goes to zero value at the predetermined future date.

8 Claims, 36 Drawing Sheets

SYSTEM FOR VOTING STOCK COMPONENT INTERESTS

This application is a continuation, of application Ser. No. 109,366, filed Aug. 19, 1993, now abandoned which is a continuation-in-part of application Ser. No. 095,051, filed Jul. 20, 1993, now abandoned, which is a continuation-in-part of application Ser. No. 979,068, filed Nov. 19, 1992, now abandoned, which is a continuation-in-part of application Ser. No. 945,101, filed Sep. 15, 1992, now abandoned, which is a continuation-in-part of application Ser. No. 631,324, filed Dec. 20, 1990, now abandoned.

BACKGROUND OF THE INVENTION

This invention relates to a system for voting in accordance with component interests of a share of stock in two or three separately tradeable components. In the three component case they may be called $DIVS^{SM}$, $SPECS^{SM}$, and $ZIPS^{SM}$; in the two component case they may be called $ZIPS^{SM}$ and $SPECS^{SM}$. It is anticipated that these components will be created relating to the common stock of large "Blue Chip" corporations in arrangements having a series term of approximately five years. However, any time period could be designated. Components can be created by a holder of a long position in the underlying common stock associated with the component sold. The characteristics of these components are as follows:

$DIVS^{SM}$—This component gets the payment of dividends on the common stock over the term of the series. It is anticipated that the initial market pricing of the $DIVS^{SM}$ will approximate the discounted present value of the applicable nominal dividend rate using the yields on Treasury Notes of comparable maturity as the discount rate. Historic and prospective dividend growth rates of individual stocks will be factored in to lower or increase the dividend discount rate actually used. The return to the $DIVS^{SM}$ holder must take into account the fact that the initial investment or cost of the $DIVS^{SM}$ will end up with a zero value at termination. Therefore, a significant portion of the dividends received by the $DIVS^{SM}$ holder represents a return of the initial investment. The dividends to the $DIVS^{SM}$ holder preferably will be paid in the same amount and at the same time as the dividends are paid on the underlying common stock. In the two component case the $DIVS^{SM}$ will not trade and the dividend paid on the stock will be retained by the shareholder who had sold the $ZIPS^{SM}$ and/or $SPECS^{SM}$.

$SPECS^{SM}$—This component is entitled to any and all appreciation in the stock's price above the Termination Claim ($TC^{SM}$) at maturity. Unlike conventional options where the strike price (Termination Claim ($TC^{SM}$)) must be paid in order to obtain the common stock at expiration, the holder of $SPECS^{SM}$ will receive shares of common stock in satisfaction of their claim at termination. If the common stock's price closes below the Termination Claim ($TC^{SM}$) at expiration, the $SPECS^{SM}$ will be worthless. Even in that eventuality, however, the $SPECS^{SM}$ will have provided investors with innumerable profit making opportunities during the five year period. Their utility results from the fact that they embrace most of the volatility of the common stock because of their significant leverage, thus appealing to speculative investors.

$ZIPS^{SM}$—This component represents the nucleus of the common stock preferably collateralized at all times by the value of a full common share because of its preferential claim at termination. The initial investment in the $ZIPS^{SM}$ will be considerably less than the price of the underlying common stock because of the value attributable to the $DIVS^{SM}$ and $SPECS^{SM}$. Investment return on the $ZIPS^{SM}$ will be entirely from preferential price appreciation to the lesser of the stock's price or the Termination Claim ($TC^{SM}$) at maturity. Investors in the $ZIPS^{SM}$ of dividend-paying common stocks will end up with an income-producing investment at termination. A method preferably is utilized (by ASPC) for establishing the Termination Claim ($TCS^{SM}$) and Termination Date ($TD^{SM}$) in order to achieve conservative investment objectives of (1) a stand-still return to the stock's current price at least as great as the yield on Treasury Notes of comparable maturity, and (2) a margin of safety or downside price protection of at least 25% to 33%. Once these criteria have been satisfied, it should be possible to determine with considerable accuracy the much higher potential returns to the Termination Claim ($TC^{SM}$). The capital conservative aspects of the $ZIPS^{SM}$ results from the fact that they should be available initially at a significant discount from the prevailing price of the common stock while offering investors the prospects of achieving significant potential returns.

Both the $DIVS^{SM}$ and $ZIPS^{SM}$ are completely new investment securities which should have wide appeal to investors, most of whom are risk averse. This will enhance the value of the underlying common stock. All three components will trade in the marketplace and their actual prices will be determined as any publicly traded vehicle.

An important unique aspect of this system is that the vote on the underlying common stock is apportioned on a pro rata basis to each component. If all three components are trading, each gets its vote based on its value relative to the sum of the values of all three components together. There has never before been a way to split the vote of a share of stock. In the case of the components trading as options, never before have the options had a vote. The programmed computer systems that implement the vote apportionment and assure that the vote is properly delivered to each $ZIPS^{SM}$, $SPECS^{SM}$ and $DIVS^{SM}$ holders and to the corporation are described hereinafter. In the case of only the $ZIPS^{SM}$ and $SPECS^{SM}$ trading, the apportionment is based on the value of each component relative to the value of the underlying common stock.

If any two of the three components described above trade in the market place, the non-trading component will be the residual value of the share of stock minus the value of the traded components. All formulas can be adjusted to accommodate this method of creation and trading.

There are described four methods of creating $ZIPS^{SM}$, $DIVS^{SM}$, and $SPECS^{SM}$, as follows:

I. Option Creation Mode. In this mode the components will be created as options by the sale of one or more components. In this case they would be created by an option clearing corporation (OCC), and there would be no direct pledge of the underlying common stock. The seller's OCC participant would be required to ascertain that the seller had the underlying common stock in his account in street name at the OCC participant. The OCC participant would have to maintain margin at OCC to cover the created component. In this mode the OCC interposes itself between the buyer and seller guaranteeing delivery of the components, just as it now does in option trades.

Thus in this mode components can be created from a "covered" or "uncovered" position in the underlying stock. However, this invention and process requires and accommodates the delivery of votes to component holders whether from a covered or uncovered position.

II. Equity Creation Mode. In this mode the components will be created by the owner of the underlying common stock selling one or more components and pledging his or her stock to an Equity Clearing Corporation (ECC) or an agency approved by ECC. The ECC will then deliver the number of components sold to the Depository Trust Corporation (DTC) that are then held by DTC in "street name" in the buyer's DTC participant account for the benefit of the buyer. The pledge to the ECC is done to insure delivery of the interests represented by the sold components prior to and upon termination of the series. In this mode the components preferably trade on an equity exchange. The trading of the components would take place with trade matching and settlement handled identically to the equities.

III. Equity Forward$^{SM}$ Creation Mode. This mode is a special case of the Equity Creation Mode. In this mode the components will be created by the owner of the underlying stock selling one or more components. The underlying stock will be pledged to the broker instead of to an Equity Clearing Corporation (ECC). The broker then maintains margin at an Equity Forward$^{SM}$ Clearing Corporation (EFCC) to cover the created components. In this mode the components trade on an equity/option exchange licensed by ASPC with matching and settlement handled identically to options.

IV. Corporate Exchange and Creation Mode. In this mode a corporation would exchange components for its common stock as a service to its shareholders. The most important difference between this mode and the Equity Creation Mode is that all three components will be created at the same time, i.e., at the time of exchange, and be deposited in the stockholder's DTC participant account. The settlement of the traded components would be handled by DTC and National Securities Clearing Corporation (NSCC) in the same manner as applies to equity trades currently.

In the corporate creation mode a corporation could raise equity capital more economically by issuing ZIPS$^{SM}$, SPECS$^{SM}$ and DIVS$^{SM}$ instead of selling common stock the conventional way. The components would be bought by new or existing investors in the company. Trading of the components would also be handled as equities. Instead of purchasing the common stock, investors would buy individual components.

Unlike the first three modes where early redemption by purchasers is not allowed, the Corporate Creation and Exchange Mode could allow the holder of all three components to exchange them for the underlying common stock at anytime during the term of the arrangement. The combined components in the Corporate Exchange and Creation Mode are less likely to sell at a discount to the underlying common stock, than in the other three modes, be cause of the availability of the redemption feature. However, because of the significant increase in investment utility and capital efficiencies provided by the availability of the DIVS$^{SM}$, ZIPS$^{SM}$ and SPECS$^{SM}$, investors should see either meaningful premiums for the components in the Corporate Exchange and Creation Mode the continued creations in the other three modes.

In all of the creation modes a Termination Date (TD$^{SM}$) and Termination Claim (TC$^{SM}$) must be established before trading can commence.

The splitting of shares of stock described herein is an important improvement over the PRIME® and SCORE® system described in U.S. Pat. No. 4,093,276 and claimed as a stock certificate. In the original system the PRIME® received all the dividends, price appreciation up to the Termination Claim (TC$^{SM}$), and the entire vote. The SCORE® only received the appreciation above the Termination Claim (TC$^{SM}$) That system demonstrated the value added in terms of the components' premium over the underlying common stock and increased liquidity both volume-wise and dollar-wise relative to the common stock displaced. Thus, there are sound reasons to believe that DIVS$^{SM}$, ZIPS$^{SM}$ and SPECS$^{SM}$ should attract considerable new investor interest in the individual components which will thereby increase the demand and the market value of the underlying common stock.

Some of the improvements of the new system are:

1. By splitting the vote among all the components the new system assures that the vote will have an appropriate value relative to the underlying common stock.
2. This system represents the ultimate splitting of the common stock, since each economic interest of the stock is represented by separately traded components.
3. The new system represents the first time that dividends or substitute dividends on a share of stock will be able to trade on a public exchange.
4. There preferably are no administrative or investment fees in the new system.
5. There preferably are no underwriter or underwriter fees in the new system.
6. The yield on the ZIPS$^{SM}$, due to price appreciation only, is much easier to determine than for the PRIME® since the PRIME® receives price appreciation, dividends, and dividend increases.
7. The splitting has value added as demonstrated by Americus Trust's PRIME®s and SCORE®s. This value stems from the increased investment utility of the components and the capital efficiency that results from the ability of investors to commit capital only to the desired components. The value added can also be attributed to savings in transaction costs that would be required in attempts to replicate the investment characteristics of the individual components.
8. The ZIPS$^{SM}$ is a safer investment than the PRIME®, and much safer than the underlying common stock, since the common stock's price (if held to the termination of the series) can fall by the value of the SPECS$^{SM}$ and the DIVS$^{SM}$ before the ZIPS$^{SM}$ could lose any value. There follow definitions of terms used herein.

ASPC—Americus Stock Process Corp. (Applicants' assignee, owner of primary computer)
ZIPS$^{SM}$—Zero Income Principal of Stock
DIVS$^{SM}$—DIvidend Value of Stock
SPECS$^{SM}$—Speculative Equity Component of Stock
OCC—An options clearing corporation
ECC—An equities clearing corporation
EFCC—An Equity Forwards$^{SM}$ clearing corporation
DTC—Depository Trust Company
NSCC—National Securities Clearing Corporation
CUSIP—A string of digits and letters that uniquely identifies every security that trades on the exchanges.
Series—the ZIPS$^{SM}$, DIVS$^{SM}$ and SPECS$^{SM}$ for a particular company with a given Termination Claim (TC$^{SM}$) and Termination Date (TD$^{SM}$).

Equity Forwards^SM—These would be clearing agency issued, exchange or OTC traded derivative securities that would be issued and margined by the clearing agency in accordance with its normal procedures and rules (i.e., cash, treasuries, letters of credit or cover). The clearing member would require that DIVS^SM, ZIPS^SM and SPECS^SM be handled as standardized forward contracts for derivative equity securities. Doing them as standardized forward contracts for derivative equity securities against a long position assures that stock is available to meet the obligation undertaken to give proxies for the portion of the vote allocable to the component parts and to fund the dividend obligations in respect of sold DIVS^SM. Equity Forwards^SM, Forwards, or Standardized Forward Contracts for Derivative Equity Securities are used interchangeably herein.

Termination Claim (TC^SM)—The value that determines how the common stock underlying a series will be distributed between the ZIPS^SM and SPECS^SM component: holders. ZIPS^SM holders will receive common stock equal to the lesser of the Termination Claim (TC^SM), or the stock's price, with holders of the SPECS^SM component receiving the remaining stock, if any, equal in value to the excess of the stock's price above the Termination Claim (TC^SM).

Termination Date (TD^SM)—The last day of trading of the components which will determine the basis for distribution of the underlying common stock.

Net long and Net short—a detailed report showing all accounts with long and short components, and the net total position.

The terms Firm, Member Firm and OCC Participant are interchangeable in the option mode.

In the Equity mode and Corporate Creation and Exchange mode the terms Firm, Member Firm and ECC Participant are interchangeable.

In the Equity Forwards^SM mode, the terms Firm, Member Firm and EFCC Participant are interchangeable.

SUMMARY OF THE INVENTION

In accordance with the invention, a system for voting options each of which represents an interest in a share of stock of an entity, comprises computer input and memory means for allocating to a customer's account options that are any of: (a) a component interest indicative of the right to receive a partial share of stock equal in value to a stipulated price or a full share of stock of the entity on a predetermined future date, whichever is the lesser value; (b) a component interest indicative of the right to receive a partial share of stock equal in value to the appreciation, if any, of the share of stock above the stipulated price on the predetermined future date; (c) a component interest indicative of the right to receive actual dividends or substitute payments equal in amount to dividends declared with respect to given dates which are prior to the predetermined future date and which goes to zero value at the predetermined future date; and computer data processing means for allocating the right to vote the options among the three component interests.

Also in accordance with the invention, a system for voting stock interests, each of which represents an interest in a share of stock of an entity, comprises computer input and memory means for allocating to a customer's account stock interests that are any of:

(a) a component interest indicative of the right to receive a partial share of stock equal in value to a stipulated price or a full share of stock of the entity on a predetermined future date, whichever is the lesser value;

(b) a component interest indicative of the right to receive a partial share of stock equal in value to the appreciation, if any, of the share of stock above the stipulated price on the predetermined future date;

(c) a component interest indicative of the right to receive actual dividends or substitute payments equal in amount to dividends declared with respect to a given date which is prior to the predetermined future date and which goes to zero value at the predetermined future date. The system also includes computer data processing means responsive to the computer input and memory means for allocating the right to vote the stock interest among the three component interests.

For a better understanding of the invention, together with other and further objects thereof, reference is made to the following description, taken in connection with the accompanying drawings, and its scope will be pointed out in the appended claims.

BRIEF DESCRIPTION OF THE DRAWINGS

I. Option Mode

II. Equity Mode

Figure 9:
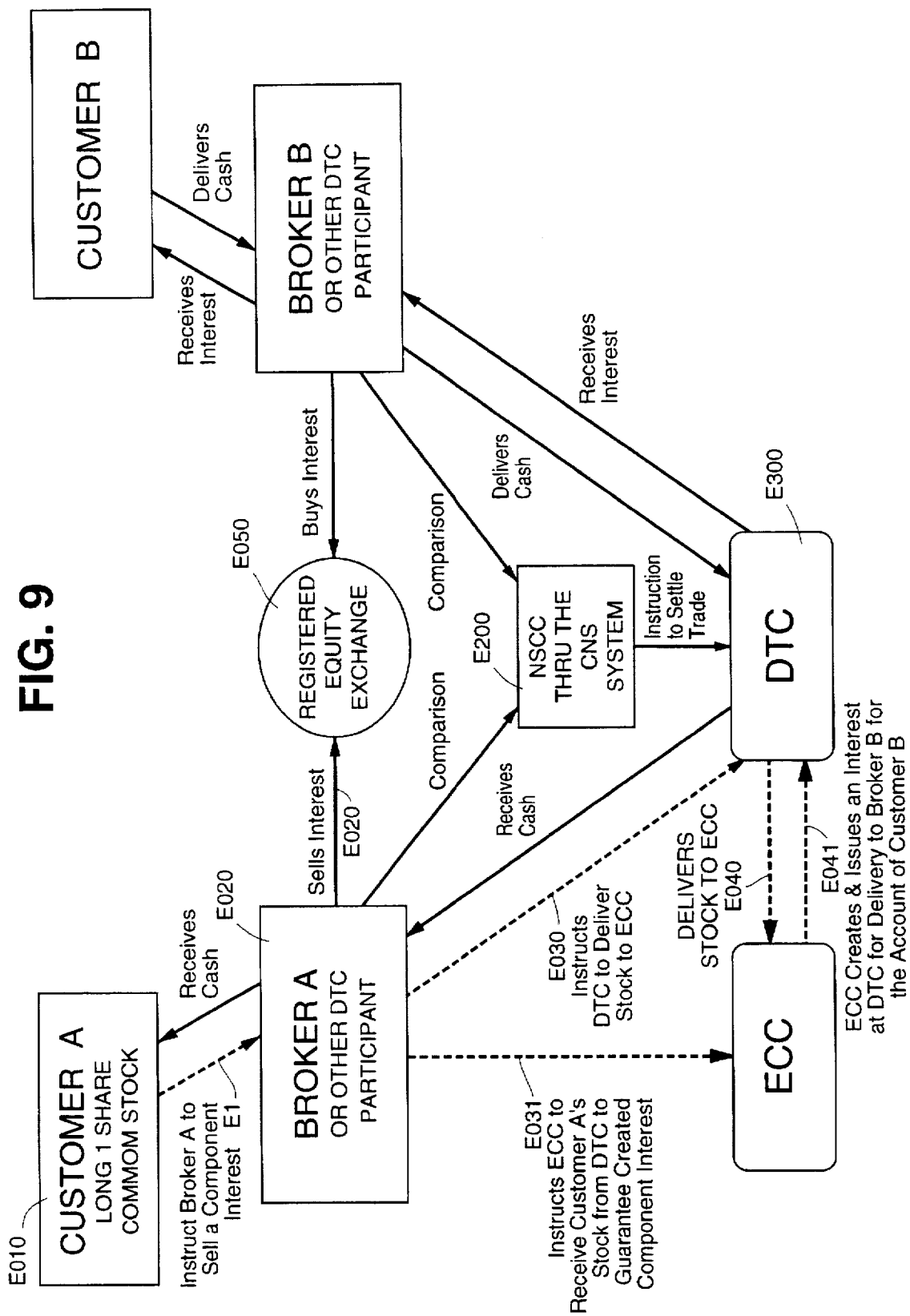
Figure 9A:
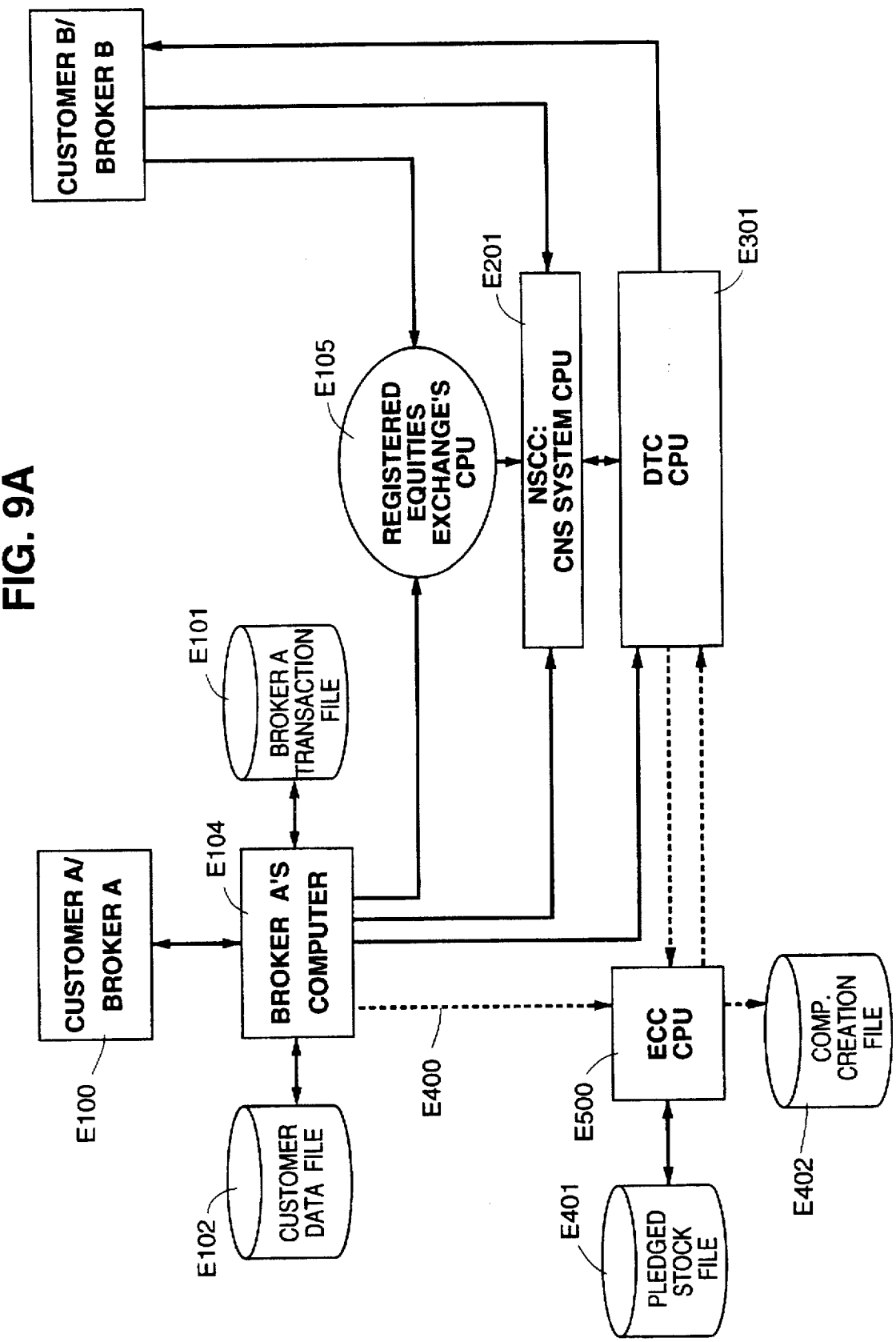
Figure 10:
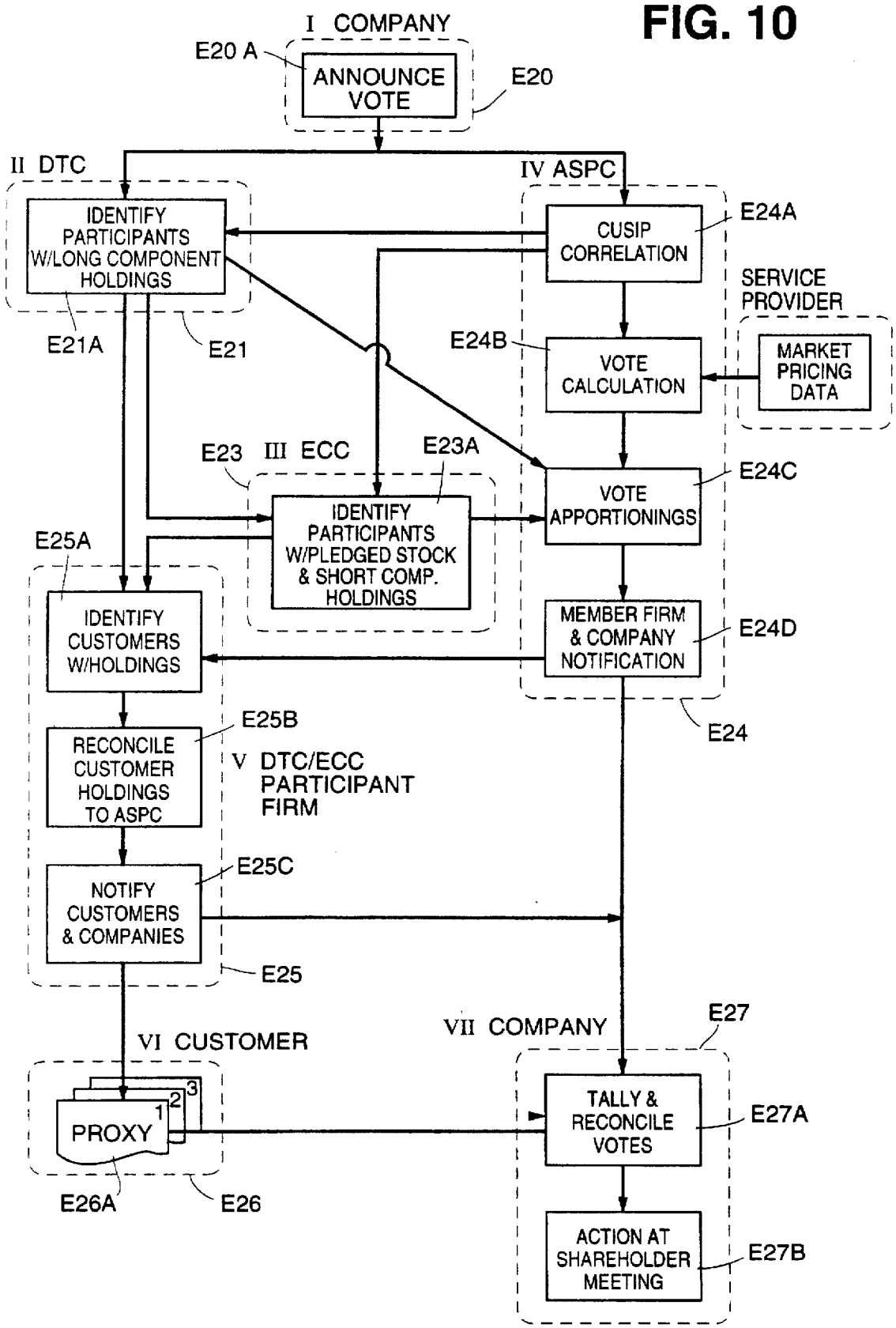
Figure 11:
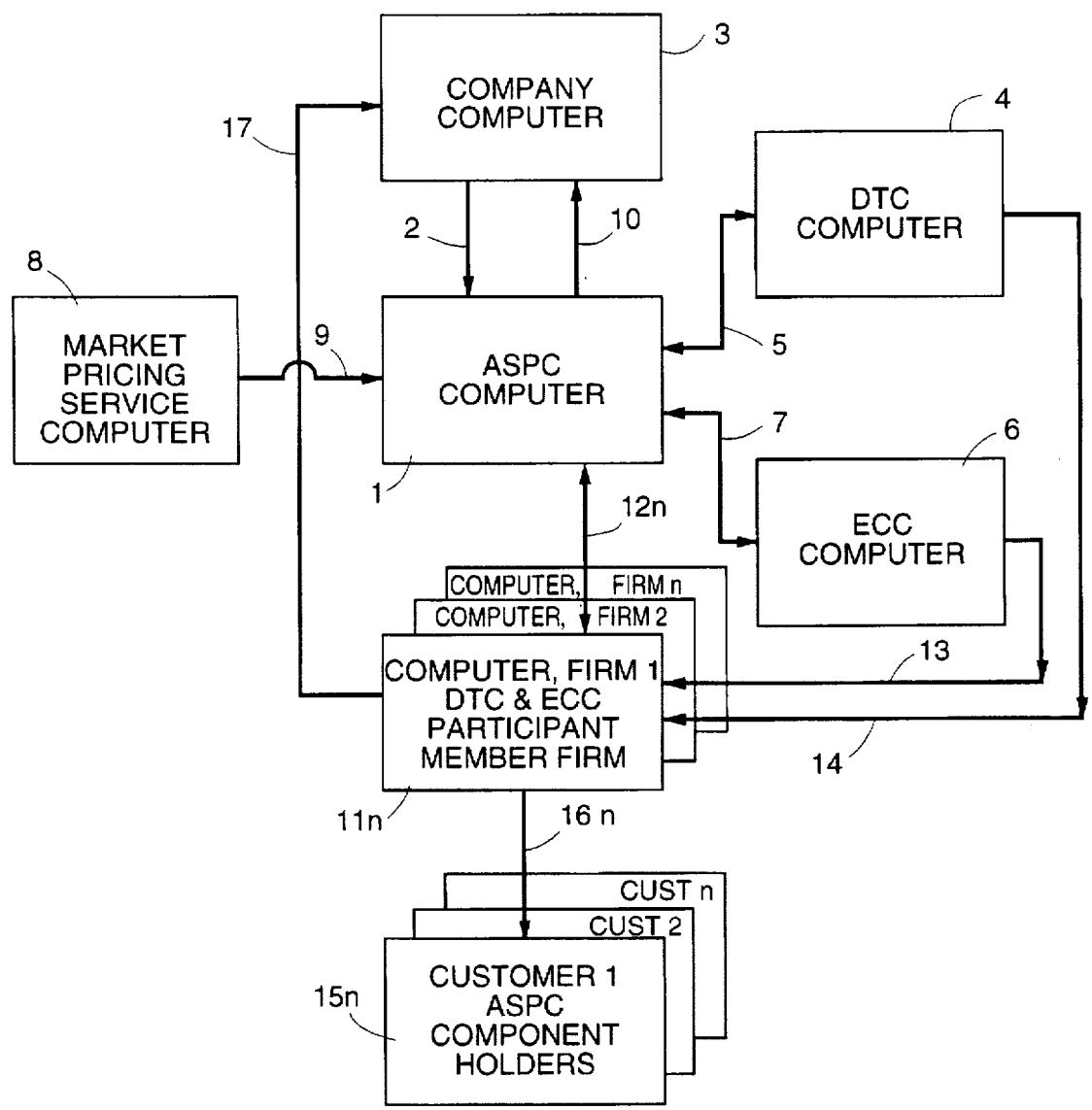
Figure 12:
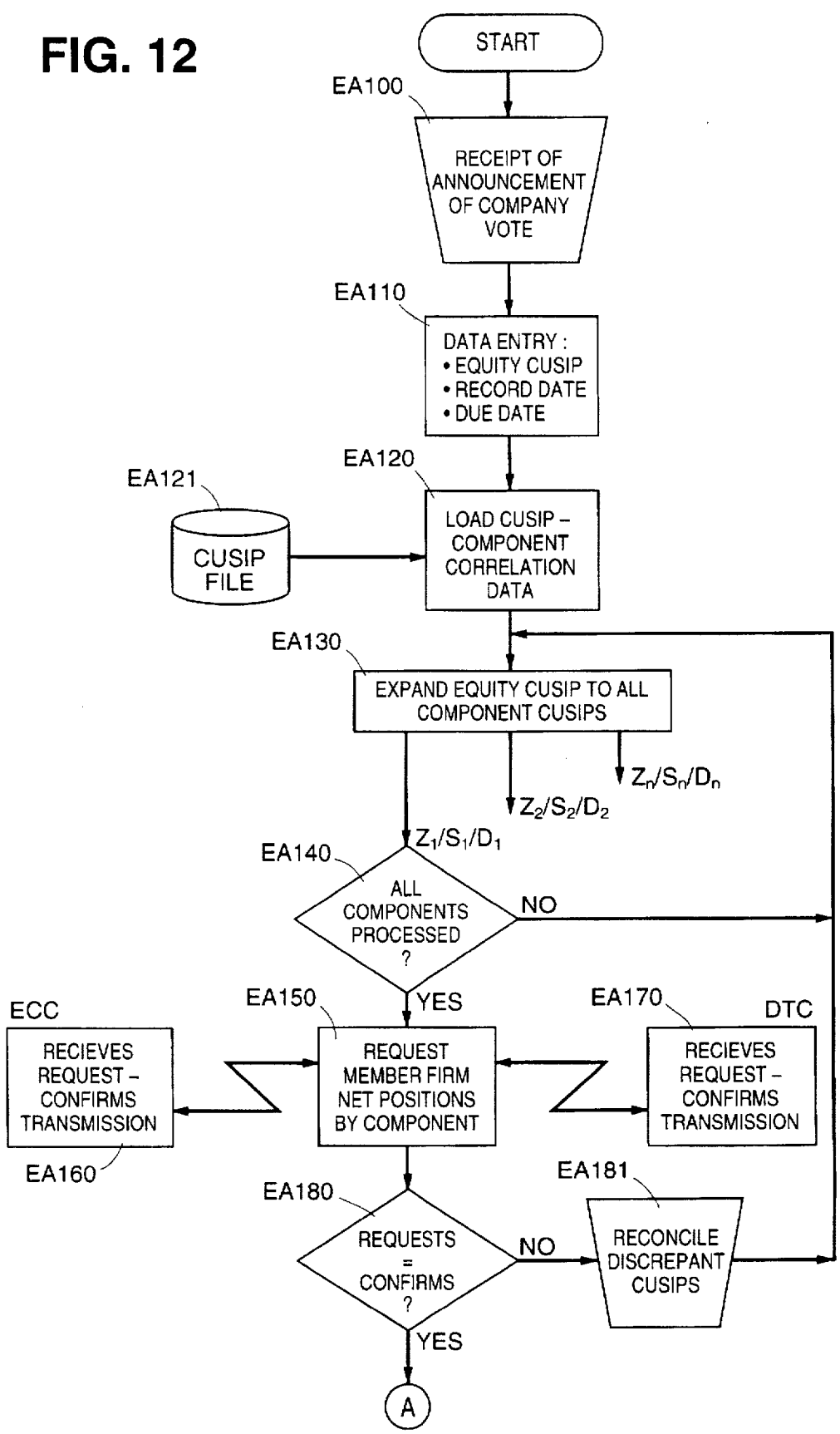
Figure 13:
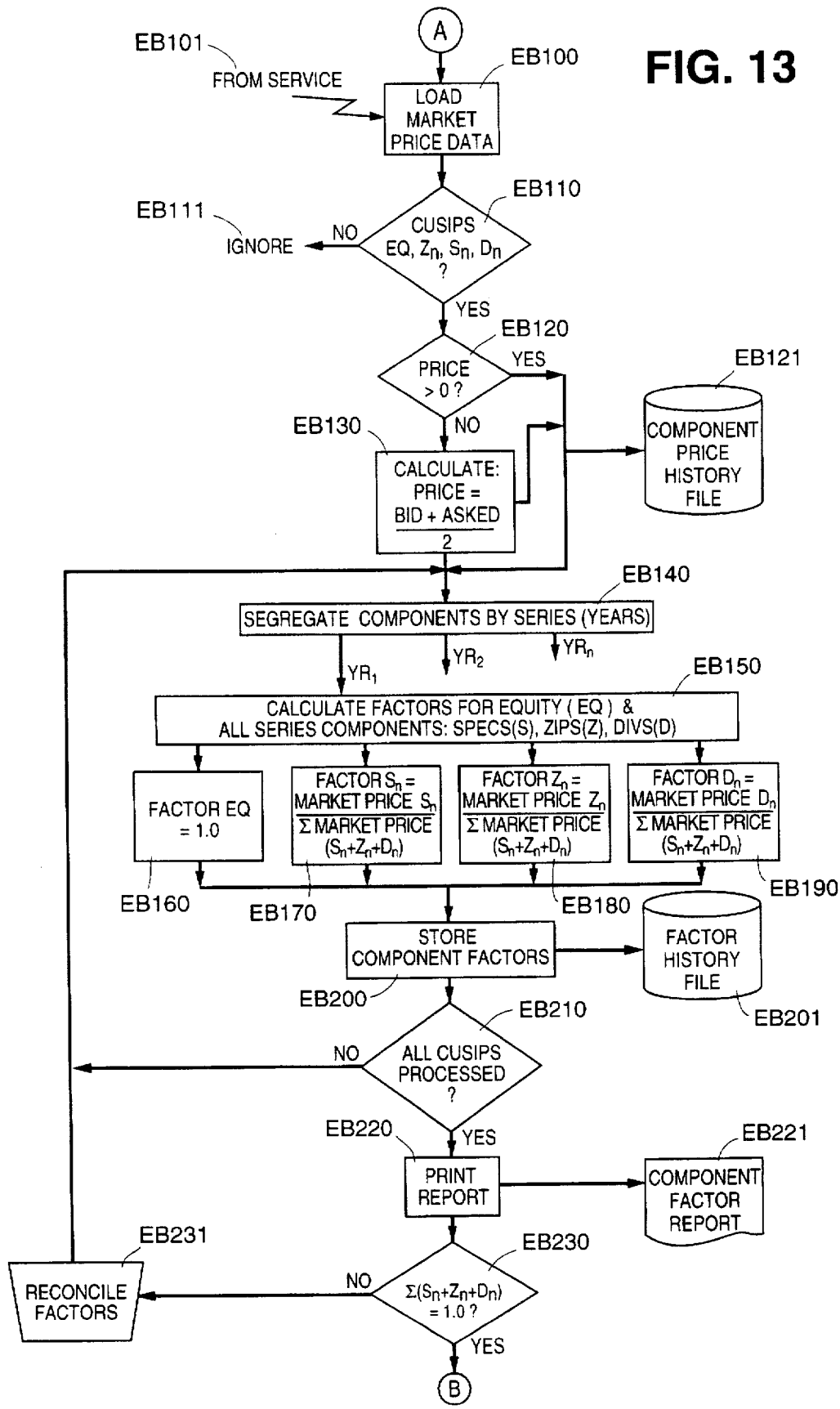
Figure 14:
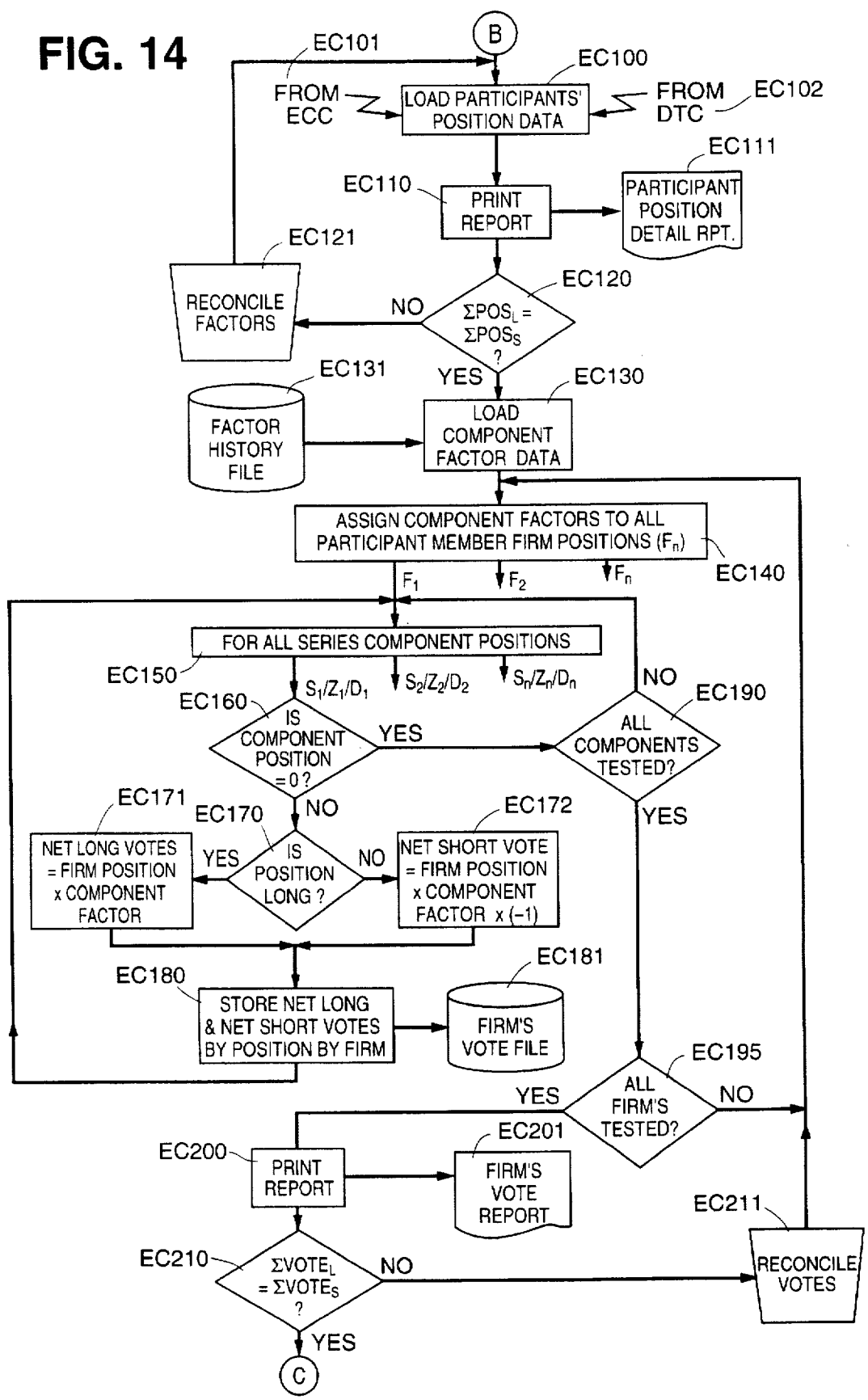
Figure 15:
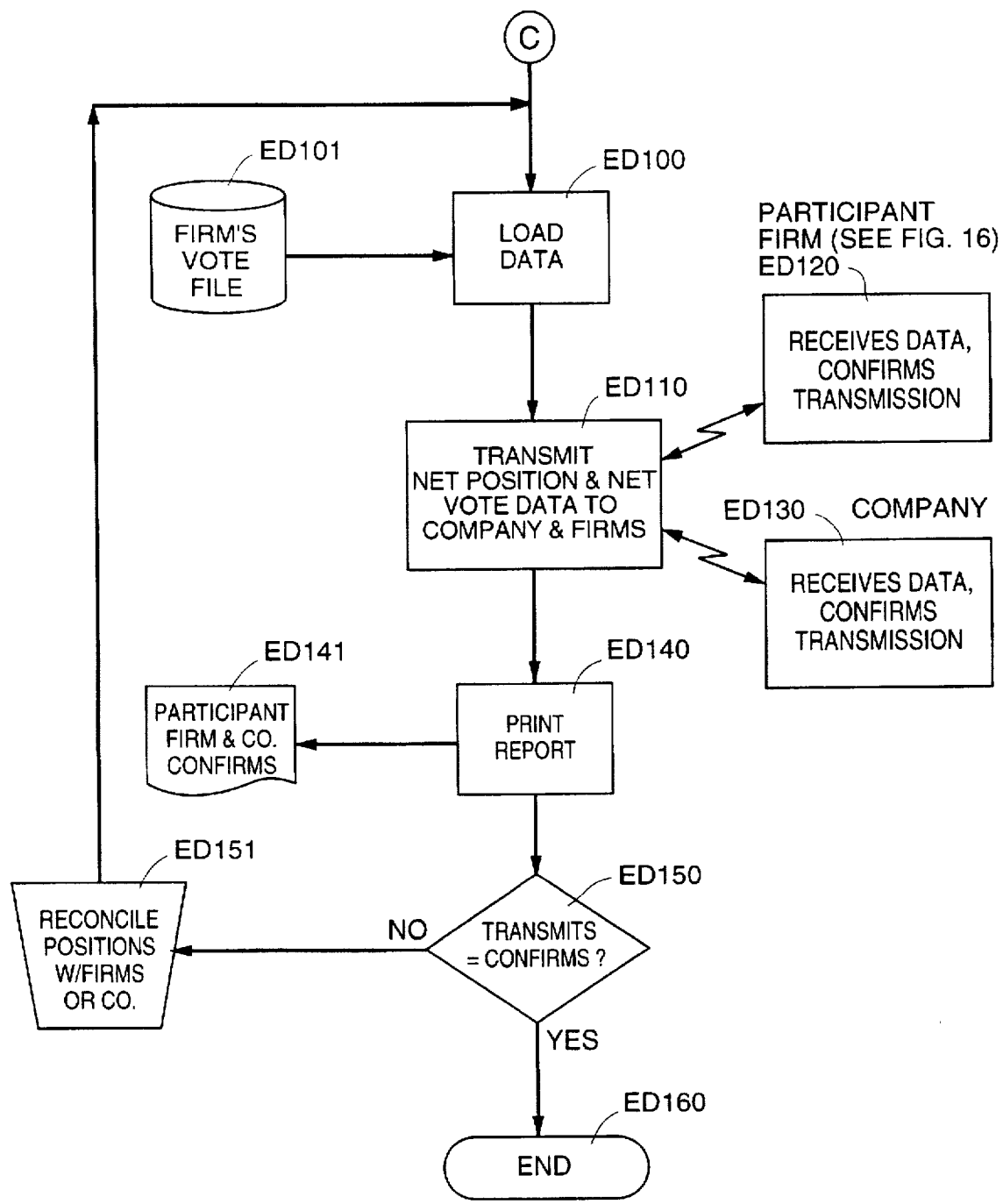
Figure 16:
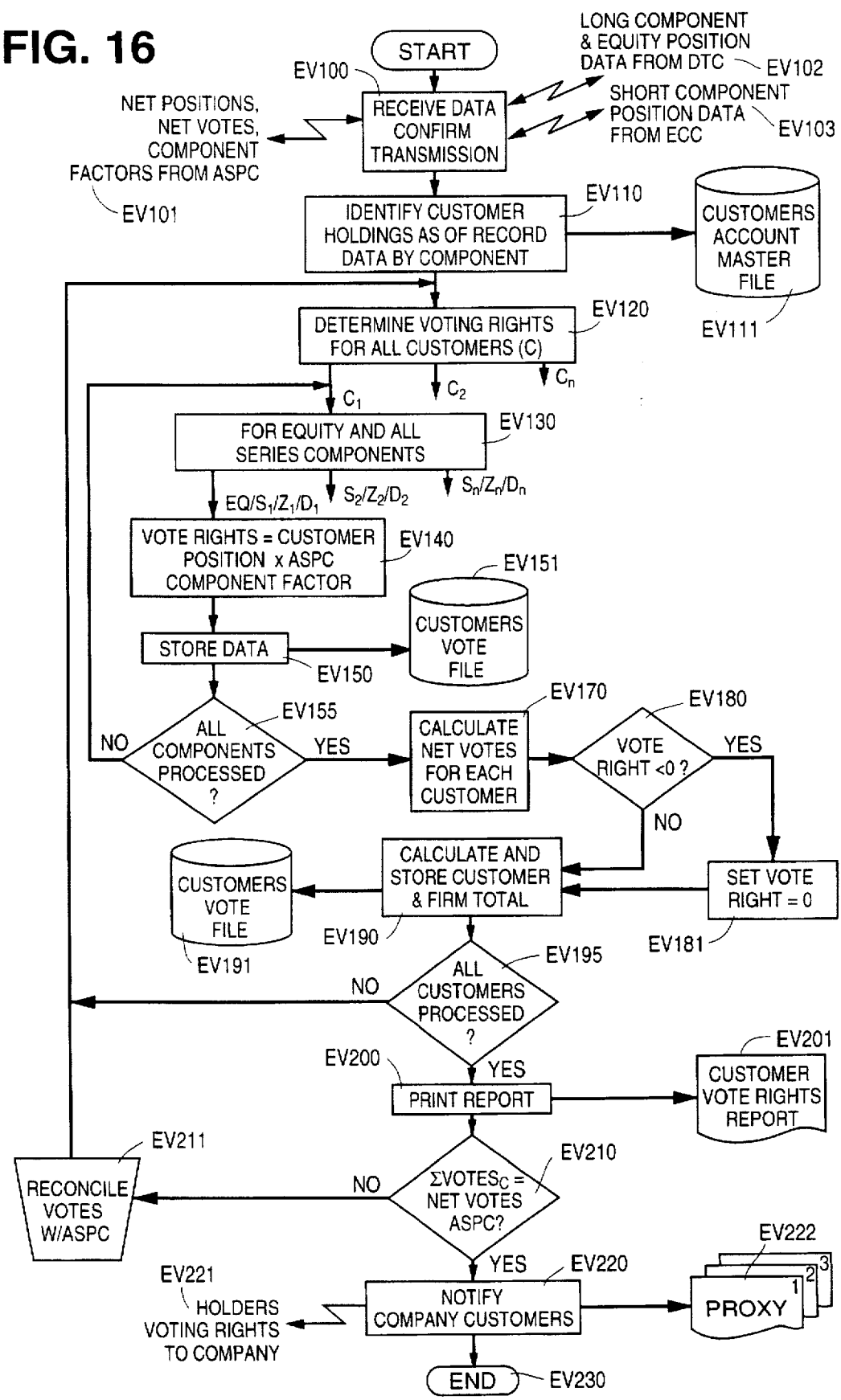

FIG. 9 (EQUITY MODE CREATION TRADE) and FIG. 9a (DATA FLOW DIAGRAM FOR EQUITY MODE CREATION TRADE) are schematic diagrams showing the creation of components and data flow in the equity mode;

FIG. 10 is a schematic diagram of the overall system outlining the relationships and flows of data among units involved in this invention;

FIG. 11 is a schematic diagram of the system which shows the interaction of the several related computer systems;

FIG. 12 is a flow chart comprising a representation of a portion of a computer which operates according to a computer program produced according to the flow chart for CUSIP CORRELATION at, for example, a primary computer;

FIG. 13 is a flow chart comprising a representation of a portion of a computer which operates according to a computer program produced according to the flow chart for VOTE CALCULATION at, for example, the primary computer;

FIG. 14 is a flow chart comprising a representation of a portion of a computer which operates according to a computer program produced according to the flow chart for VOTE APPORTIONING at, for example, the primary computer;

FIG. 15 is a flow chart comprising a representation of a portion of a computer which operates according to a computer program produced according to the flow chart for DTC PARTICIPANT MEMBER FIRM AND COMPANY NOTIFICATION at, for example, the primary computer; and FIG. 16 is a flow chart comprising a representation of a portion of a computer which operates according to a computer program produced according to the flow chart for DTC PARTICIPANT MEMBER COMPUTER.

III. Equity Forwards$^{SM}$ Mode (Derivation of Equity Mode)

Figure 17:
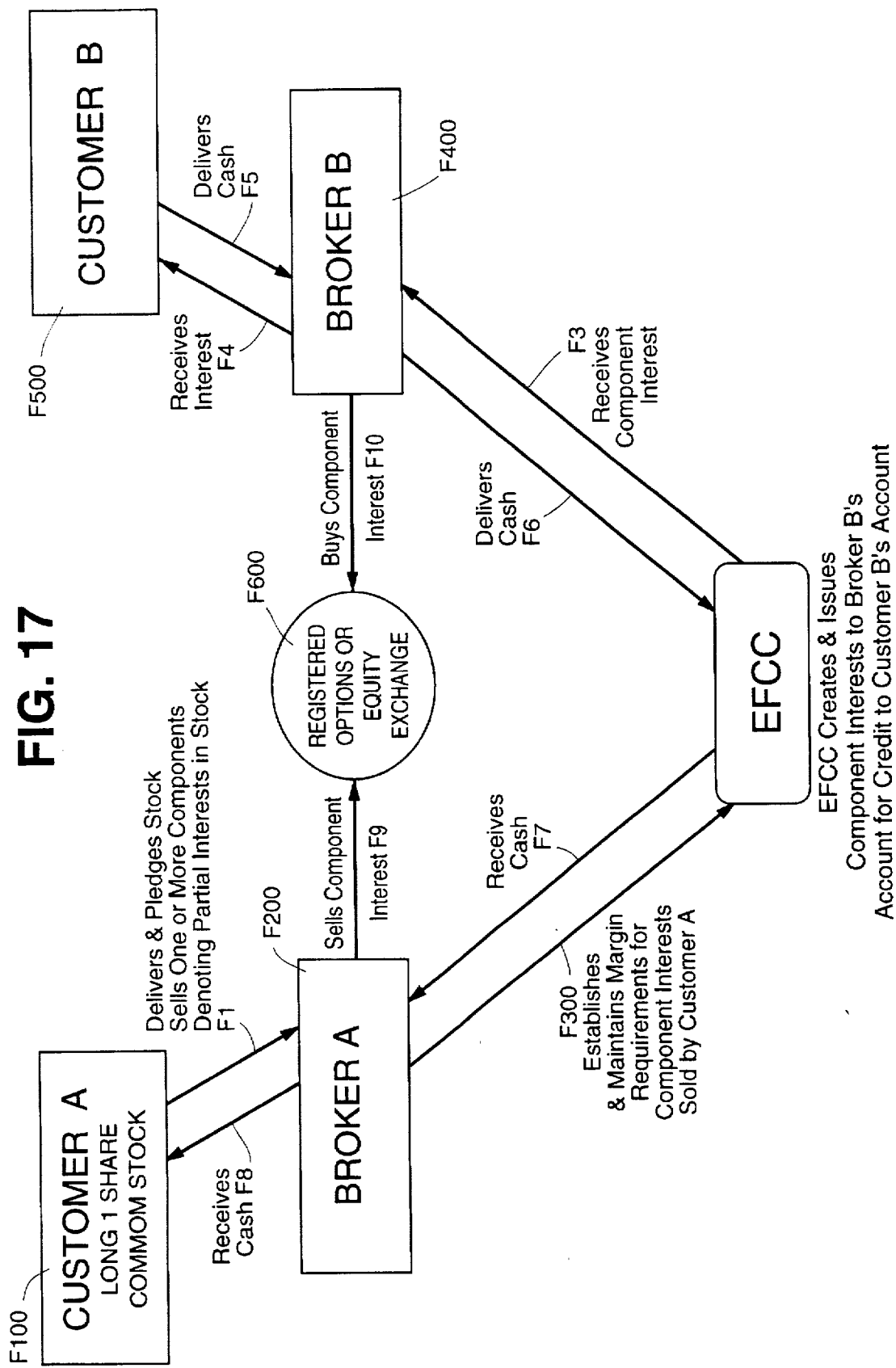
Figure 17A:
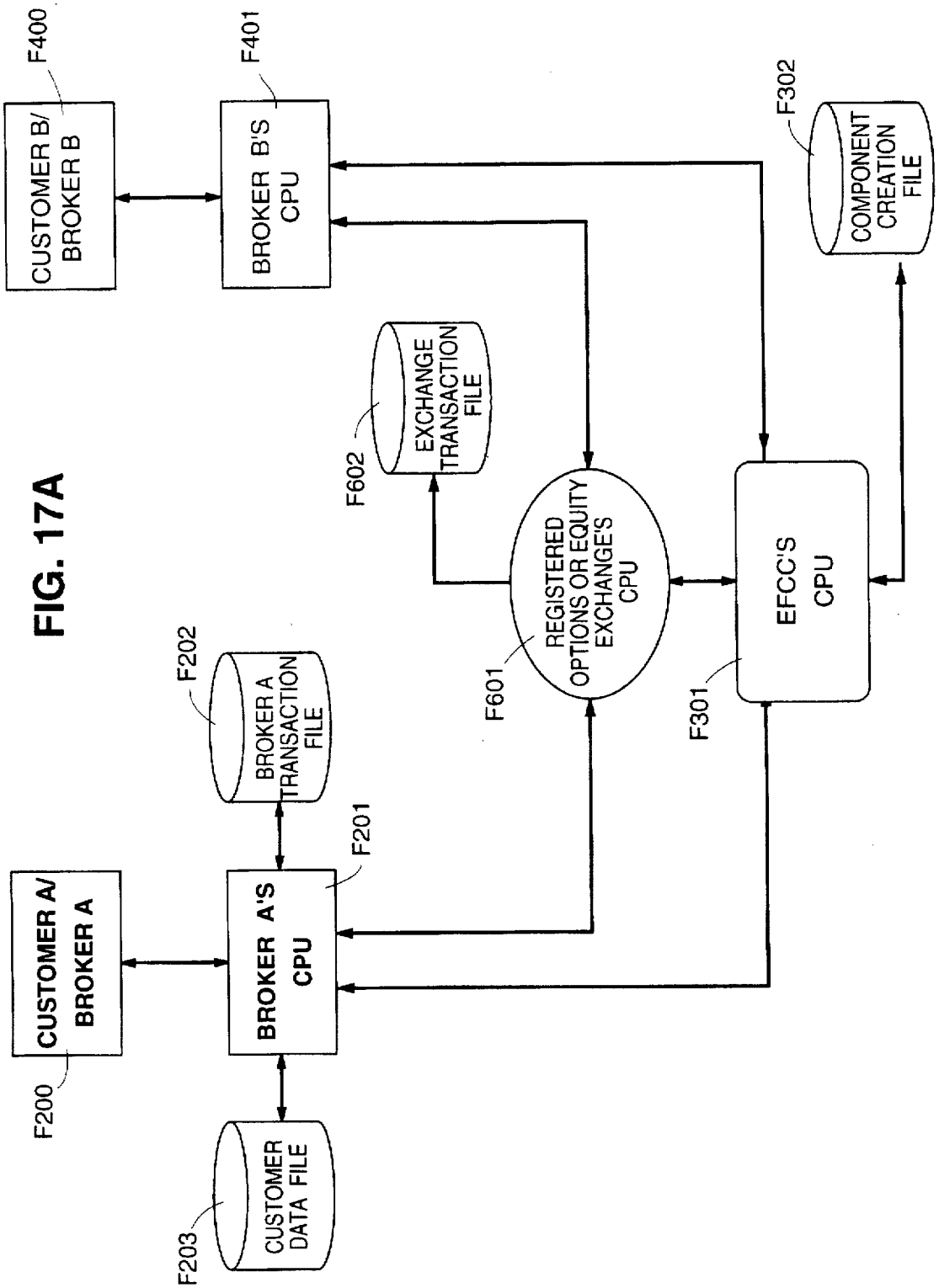
Figure 18:
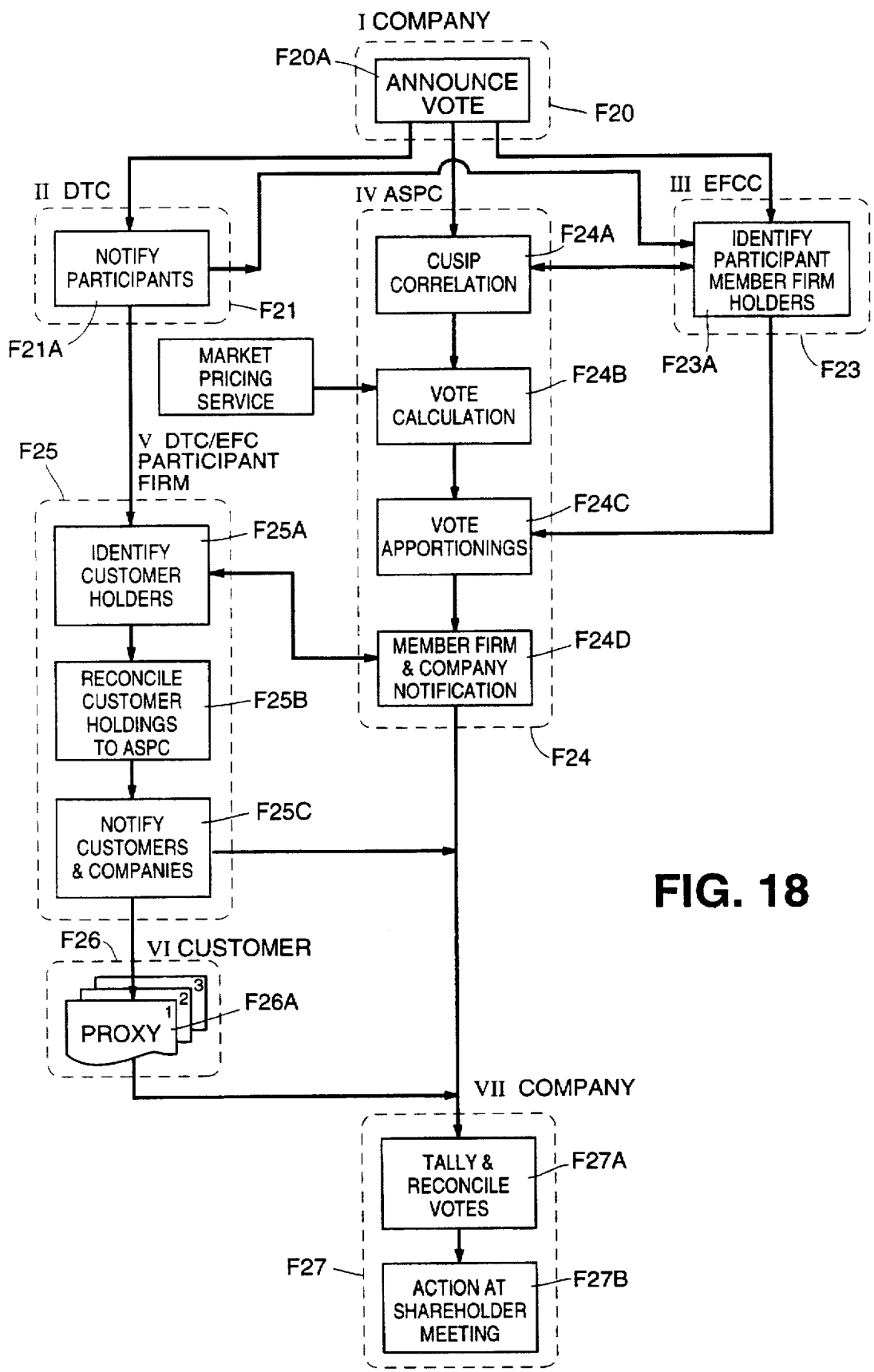
Figure 19:
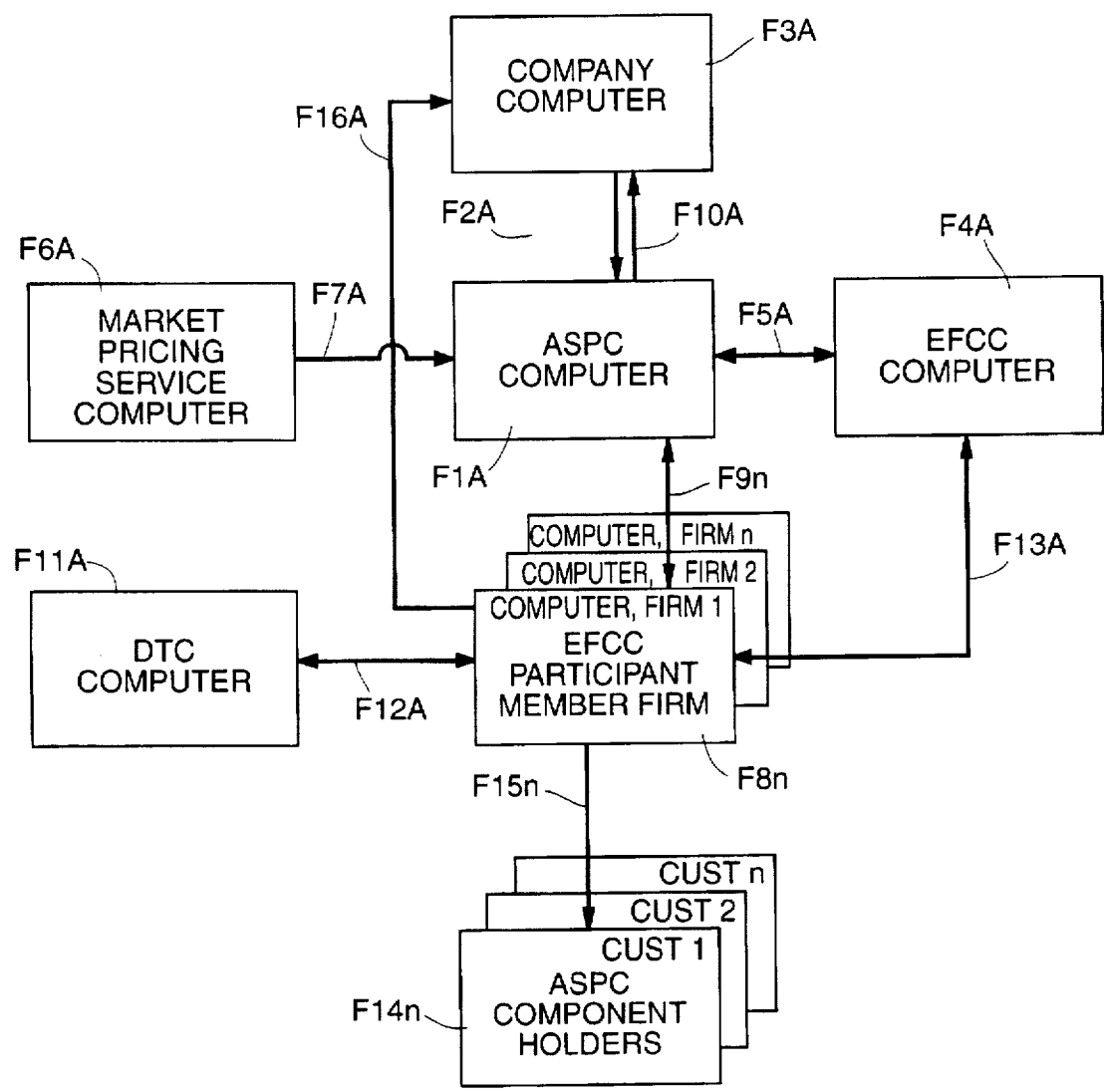
Figure 20:
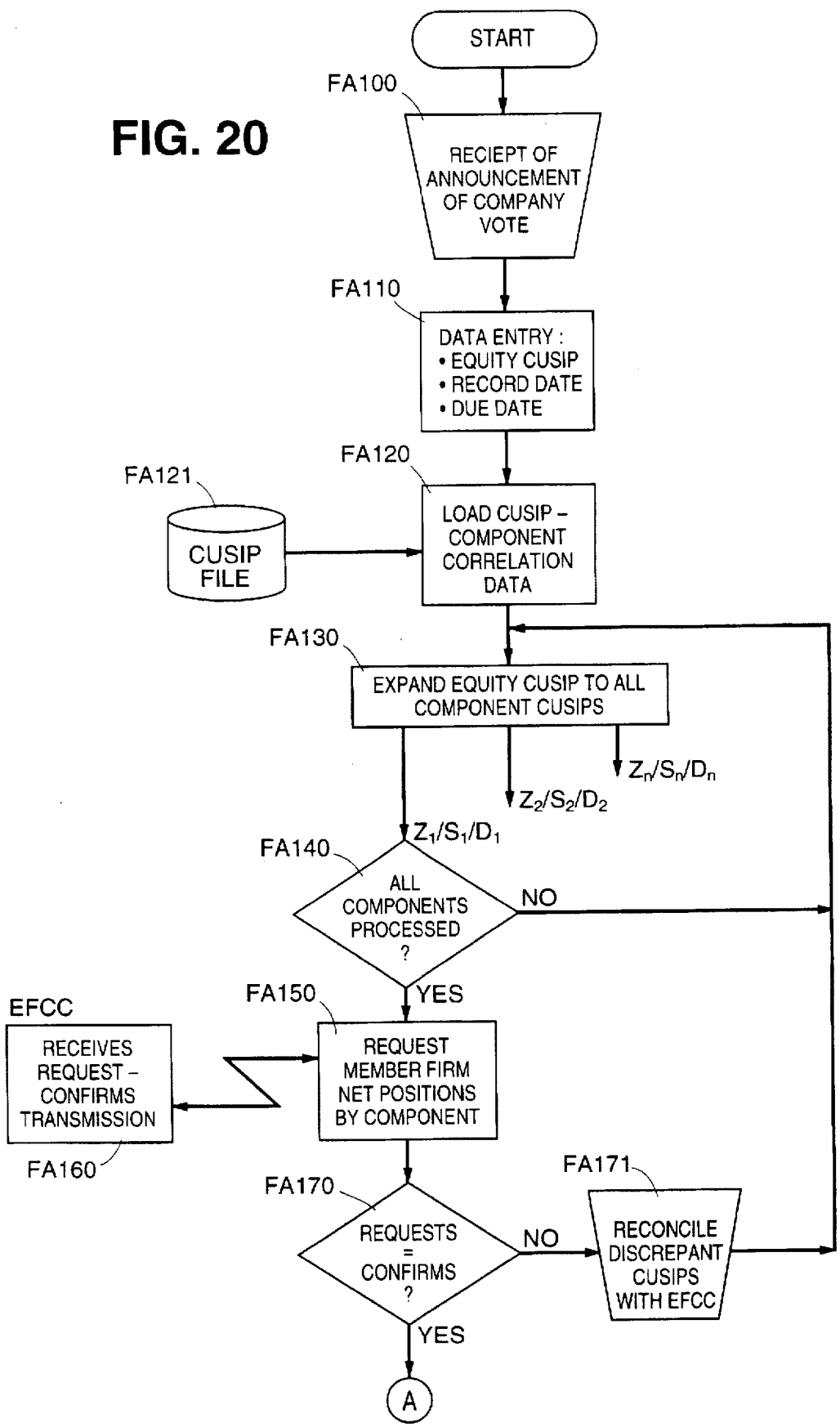
Figure 21:
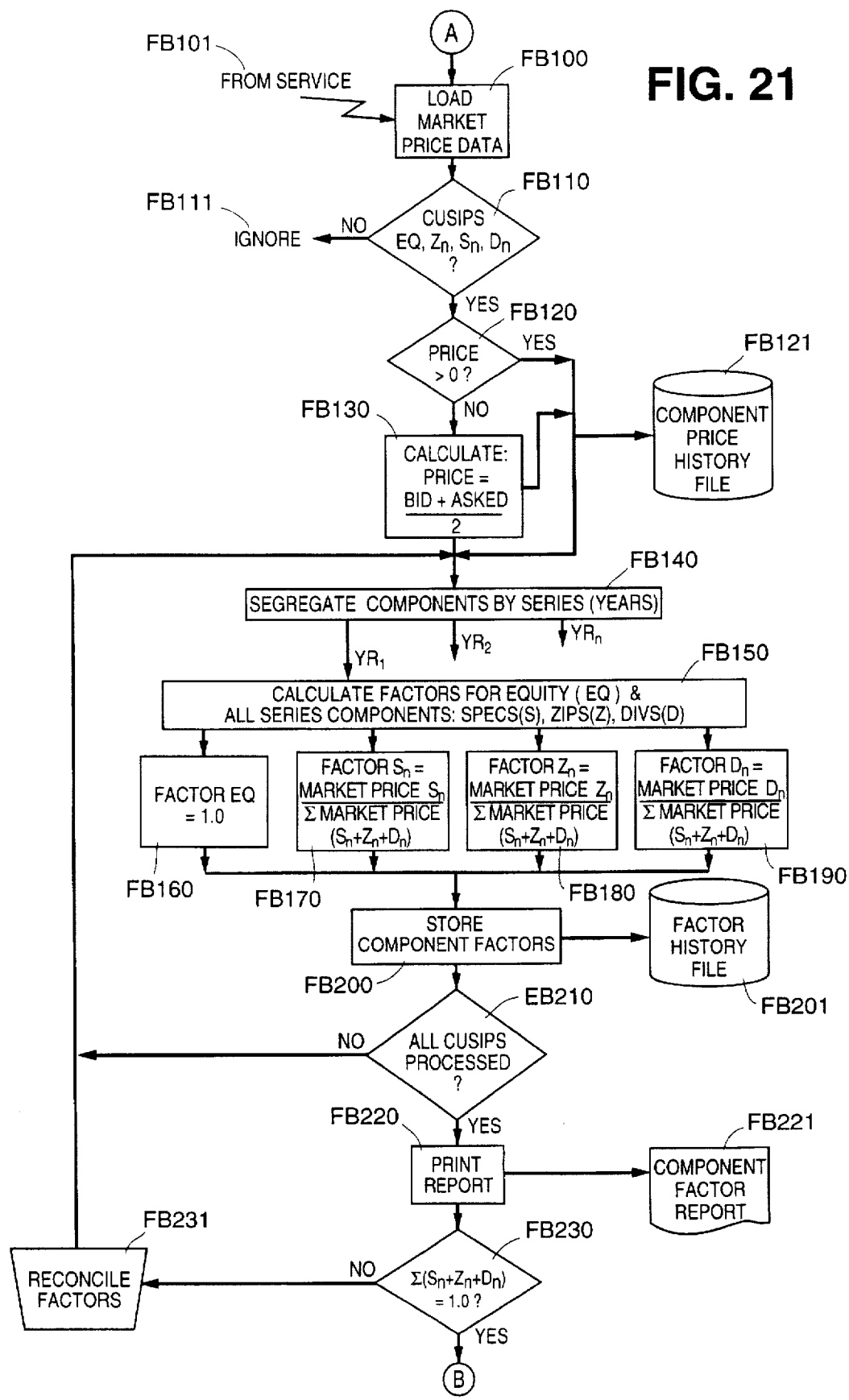
Figure 22:
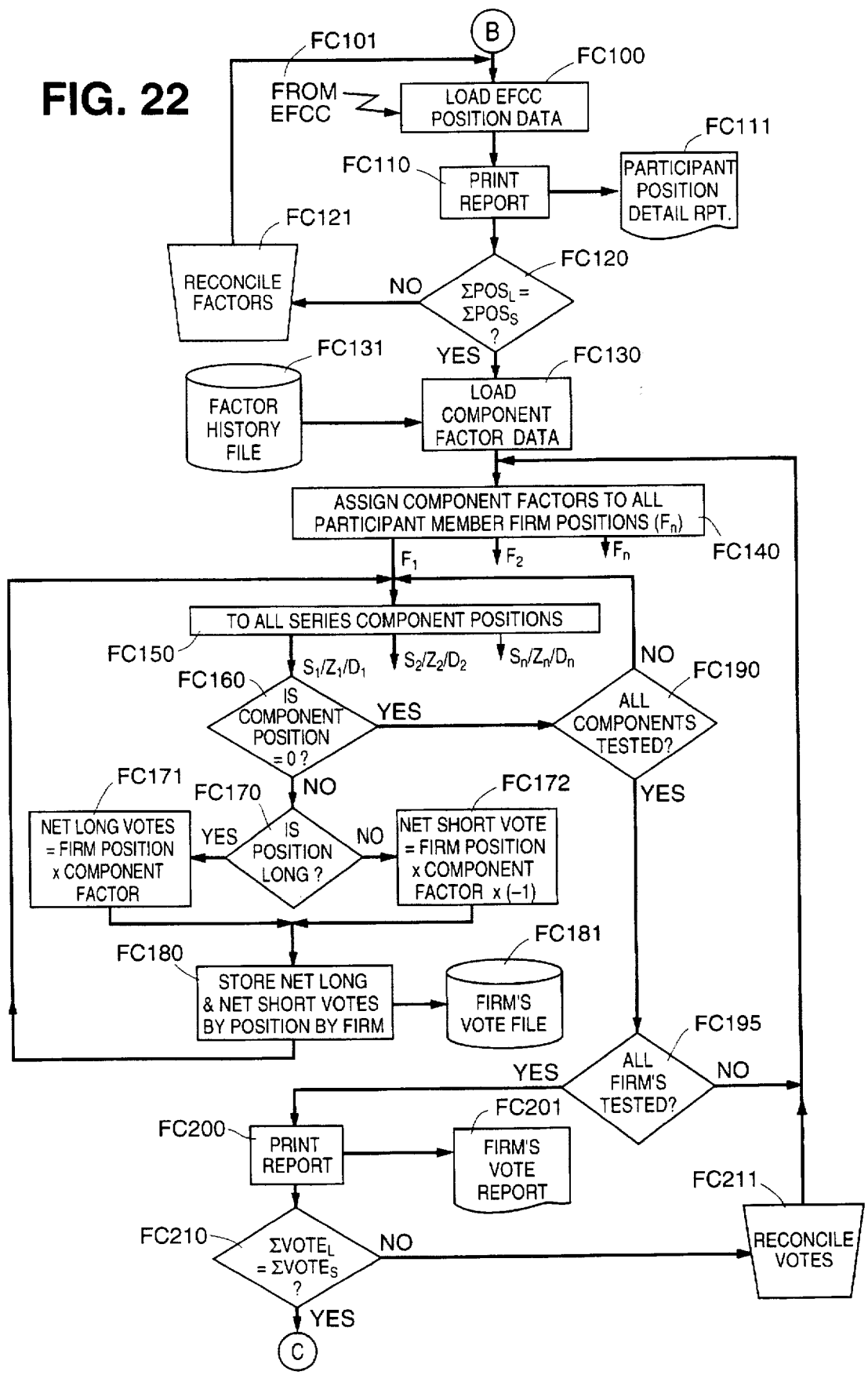
Figure 23:
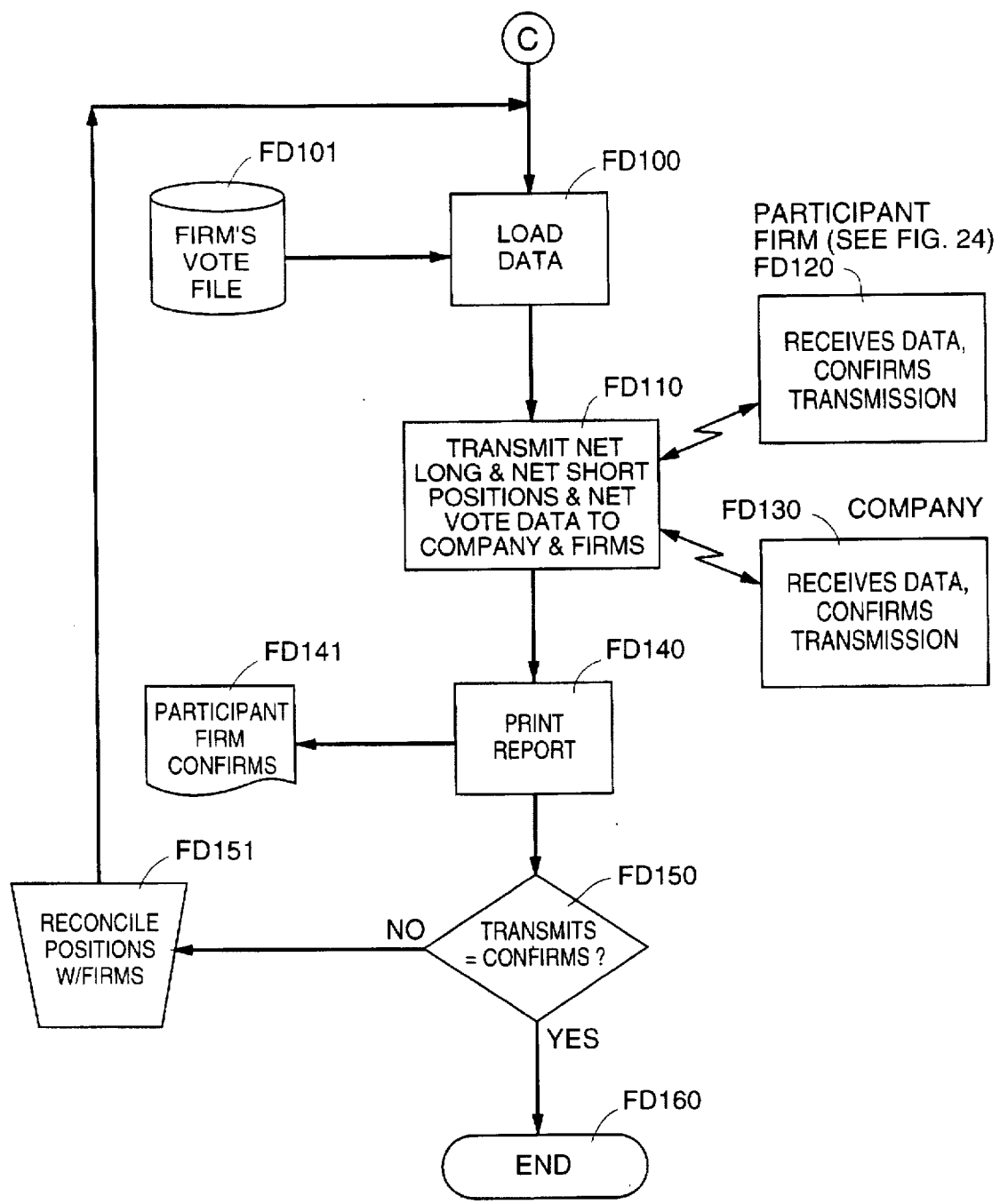
Figure 24:
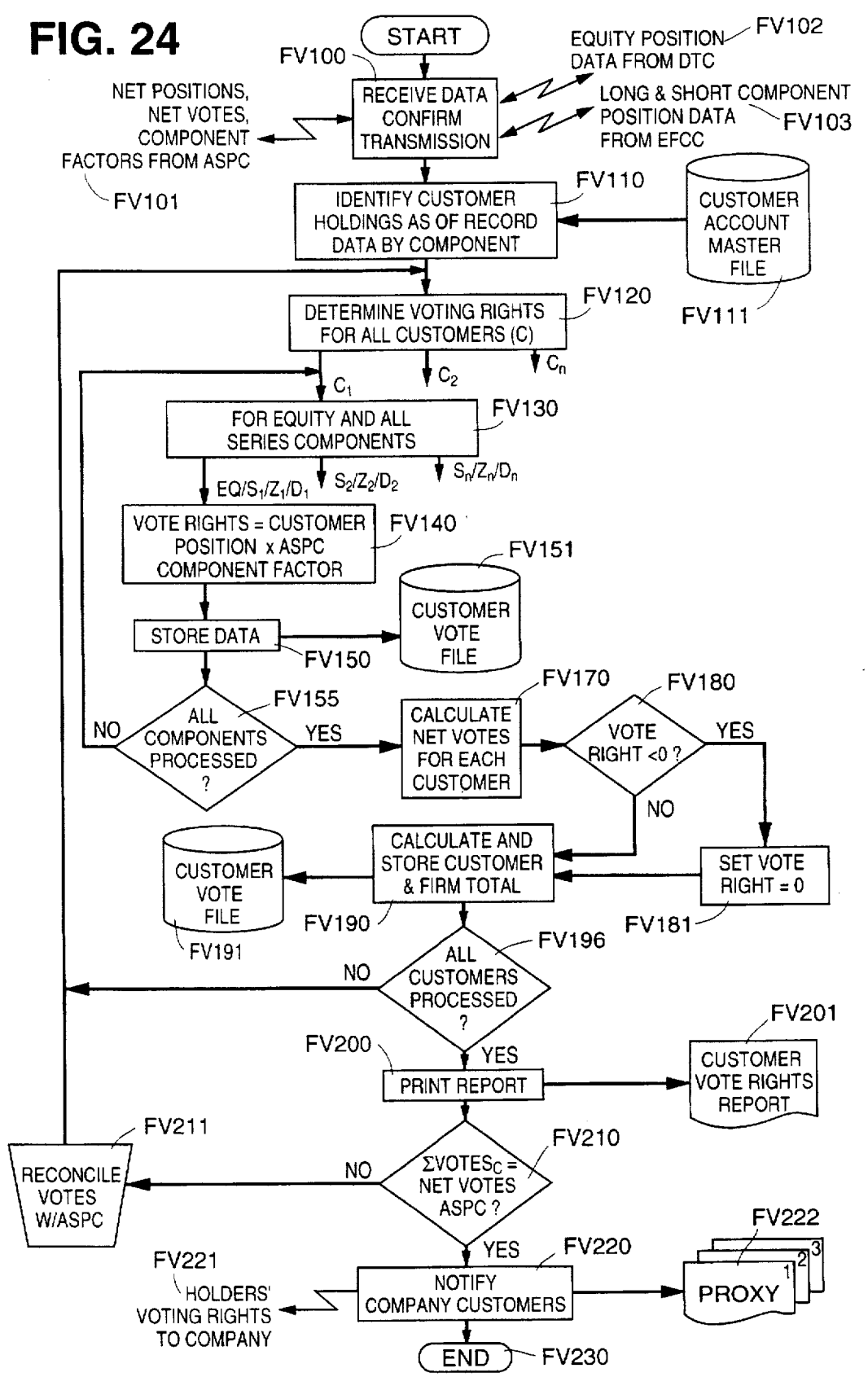

FIG. 17 (EQUITY FORWARDS$^{SM}$ MODE CREATION TRADE) and FIG. 17a (DATA FLOW DIAGRAM FOR EQUITY FORWARDS$^{SM}$ MODE CREATION TRADE) are schematic diagrams showing the creation of components and data flow in the equity mode;

FIG. 18 is a schematic diagram of the overall system outlining the relationships and flows of data among units involved in this invention;

FIG. 19 is a schematic diagram of the system which shows the interaction of the several related computer systems;

FIG. 20 is a flow chart comprising a representation of a portion of a computer which operates according to a computer program produced according to the flow chart for CUSIP CORRELATION at, for example, a primary computer;

FIG. 21 is a flow chart comprising a representation of a portion of a computer which operates according to a computer program produced according to the flow chart for VOTE CALCULATION at, for example, the primary computer;

FIG. 22 is a flow chart comprising a representation of a portion of a computer which operates according to a computer program produced according to the flow chart for VOTE APPORTIONING at, for example, the primary computer;

FIG. 23 is a flow chart comprising a representation of a portion of a computer which operates according to a computer program produced according to the flow chart for EFCC PARTICIPANT MEMBER FIRM AND COMPANY NOTIFICATION at, for example, the primary computer; and FIG. 24 is a flow chart comprising a representation of a portion of a computer which operates according to a computer program produced according to the flow chart for EFCC PARTICIPANT MEMBER COMPUTER.

IV. Corporate Exchange And Creation Mode

Figure 25:
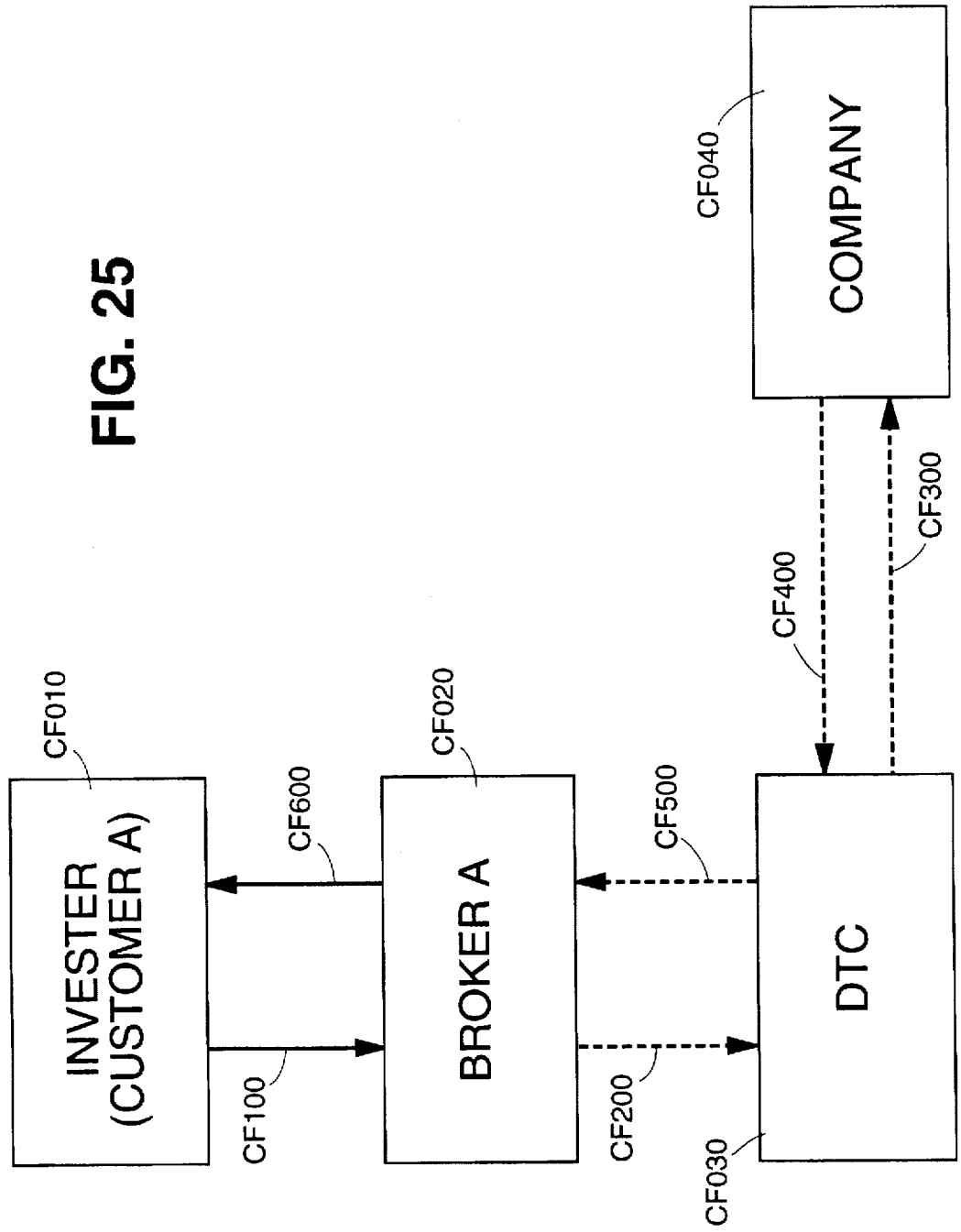
Figure 25A:
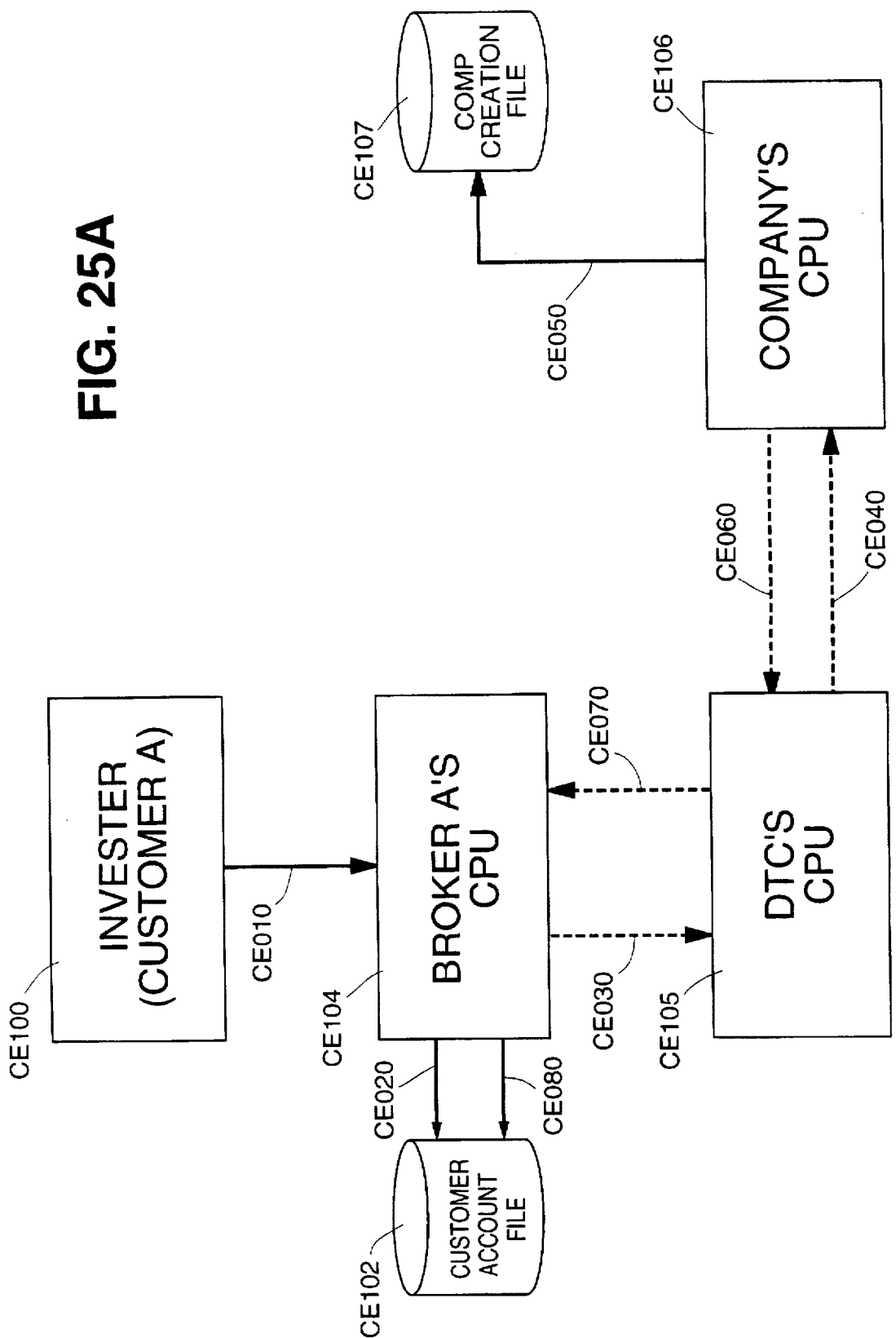
Figure 26:
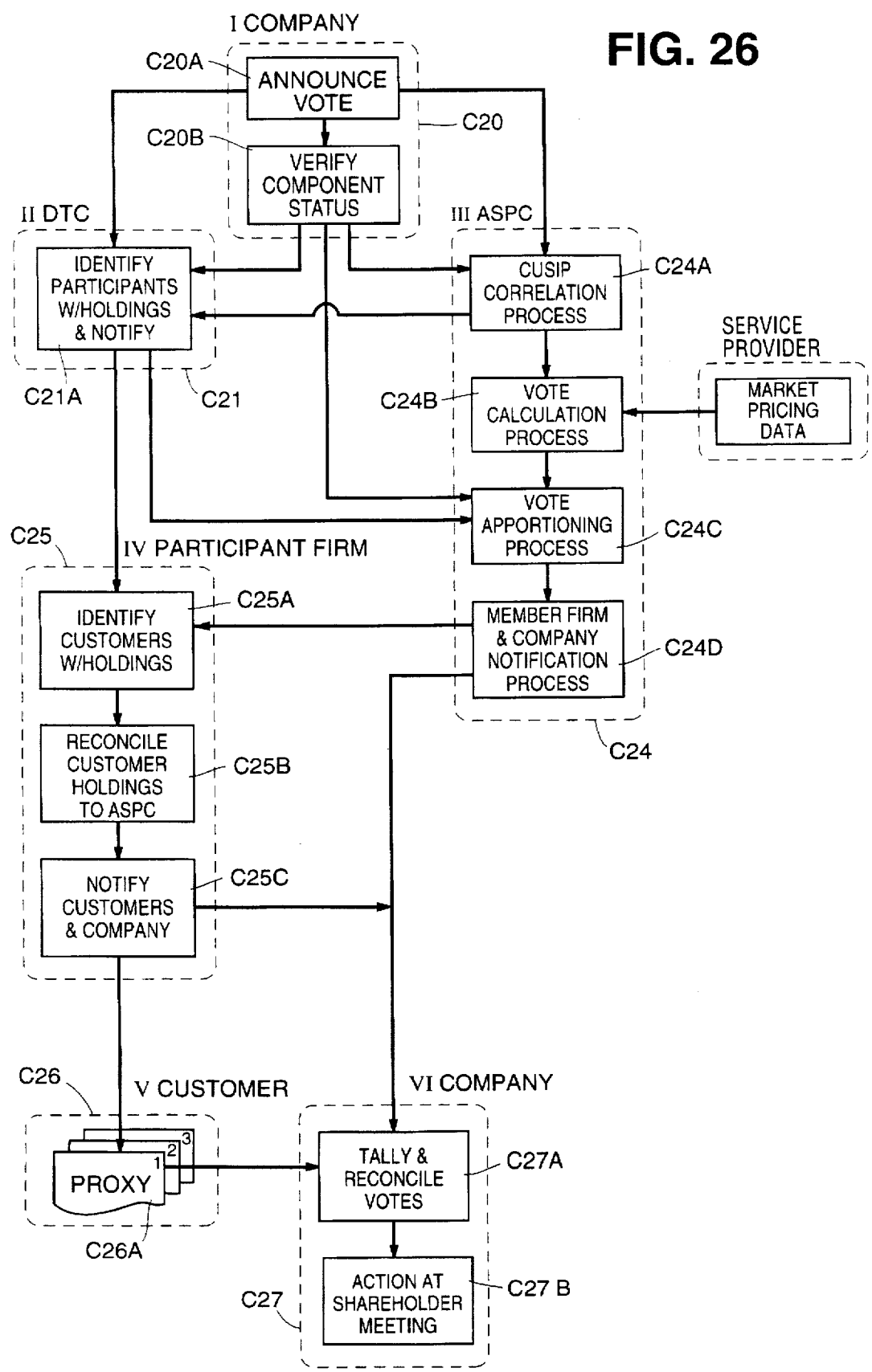
Figure 27:
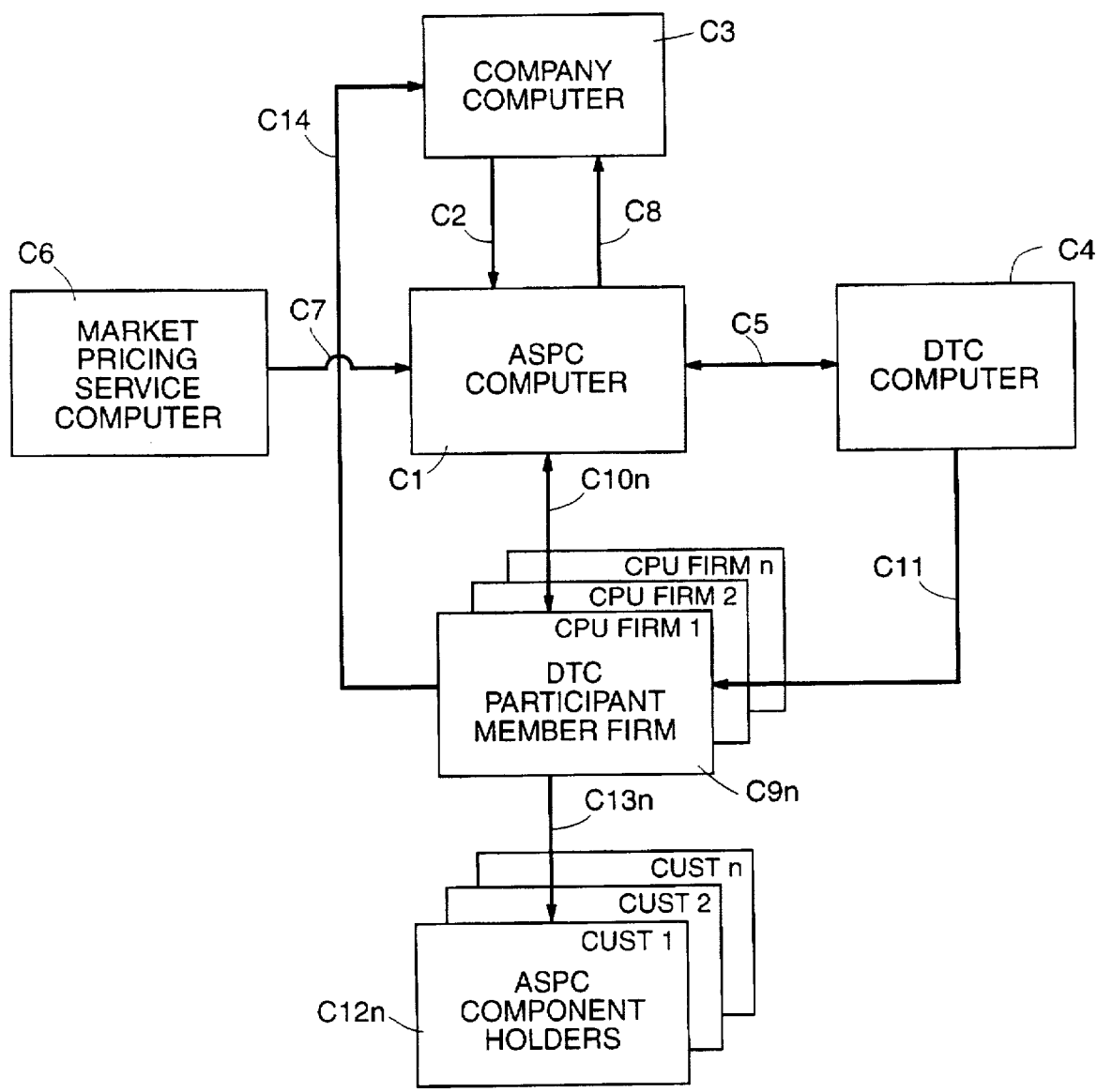
Figure 28:
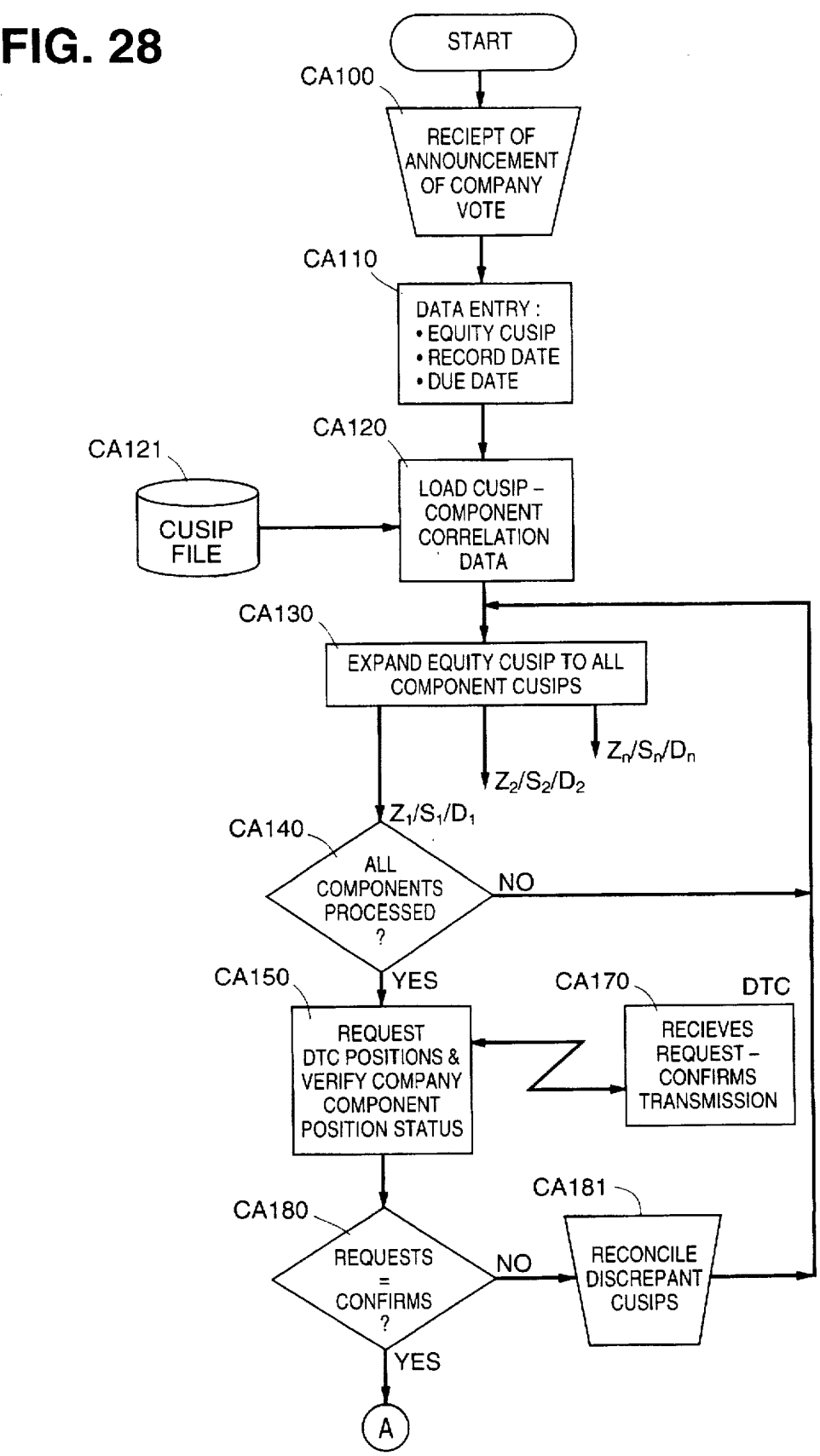
Figure 29:
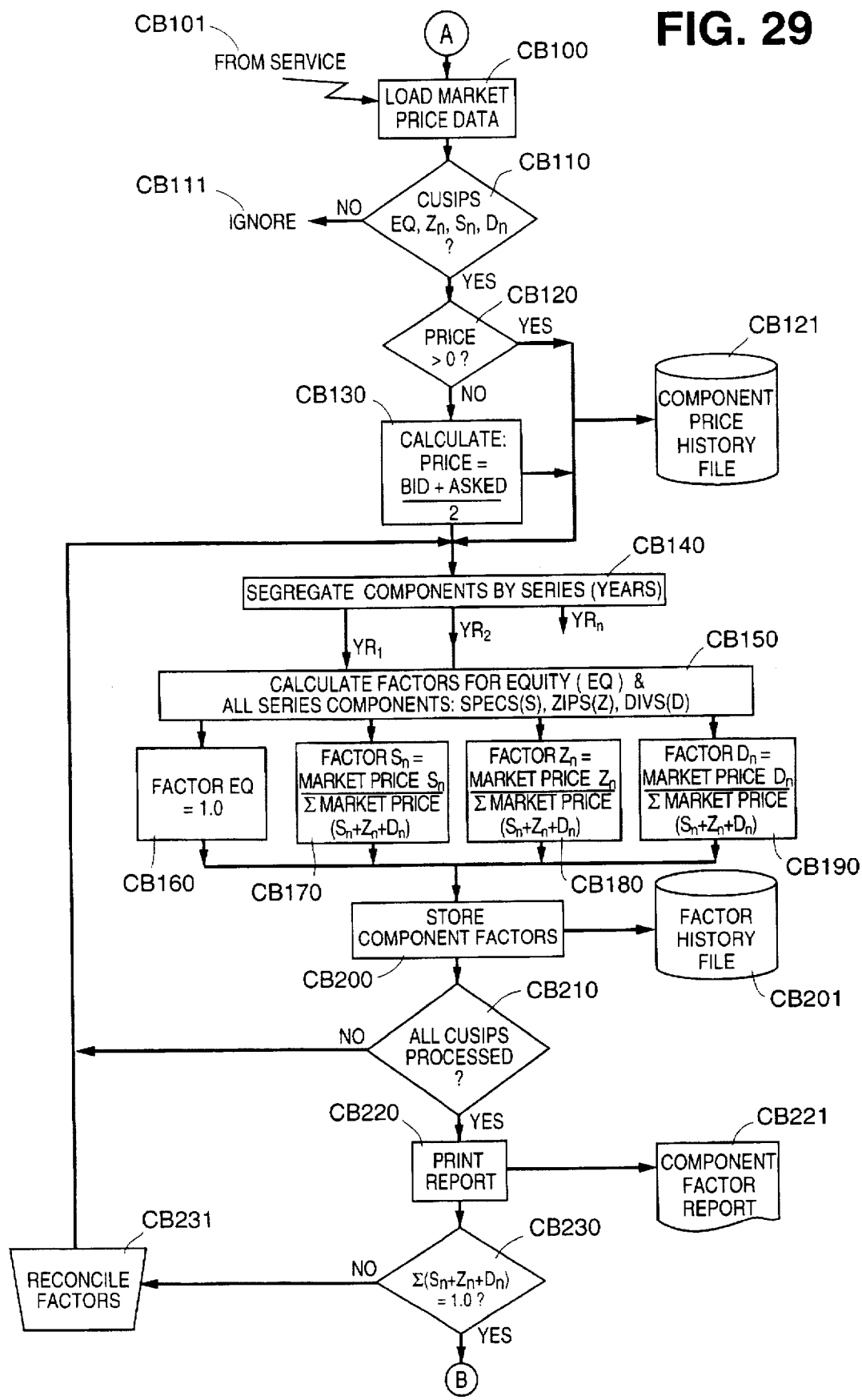
Figure 30:
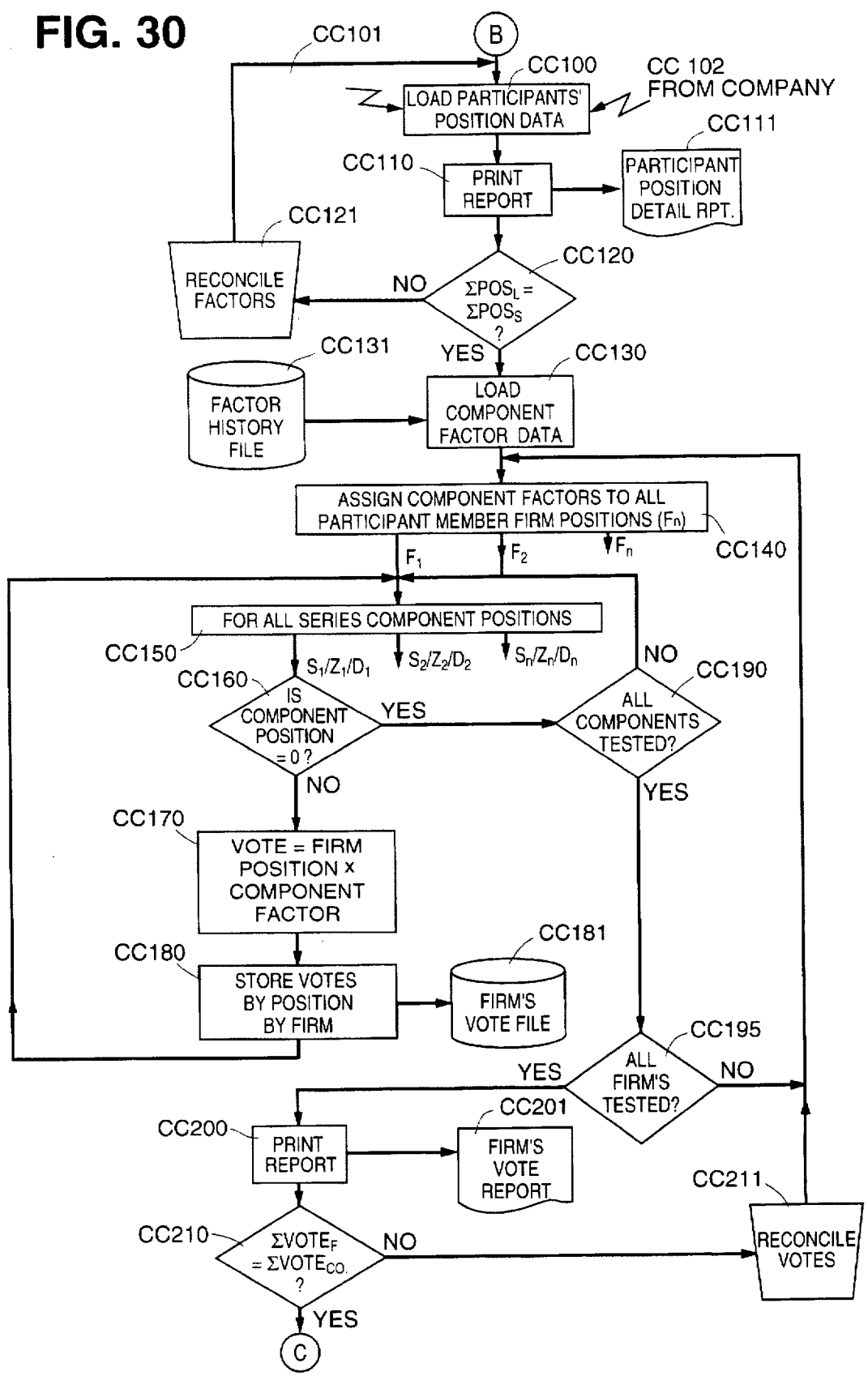
Figure 31:
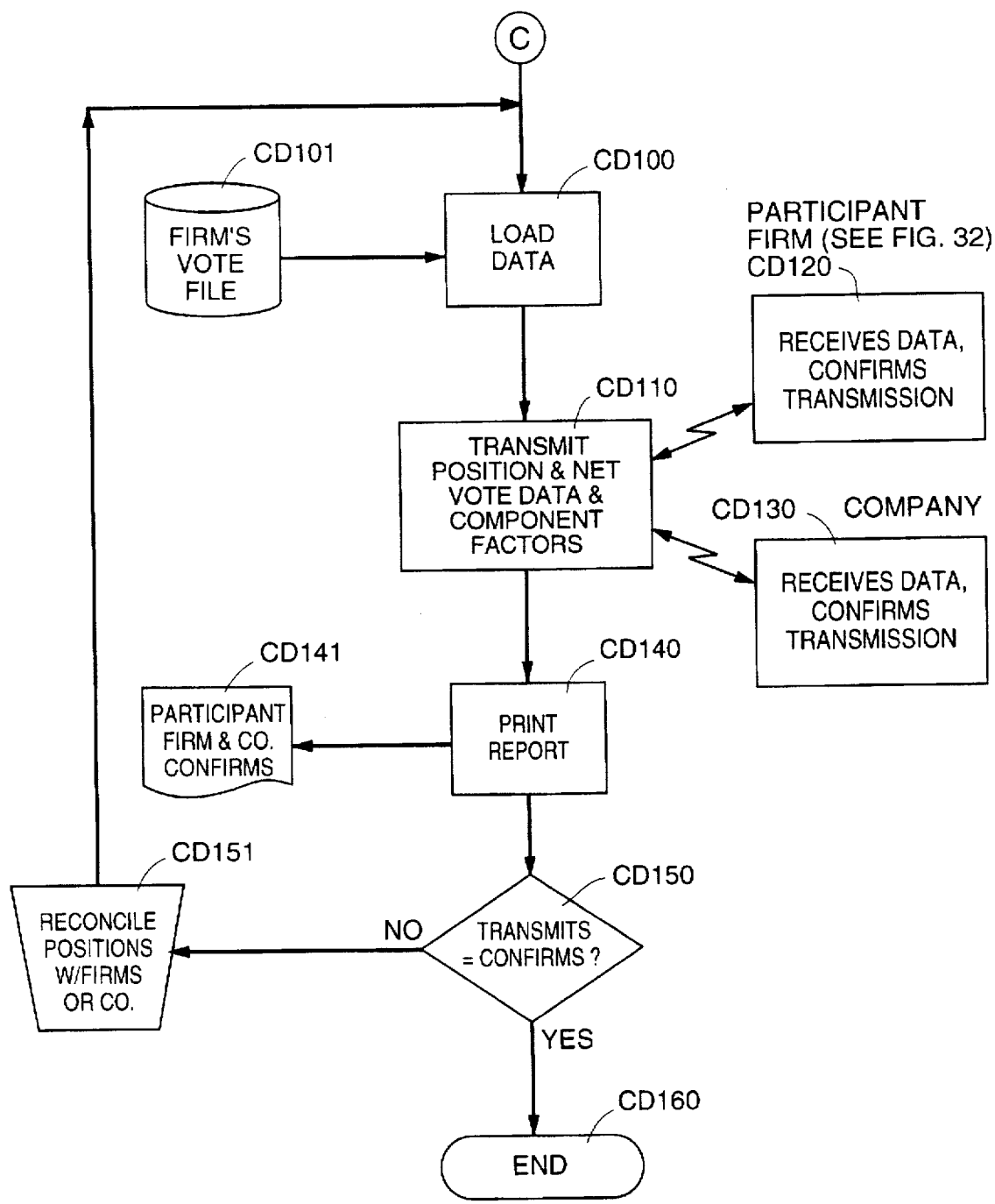
Figure 32:
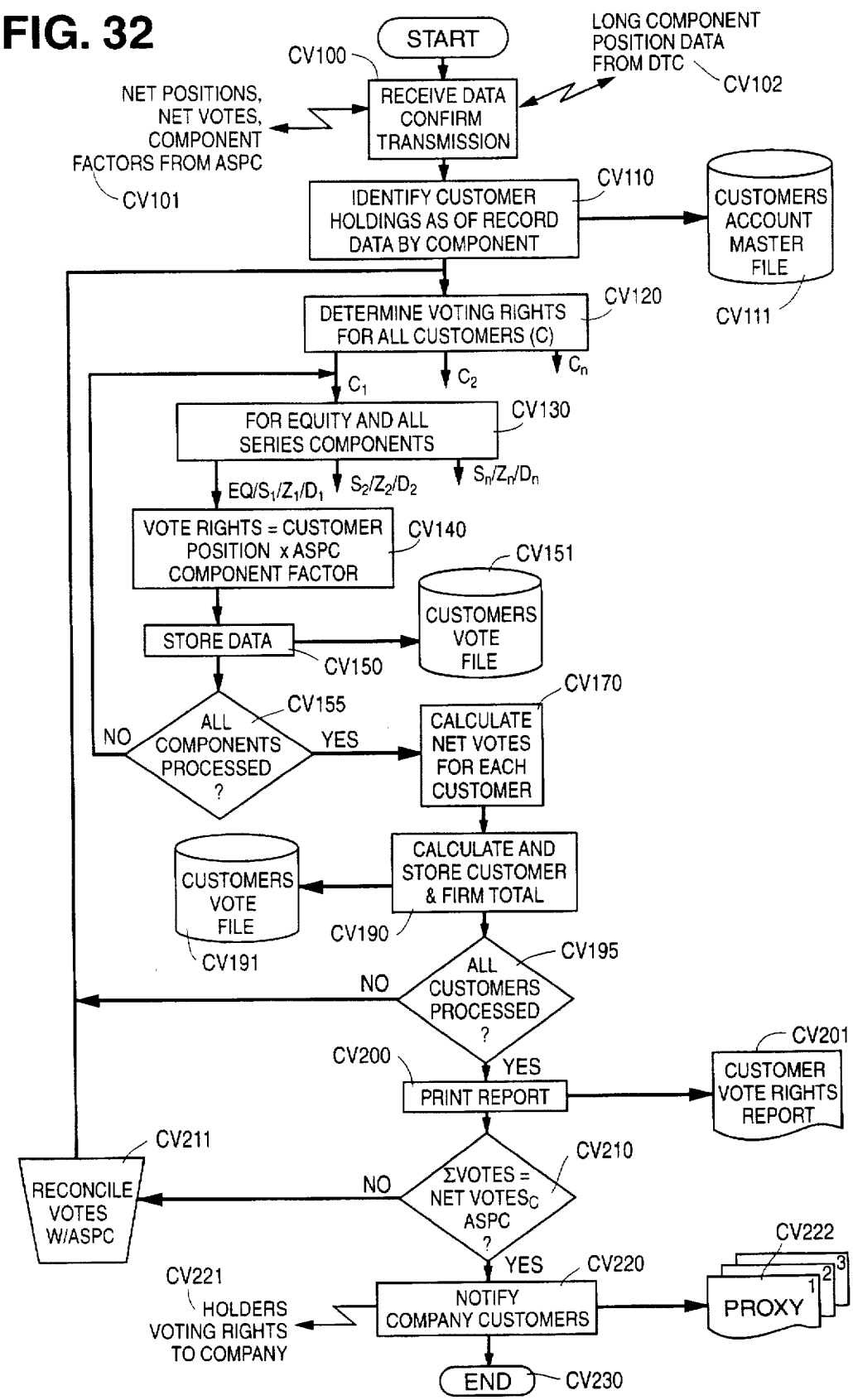

FIG. 25 (CORPORATE EXCHANGE AND CREATION MODE) and FIG. 25a (DATA FLOW DIAGRAM FOR CORPORATE EXCHANGE AND CREATION MODE) are schematic diagrams showing the creation of components and data flow in the equity mode;

FIG. 26 is a schematic diagram of the overall system outlining the relationships and flows of data among units involved in this invention;

FIG. 27 is a schematic diagram of the system which shows the interaction of the several related computer systems;

FIG. 28 is a flow chart comprising a representation of a portion of a computer which operates according to a computer program produced according to the flow chart for CUSIP CORRELATION at, for example, a primary computer;

FIG. 29 is a flow chart comprising a representation of a portion of a computer which operates according to a computer program produced according to the flow chart for VOTE CALCULATION at, for example, the primary computer;

FIG. 30 is a flow chart comprising a representation of a portion of a computer which operates according to a computer program produced according to the flow chart for VOTE APPORTIONING at, for example, the primary computer;

FIG. 31 is a flow chart comprising a representation of a portion of a computer which operates according to a computer program produced according to the flow chart for DTC PARTICIPANT MEMBER FIRM AND COMPANY NOTIFICATION at, for example, the primary computer; and FIG. 32 is a flow chart comprising a representation of a portion of a computer which operates according to a computer program produced according to the flow chart for DTC PARTICIPANT MEMBER COMPUTER.

Figure 2:
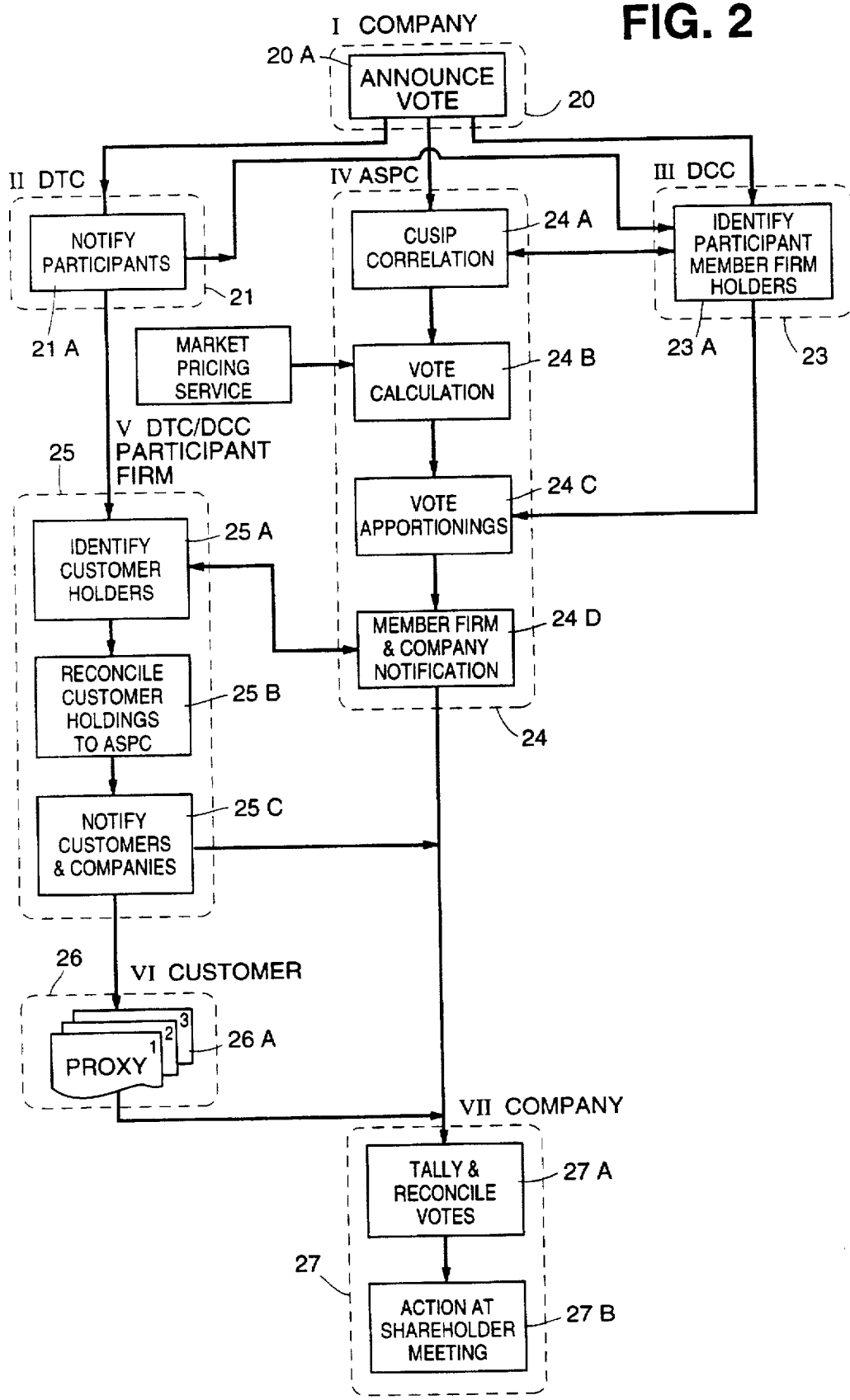
FIG. 2 is a schematic diagram of the overall system outlining the relationships and flows of data among units involved in this invention.
Figure 3:
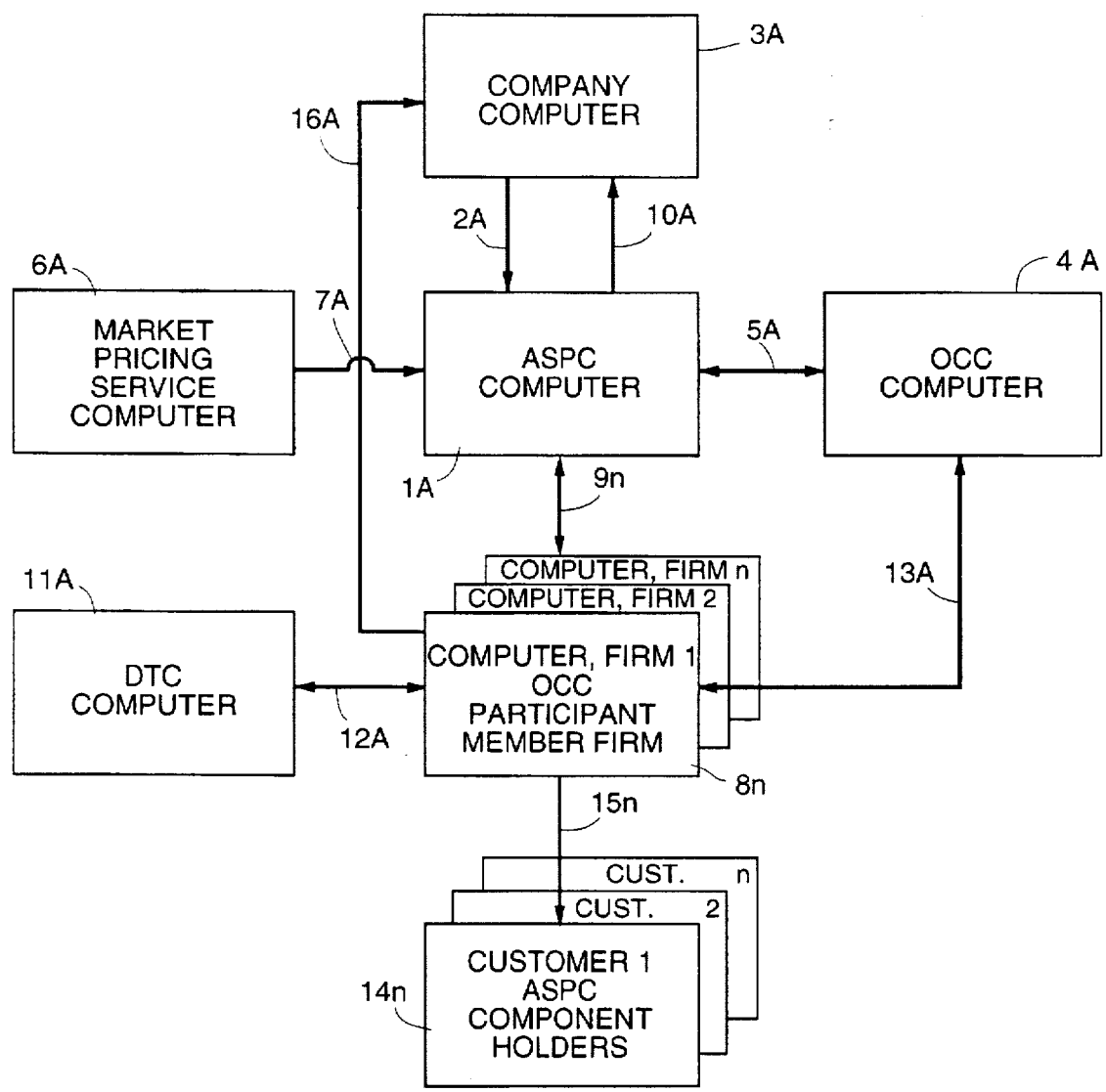
FIG. 3 is a schematic diagram of the system which shows the interaction of the several related computer systems.

Before referring to the drawings in detail, it will be understood that for purposes of clarity, each computer apparatus represented in block diagrams, for example, in FIGS. 2 and 3, utilize, for example, a digital computer processor which includes such hardware as a central processing unit, program and random access memories, timing and control circuitry, input-output interface devices and other conventional digital subsystems necessary to the operation of the central processing unit as is well understood by those skilled in the art. Magnetic memory storage disks (hard drive) are also utilized. The processors operate according to the computer programs produced according to the flow charts represented in the drawings.

I. Option Mode

Figure 1:
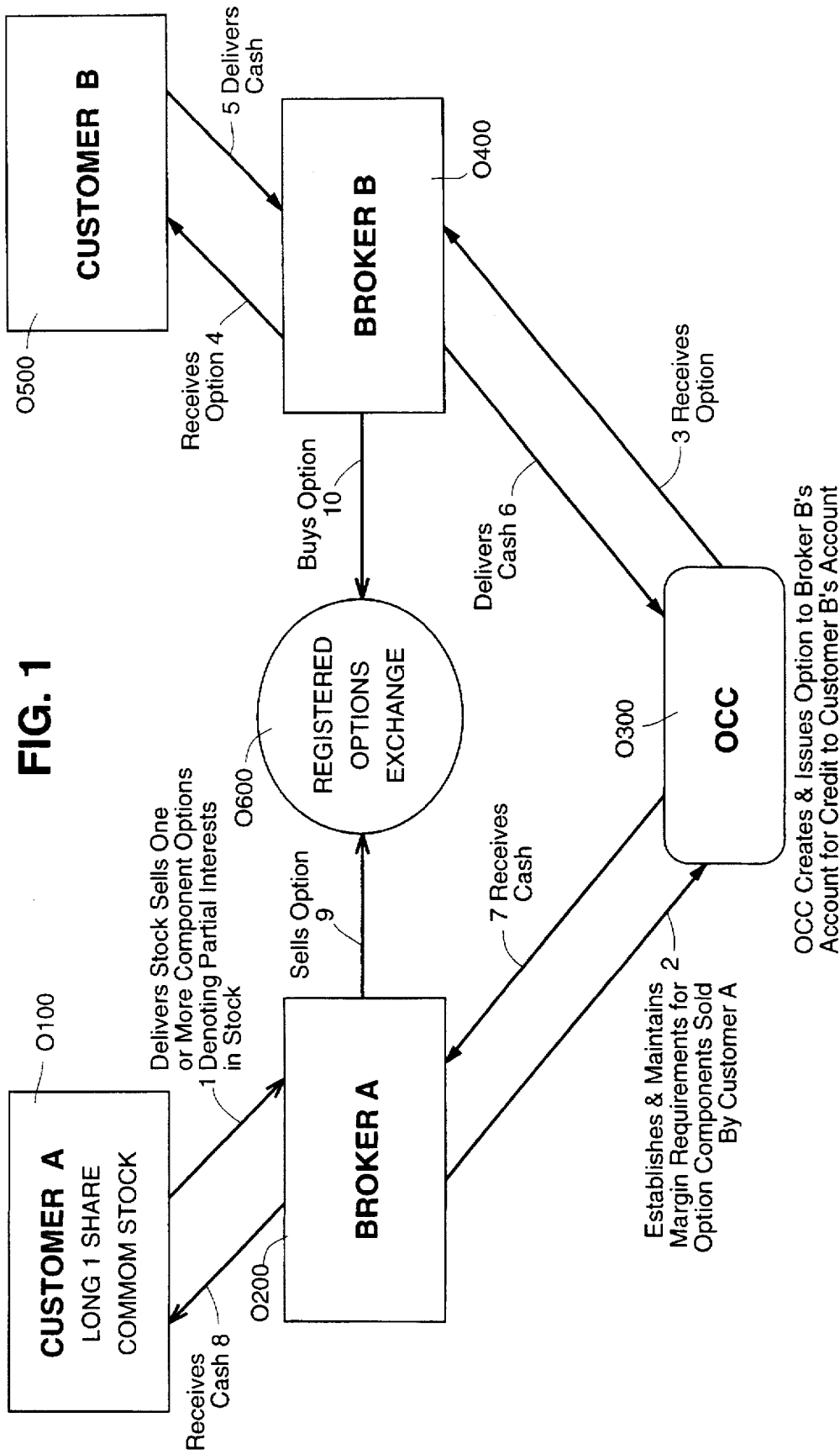
FIG. 1 (OPTION MODE CREATION TRADE) and FIG. 1a (DATA FLOW DIAGRAM FOR OPTION MODE CREATION TRADE) are schematic diagrams showing the creation of components and data flow in the option mode.

Referring now to FIG. 1 of the drawings, there is represented diagrammatically a transaction involved in the creation and trading in the option mode of one or more DIVS$^{SM}$, SPECS$^{SM}$ or ZIPS$^{SM}$.

As represented in FIG. 1, a system for creating options, each of which represents an interest in a share of stock of an entity comprises computer input and memory means for allocating to a customer's account options that are any of: (a) a component interest indicative of the right to receive a partial share of stock equal in value to a stipulated price or a full share of stock of the entity on a predetermined future date, whichever is the lesser value; (b) a component interest indicative of the right to receive a partial share of stock equal in value to the appreciation, if any, of the share of stock above the stipulated price on the predetermined date; (c) a component interest indicative of the right to receive substitute dividends declared with respect to a given stock and a given date which is prior to the predetermined future date and which goes to zero value at the predetermined future date. The system also includes computer memory means for recording the sale from the customer's account of options that are any of components (a), (b), (c), as described more fully with reference to FIG. 1a.

As represented diagrammatically in FIG. 1, Box 0100, Customer A is long one share of common stock, by which it is meant that he owns common stock carried in his account at Broker A (Box 0200). As represented by arrow 1, Customer A represented by Box 0100 sells one or more options for DIVS$^{SM}$, ZIPS$^{SM}$ or SPECS$^{SM}$ through Broker A, represented by Box 0200.

The sale by Customer A, through Broker A, is done on a registered option exchange, represented by Box 0600. This exchange preferably has standardized contract specifications arranged in conjunction with the owner of the primary computer (ASPC). As indicated by arrow 2, Broker A establishes and maintains margin (at OCC) for any option component sold by Customer A. OCC creates and issues an option to Broker B's account, represented by Box 0400 for credit to Customer B's account, represented by Box 0500. As represented by arrow 3, Broker B receives the option and as represented by arrow 4, Customer B receives the option. As represented by arrow 5, Customer B delivers cash to Broker B, who as represented by arrow 6, delivers cash to OCC. As indicated by arrow 7, Broker A receives cash from OCC and as represented by arrow 8, Customer A 0100 receives cash for the option he has sold.

As represented by arrow 9, the sale of the option by Broker A is through a registered options exchange 0600. Broker B buys the option from Broker A through the registered options exchange 0600, as indicated by arrow 10.

Figure 1A:
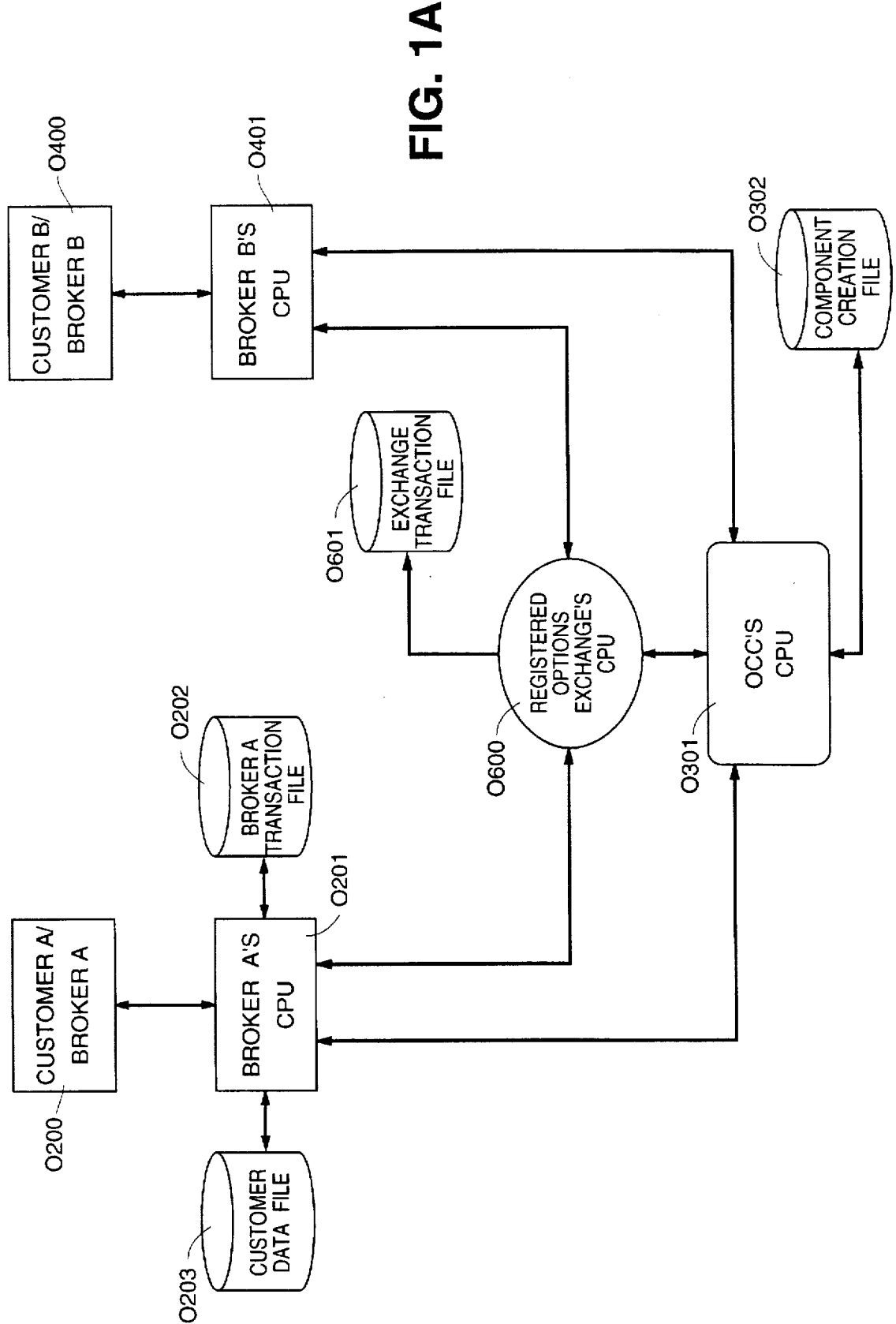

Referring now to FIG. 1a, customer A establishes an account with Broker A 0200 and deposits shares of a company's common stock in his account with Broker A. Broker A 0200 then stores information about Customer A and his stock positions in a magnetic memory disk file 0203 in his computer system 0201.

Customer A instructs Broker A to sell a component option interest in a common stock.

Broker A's computer 0201 queries his account information memory disk file 0203 for Customer A to ascertain that Customer A has the underlying common stock in his account for the component being sold and created.

Assuming the underlying common stock is there, Broker A enters into his computer transaction file 0202 an order to sell the component as an opening transaction. The floor traders for each customer upon completion of the trade enter the trade in each of their computer systems 0201 and 0401, and the specialist enters information about the trade into the exchange's computer exchange transaction file 0601 which may be stored in a memory storage disk. Customer A's account on the broker's computer system is updated to show that he is short the component sold when confirmation of the sale is received from the registered options exchange. Each broker's computer systems then generate reports for Broker A 0200 and Broker B 0400 indicating the results of the trade. Then the brokers report the trade to their respective customers.

When a trade is complete the exchange's computer systems transmit data about the trade to the computer system at an option clearing corporation (OCC) 0301. This computer system accumulates all opening and closing trades for each component by broker. The OCC component creation file 0302, which may be stored in a memory storage disk, registers the component which OCC has created.

For each opening sale of a component OCC's computer system 0301 causes a component option to be created in the computer record of the buying broker's account 0401 to complete the trade. After the close of trading OCC's computers transmit a report showing the net change in position for each component that each broker traded that day. The broker's computer systems reconcile this net change with the trades the broker made that day. When this is finished the individual customer's account information, stored in the broker's computer system, such as Broker A's transaction file 0202, which may be stored in a memory storage disk 0202, is updated to reflect the trades the customer's made that day. Each day OCC and the participant member firms adjust maintenance margins to reflect the change in value of the net position they have in component options at OCC.

Referring now to FIG. 2, a Company 20 utilizes computer means 20A for announcing its intent to solicit votes from its stockholders. The computer means 20A communicates with computer means 21A for notifying participant members of Depository Trust Corporation (DTC) 21 which, on behalf of its participant members may serve as the repository for the company's equity. As it learns of shareholder voting matters, the computer means 21A disseminates this information to its participants. For example, the DTC computer means 21A notifies OCC 23 and the DTC/OCC participant firm 25.

The OCC participant firm 25 has computer means 25A for identifying customer holdings, computer means 25B for reconciling component holdings (long and short) to ASPC and computer means 25C for notifying customers and the company.

An Options Clearing Corporation (OCC) 23 maintains records that identify all holders (long and short option contracts) of ZIPS$^{SM}$, SPECS$^{SM}$ and DIVS$^{SM}$. OCC 23 utilizes computer means 23A for identifying participant member holdings.

ASPC 24, owner of the primary computer, utilizes computer means for CUSIP correlation which is necessary to properly apportion component-holder voting rights. ASPC requests from OCC via computer means 23A information that identifies participant holders of record of either long and/or short positions for specified components pertinent to a shareholder vote.

ASPC 24, the owner of the primary computer has computer means for performing four basic tasks in order to establish the voting rights for eligible component-holders:

1. CUSIP correlation computer means 24A for correlating the equity at issue to the corresponding created components: SPECS$^{SM}$, ZIPS$^{SM}$ and DIVS$^{SM}$;
2. vote calculation computer means 24B for calculating the proper voting rights for each of these components;
3. vote apportioning computer means 24C for apportioning the correct number of votes to each OCC participant (as identified by OCC) for each component;
4. computer means 24D notifies all OCC participant members, maintaining component positions of their voting rights.

The OCC participant firm 25, upon receipt of the voting information utilizes a similar computer system to that of ASPC to further apportion the net long and net short vote among its customers as previously described. Ultimately proxies are forwarded to all eligible holders identifying the customer's 26 detailed, as well as net, voting rights.

The customer 26 votes and returns a proxy 26A to the company 27. The company 27 utilizes computer means 27A for tallying and reconciling all votes submitted and, as indicated by Box 27B, takes corresponding action at its shareholder meeting.

Referring now to FIG. 3 of the drawings, a company computer 3a or public channels 2a enters relevant information concerning a stockholder vote into the ASPC computer 1a. This information indicates that company 3a wishes to solicit votes from its stockholders.

On the stock of record date the ASPC computer 1a initiates a request for data from the OCC computer 4a in order to identify member firms holding positions of all components. This communication occurs over a communication link 5a. This will be explained more fully in connection with FIG. 4.

The ASPC computer 1a then calculates the pro rata voting right applicable to each of the components (as more fully explained in connection with FIG. 5). In order to accomplish this, the ASPC computer receives market pricing data from an external market pricing service computer 6a by means of an electronic medium communicated through a communication link 7a.

The ASPC computer next apportions the net long and net short votes among the holders of record identified by OCC (as will be described in more detail in connection with FIG. 6) and notifies all such OCC participants 8n of their net applicable long and/or short votes via a communication link 9n. While only one OCC participant 8n and one communication link 9n are represented in FIG. 3, it will be understood that a plurality of firms are in data communication with the ASPC computer 1. The total number of partial interests and corresponding votes apportioned among the OCC participants is then communicated over a link 10a to the company computer 3a, as will be explained more fully in connection with FIG. 7.

The OCC participant member's computer 8n additionally receives data directly from DTC's computer 11a via communication link 12a as well as the OCC computer 4a via communication link 13a to account properly for all its customers' holdings, including the ASPC-created components, and to apportion voting rights correctly among its customers for the specific vote solicitation, as will be explained more fully in connection with FIG. 8. Individual customers 14n are sent proxies by established means 15n and the total number of proxies (votes) distributed is reported to the company computer 3a as required over link 16a. From this point the standard vote solicitation procedures continue to be made by the company.

Figure 4:
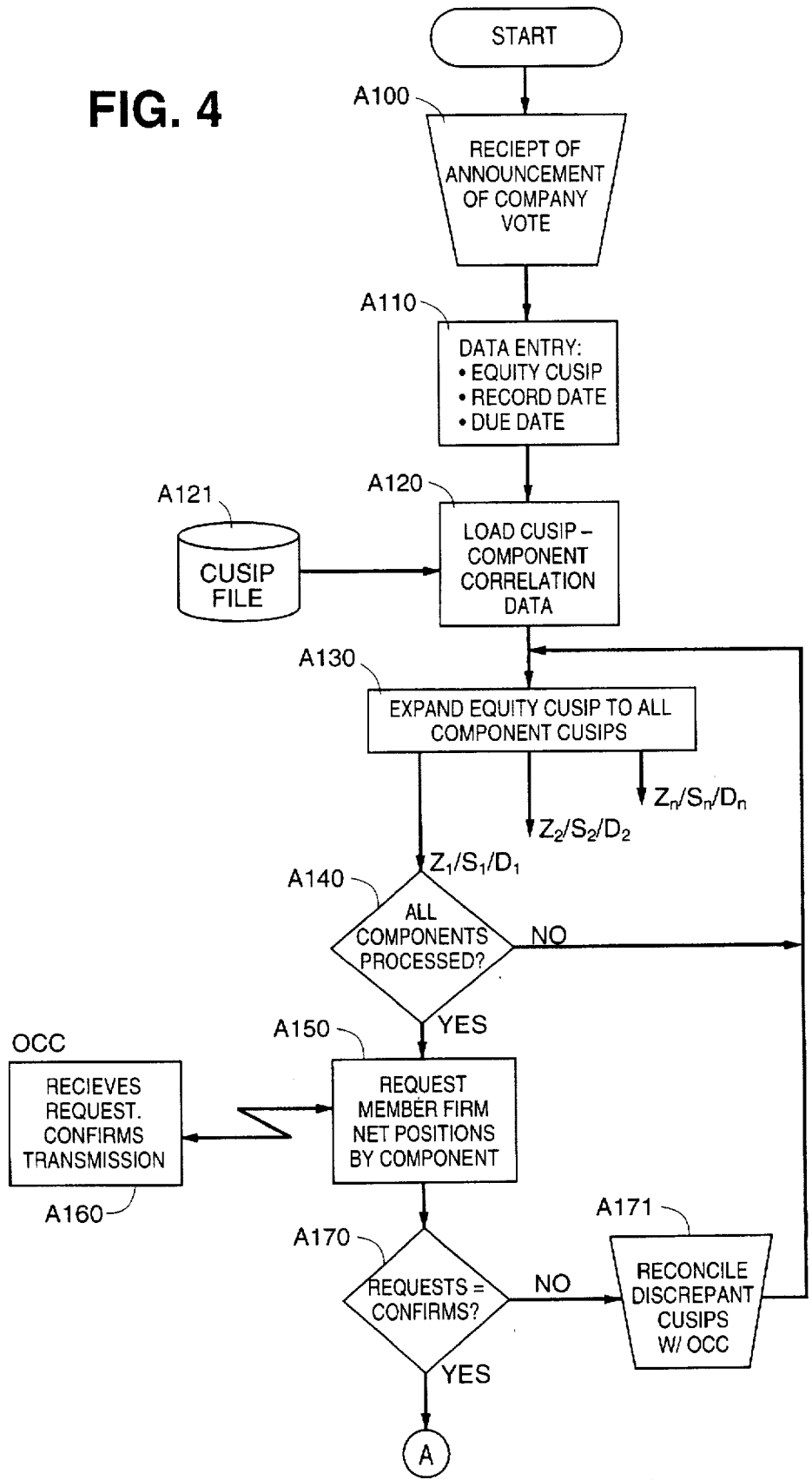
FIG. 4 is a flow chart comprising a representation of a portion of a computer which operates according to a computer program produced according to the flow chart for CUSIP CORRELATION at, for example, a primary computer.

Referring now to FIG. 4, the ASPC CUSIP correlation computer will be described with reference to the flow chart. The ASPC computer includes a computer portion A100 for receiving an announcement of a shareholder vote to be taken by a company.

The ASPC computer includes means for manually entering pertinent data concerning the vote to initiate operation of the system. This data includes the equity CUSIP number, the record date and the due date.

A CUSIP file or memory storage means, for example a computer disk, A121 is loaded into a computer portion A120 for loading CUSIP component correlation data. This is done in order to match the equity with its multiple ZIPS$^{SM}$, SPECS$^{SM}$ and DIVS$^{SM}$ for each of the Annual and/or Termination Claim (TC$^{SM}$) Series (there being at least one series anticipated per year of maturity). The CUSIP correlation file contains a unique CUSIP number for every series component created by ASPC.

The ASPC computer comprises a portion A130 for expanding the equity CUSIP to all component CUSIPs. The computer portion matches the equity CUSIP with the component CUSIP numbers. These have been denoted $Z_1$, $S_1$ and $D_1$, respectively, for the ZIPS$^{SM}$, SPECS$^{SM}$ and DIVS$^{SM}$ of year$_1$, respectively, and continuing through year$_n$.

The ASPC computer includes a portion A140 for inquiring "are all components processed?" The portion A140 has a "no" output which is connected back to the input of portion A130 for repeating the matching of the equity CUSIP with the component CUSIP numbers until all the related component CUSIP numbers have been found for the requested equity CUSIP.

The "yes" output of the computer portion A140 is coupled to a "request member firm net positions by component" computer portion A150 which requests from OCC the identification of all OCC participant members holding any positions of any of the above mentioned component CUSIP numbers.

The OCC computer portion A160 receives the request and returns confirmation of the requested identification to ASPC computer portion A150. A "requests=confirms?" computer portion A170 insures that the data requested is consistent with the data confirmed. If not, computer portion A171 is means for manually reconciling any discrepancy and the OCC computer portions repeat their operation until the data requested is consistent with that which has been confirmed.

Figure 5:
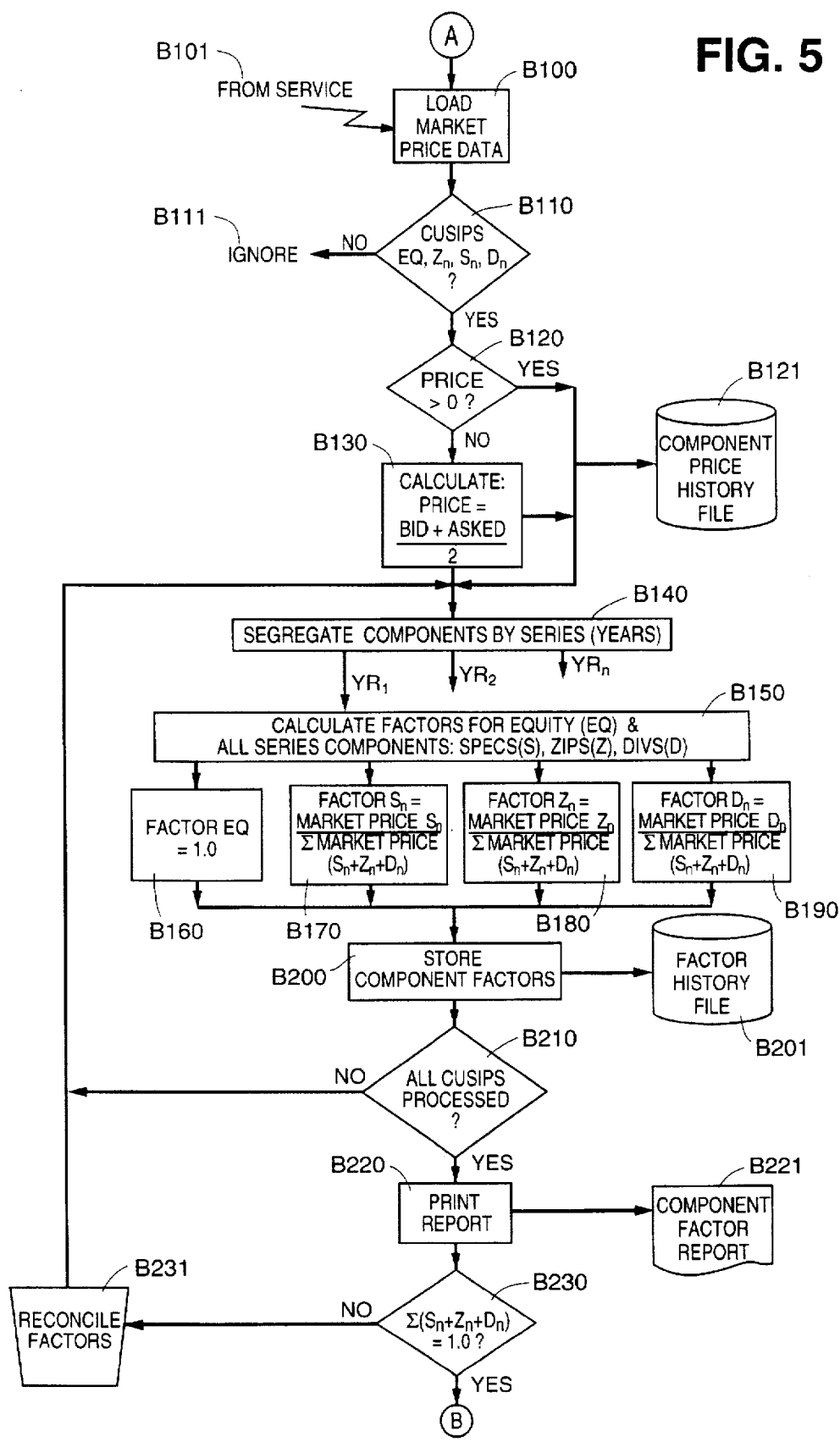
FIG. 5 is a flow chart comprising a representation of a portion of a computer which operates according to a computer program produced according to the flow chart for VOTE CALCULATION at, for example, the primary computer.

The "yes" output of the computer portion A170 is connected to the ASPC vote calculation computer portion represented in FIG. 5. The vote calculation computer portion includes a "load market price data" computer portion B100 for loading the market price data supplied from a service B101 into the system to begin the vote calculation. The pricing preferably is the closing market price as of the close on the stock of record date on any exchange where traded, or as determined by specific contract agreements.

The computer portion B100 is coupled to a "CUSIP=EQ, $Z_n$, $S_n$, $D_n$?" computer portion B110. Computer portion B110 determines that only CUSIP numbers with any claim to a voting right are considered (denoted as EQ, $Z_n$, $S_n$ and $D_n$ for the equity, ZIPS$^{SM}$, SPECS$^{SM}$ and DIVS$^{SM}$ for all series, respectively). All other CUSIP numbers are ignored, as indicated by the "no" output to B111 "ignore" computer portion from portion B110.

A "is price greater than 0?" computer portion B120 determines if a market price exists for a CUSIP (that is, its price is greater than zero dollars). The "yes" output of computer portion B120 is coupled for storage to the component price history file computer portion B121 which may be, for example, a computer storage disk.

The "no" output of the computer portion B120 is coupled to a $$\text{"calculate: price} = \frac{\text{bid} + \text{asked}}{2}\text{"}$$

computer portion B130. If any equity or component is not traded on a given day (that is, its price is either absent or zero), computer portion B130 calculates its value by determining the mean of the bid and asked prices. This computed value is stored in the component price history file B121.

The output of computer portion B130 is coupled to a "separate components by series (years)" computer portion B140. In order to establish component voting rights, computer portion B140 groups all components by series (that is, by Termination Date (TD$^{SM}$) and/or Termination Claim (TC$^{SM}$) in which they mature). The outputs of computer portions B140 are coupled by year, that is, YR$_1$, YR$_2$ ... YR$_n$ to computer portion B150 "calculate factors for equity (EQ) & all series components: SPECS$^{SM}$ (S), ZIPS$^{SM}$ (Z), DIVS$^{SM}$ (D)," computer portion B150. Within each series, the computer portion B150 segregates the individual components so that unique component factors can be calculated for each. A "factor EQ=1.0" computer portion B160 sets the component factor for the equity at 1.0.

$$\text{A "factor } S_n = \frac{\text{market price } S_n}{\Sigma \text{ market prices } (S_n + Z_n + D_n)} \text{ " computer}$$

portion B170 determines the component factor for the SPECS$^{SM}$, for the year$_n$ by dividing the market price of the SPECS$^{SM}{}_n$ by the sum of the market prices for each of the ZIPS$^{SM}$, SPECS$^{SM}$ and DIVS$^{SM}$ for the same year$_n$.

$$\text{A "factor } Z_n = \frac{\text{market price } Z_n}{\Sigma \text{ market prices } (S_n + Z_n + D_n)} \text{ " computer}$$

portion B180 determines the component factor for the ZIPS$^{SM}$ for the year$_n$ by dividing the market price of the ZIPS$^{SM}{}_n$ by the sum of the market prices for each of the ZIPS$^{SM}$, SPECS$^{SM}$ and DIVS$^{SM}$ for the same year$_n$.

$$\text{A "factor } D_n = \frac{\text{market price } D_n}{\Sigma \text{ market prices } (S_n + Z_n + D_n)} \text{ " determines the}$$

component factor for the DIVS$^{SM}$ for the year$_n$ by dividing the market price of the DIVS$^{SM}{}_n$ by the sum of the market prices for each of the ZIPS$^{SM}$, SPECS$^{SM}$ and DIVS$^{SM}$ for the same year$_n$.

A "store component factors" computer portion B200 then stores the component factors in a factor history file B201, which may be a computer disk.

The computer portion B200 is also coupled to an "all CUSIPS processed?" computer portion B210, having a "no" output coupled to the input of the B140 computer portion for continuing the operation of the computer until all CUSIPS eligible for voting rights have been calculated and stored.

The "yes" output of the computer portion B210 is coupled to a print report computer portion B220 for printing a component factor report B221, to allow inspection of the data.

As a system control check, a computer portion "$\Sigma(s_n+Z_n+d_n)=1.0$?" computer portion B230 has a "no" output coupled to a "reconcile factors" computer portion B231, which is coupled to the input of computer portion B140. The factors are manually reconciled in computer portion B231, adjustments are made and the computer operation is repeated until the sum equals 1.0. The computer cannot continue its operation until this condition is met.

Figure 6:
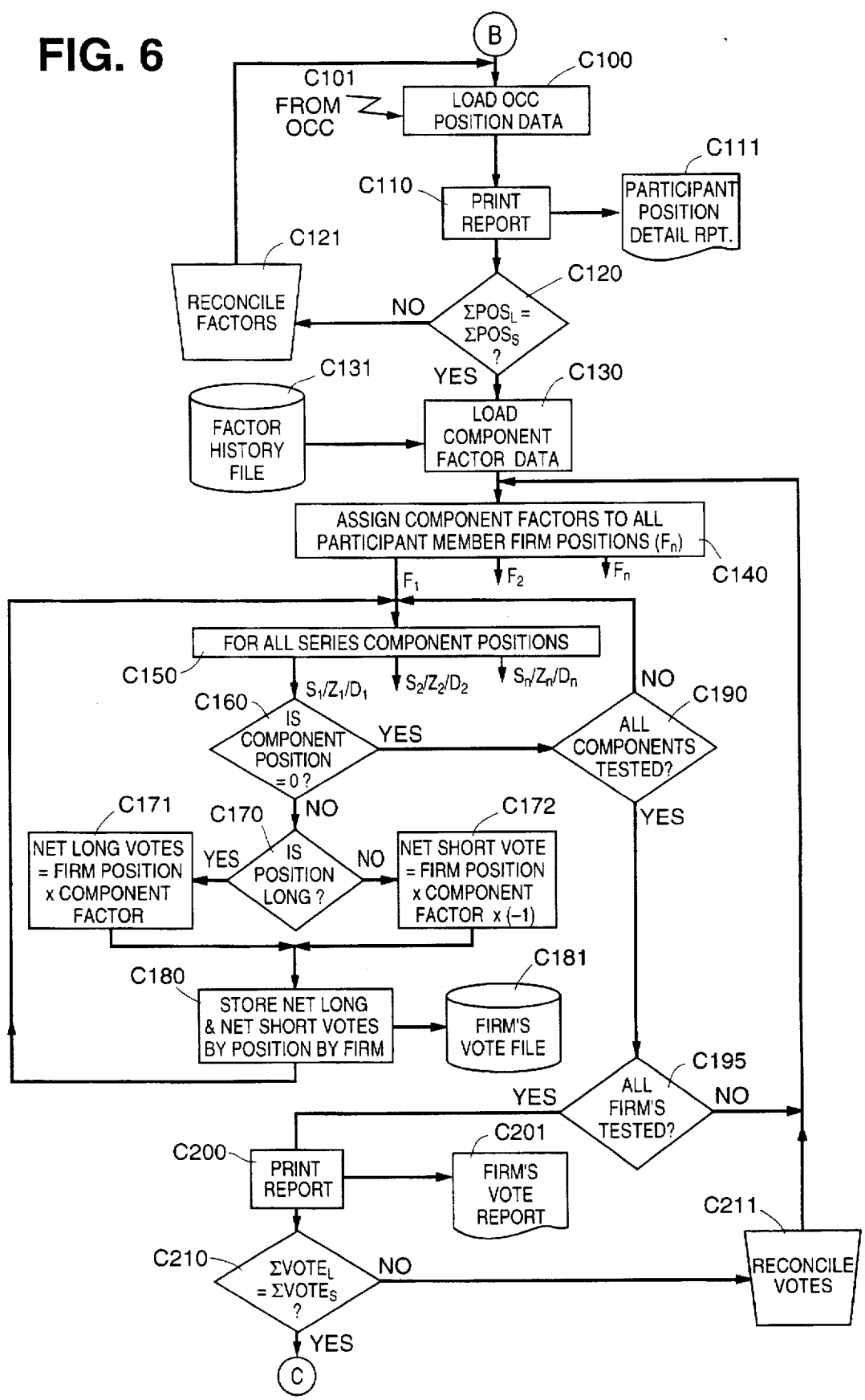
FIG. 6 is a flow chart comprising a representation of a portion of a computer which operates according to a computer program produced according to the flow chart for VOTE APPORTIONING at, for example, the primary computer.

The "yes" output of the computer portion B230 is coupled to the vote apportioning computer portion of ASPC, represented in FIG. 6.

Referring now to FIG. 6, a "load OCC position data" computer portion C100 is coupled to the OCC computer C101 for loading the net OCC member firm positions into the system. A "print report" computer portion C110 prints a report which may be entitled "OOC participant position detail report" (C111) to allow for inspection of the data. A "$\Sigma \text{position}_L = \Sigma \text{position}_S$?" computer portion C120 is provided for checking whether the sum of the long positions for all participants equals the sum of the short positions of all participants. If not, the "no" output of computer portion C120 is coupled to a "reconcile positions" computer portion C121 for manually investigating and making adjustments which is then coupled to the input of the computer portion C100. The system check is repeated until the two sums are equal. The computer cannot continue its operation until this condition is met.

The factor history file C131 is the same factor history file as factor history file B201 for storing the component factors. The factor history file C131 is coupled to a "load component factor data" computer portion C130 to which the "yes" output of computer portion C120 is applied. An "assign component factors to all participant member firm positions ($F_n$)" computer portion C140 is coupled to the output of the computer portion C130 for assigning component factors to all participant positions beginning by reading the data for the first OCC participant member firm ($F_1$)).

A computer portion "for all series component positions" computer portion C150 matches each participant member firm's position against the corresponding component factors for that participant's position (denoted as $Z_n$, $S_n$ and $D_n$ for the ZIPS$^{SM}$, SPECS$^{SM}$ and DIVS$^{SM}$ for all series, respectively). A "is firm position=0?" computer portion C160 determines whether the participant maintains a position for a particular component. If the participant does maintain a position (that is, his position is not equal to zero), the vote apportioning system continues its operation. If the participant does not maintain a position for a particular component (that is, his position is either absent or equal to zero), the "yes" output of the computer portion C160 continues the search as an input to computer portion C140 for subsequent components.

The "no" output of the computer portion C160 is coupled to a "is position long?" computer portion C170. The "yes" output of the computer portion C170 is applied to a "net long votes firm position times component factor" computer portion C171 for multiplying the long position by the ASPC component factor.

If the position is short, the "no" output of computer portion C170 is applied to a "net short vote=firm position times component factor times (−1)" computer portion C172 for applying its output together with the output of computer portion C171 to a "store net long and net short votes by position by firm" computer portion C180 which applies its output to a firm's vote file memory storage means C181, which may be a computer disk. The processing continues with the next series components in C150.

The "yes" output of C160 is applied to an "All Components Tested?" computer portion C190. The "no" output goes to C150 until all series and components of a particular underlying stock have been processed. The "yes" output of C190 goes to the "All Firms Tested?" computer portion C195. The "no" output of C195 goes to C140 to assign component factors for the next participant member firm. The "yes" output of C195 is applied to a "print report" computer portion C200 which prints a report entitled "participant firm net vote report" as indicated by block C201. The output of computer portion C190 is coupled through the computer portion C200 to a "$\Sigma \text{vote}_L = \Sigma \text{vote}_S$?" computer portion C210 for determining as a system control check whether the sum of the votes for all long components equals the sum of votes for all short components. If not, the "no" output of computer portion C210 is coupled to a computer portion C211 wherein the votes are manually reconciled, adjustments made and the computer operation repeated. The computer operation cannot go forward until this condition is met.

Figure 7:
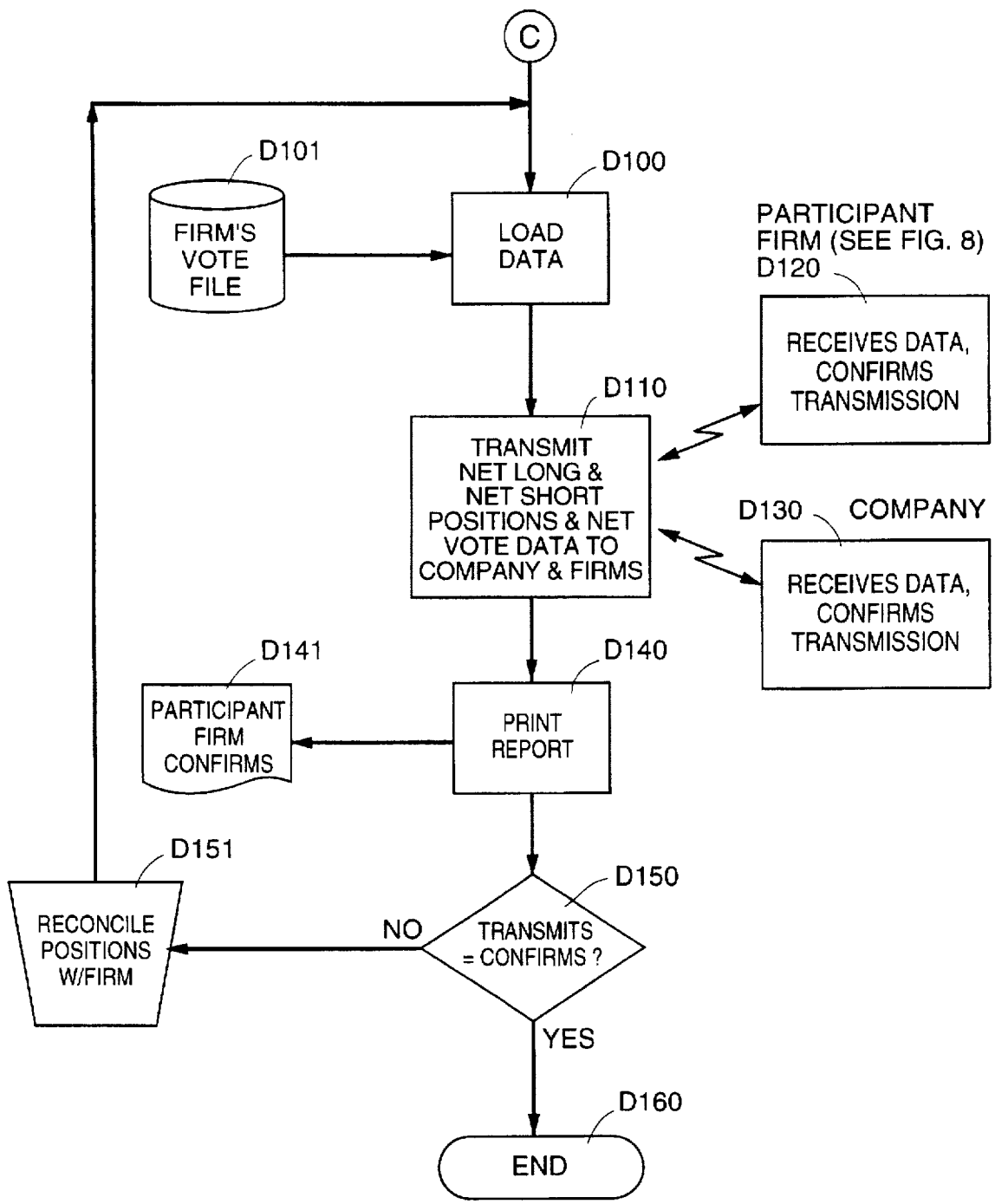
FIG. 7 is a flow chart comprising a representation of a portion of a computer which operates according to a computer program produced according to the flow chart for OCC PARTICIPANT MEMBER FIRM AND COMPANY NOTIFICATION at, for example, the primary computer.

Referring to FIG. 7 of the drawings, the OCC participant member firm's vote file D101, which may be a storage disk, is reloaded into the ASPC computer system at a "load data" computer portion D100. A "transmit net long and net short positions and net vote data to company and firms" computer portion D110 transmits by telecommunications the net long and net short positions and net vote data and component factor to the company as well as to each member firm maintaining any component position, as indicated by blocks D120 and D130.

The participant member firm's (D120) computer receives the data and returns confirmation of such to ASPC. This data should be in complete agreement with daily positions as reported by OCC and confirmed with the participant. As indicated by block D130, the company computer similarly receives the position and vote data and confirms such to the ASPC computer.

A "print report" computer portion D140 prints a report entitled "the participant firm confirmation report" D141 to allow for inspection of the data. A "transmits equal confirms?" computer portion D150 has a "no" output coupled to a "reconcile positions with firm" computer portion D151 for reconciling the discrepancy if the data transmitted does not agree with the confirmation for the participant firm. The computer repeats this operation until the two positions agree. The "yes" output of computer portion D150 completes the ASPC computer data processing. At this point the standard proxy solicitation process becomes operative.

Figure 8:
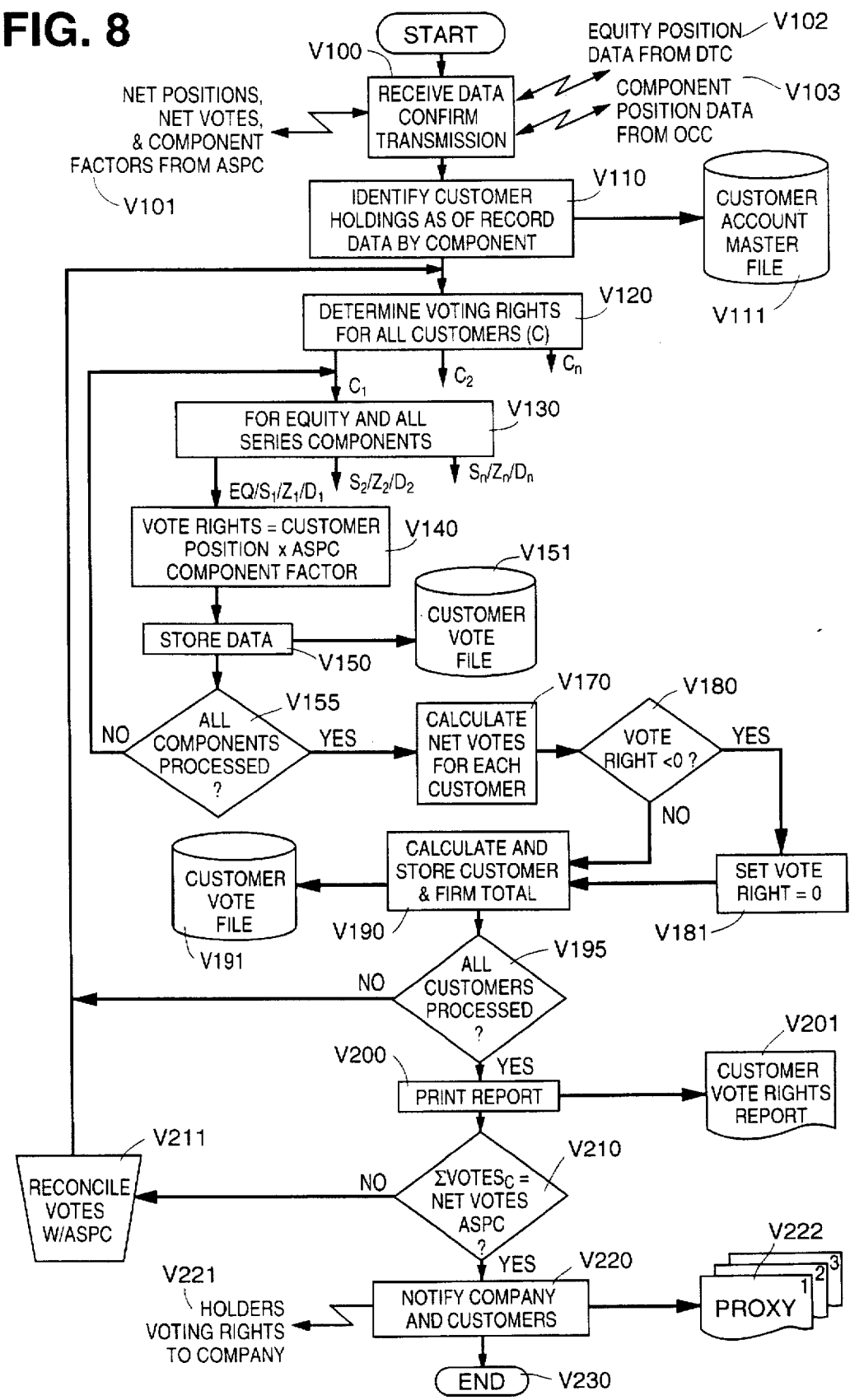
FIG. 8 is a flow chart comprising a representation of a portion of a computer which operates according to a computer program produced according to the flow chart for OCC PARTICIPANT MEMBER COMPUTER.

Referring now to FIG. 8, the OCC participant member firm computer comprises a "receive data, confirm transmission" computer portion V100 which responds to the component factors and net long and net short vote position transmitted by ASPC and sends the confirmation of such to ASPC V101. The participant member firm also receives and reconciles position data from OCC V103 and DTC V102. An "identify customer holdings as of record date by component" computer portion V110 accesses the customer account master file V111, which may be a computer storage disk, in order to identify customers holding any of the relevant components (as identified by their CUSIP numbers) as of the assigned record date.

A "determine voting rights for all customers (C)" computer portion V120 searches each customer file (denoted $C_1$ through $C_n$) to identify component holders.

A "for equity and all series components" computer portion V130 considers only CUSIP numbers with any claim to a voting right (denoted as EQ, $Z_n$, $S_n$ and $D_n$) for the equity, ZIPS$^{SM}$, SPECS$^{SM}$ and DIVS$^{SM}$ for all series, respectively. As an eligible is found, computer portion "vote right= customer position times ASPC component factor" computer portion V140 establishes the customer's voting right by multiplying the position by the ASPC component factor.

A "store data" computer portion V150 stores each such position in the participant member firm's customer vote file (V151), which may be a computer disk.

An "all components processed?" computer portion V155 has a "no" output connected to the input of computer portion V130 to repeat the computer operations until all components have been processed for a customer. The "yes" output of computer portion V155 is coupled to a "calculate net votes for each customer" computer portion V170 which tabulates the net number of votes assignable to each customer.

If the customer's net vote right is negative (less than zero), the "vote right less than 0?" computer portion V180 causes the value to be retained for reference but the eligible vote right is set to zero. This could occur when an investor is short more component votes than he is long shares of the underlying stock.

The "yes" output of computer portion V180 is coupled to a "set vote right=0" computer portion V181 which has its output applied to a "calculate and store firm total" computer portion V190. The computer portion V190 calculates and stores the total eligible votes for each customer and accumulates a total firm vote. This output is applied to a customer vote file V191, which may be a computer disk. The "no" output of computer portion V195 "All Customers Processed" is coupled back to computer portion V120 to get the next customer's position.

The "yes" output of V195 is coupled to a "print report" computer portion V200 prints the customer vote rights report V201, to allow for inspection of the data.

The output of V190 is coupled through V200 to a "$\Sigma votes_c$=net votes ASPC?" V210 which as a system control check determines whether the sum of the eligible customer votes equals the net votes assigned by ASPC. If not, any discrepancies are applied to computer portion V211 "reconcile votes with ASPC" where any discrepancies are manually reconciled by the participant firm, adjustments are made and the computer operation repeats until the amounts are equal. The computer operation cannot go forward until this condition is met.

The "yes" output of the computer portion V210 is applied to a "notify company and customers" computer portion V220, for advising the company of each participant's component holders and their component voting rights, as indicated by block V221. Proxies are then sent to individual customers, as indicated by V222.

Standard proxy solicitation then is made by the company.

II. Equity Mode

Referring now to FIG. 9 of the drawings, there is represented diagrammatically a transaction involved in the creation and trading in the equity mode of one or more DIVS$^{SM}$, SPECS$^{SM}$ or ZIPS$^{SM}$. As represented in FIG. 9, a system for creating stock interests, each of which represents an interest in a share of stock of an entity, comprises computer input and memory means for allocating to a customer's account stock interests that are any of:

(a) a component interest indicative of the right to receive a partial share of stock equal in value to a stipulated price or a full share of stock of the entity on a predetermined future date, whichever is the lesser value;

(b) a component interest indicative of the right to receive a partial share of stock equal in value to the appreciation, if any, of the share of stock above the stipulated price on the predetermined future date;

(c) a component interest indicative of the right to receive dividends declared with respect to given dates which are prior to the predetermined future date and which goes to zero value at the predetermined future date. The system also includes computer memory means for recording the sale from the customer's account of stock interests that are any of components (a), (b), (c), as described more fully with reference to FIG. 9a.

As represented diagrammatically in FIG. 9, Box E010, Customer A is long one share of common stock, by which it is meant that he owns common stock carried in his account at Broker A (Box E020). As represented by arrow E1, Customer A, represented by Box E010, instructs Broker A to sell and create one or more component interests in the underlying common stock for DIVS$^{SM}$, ZIPS$^{SM}$ or SPECS$^{SM}$.

The sale by Customer A, through Broker A, is done on a Registered Equities Exchange E050, authorized by ASPC to trade component interests. This exchange preferably has standardized contract specifications arranged in conjunction with the owner of the primary computer (ASPC). As indicated by arrow E030, Broker A instructs DTC to deliver Customer A's stock to ECC against creation of a sold component. At the same time, as indicated by arrow E031, Broker A instructs ECC to receive Customer A's pledged stock from DTC and to deliver to DTC the created component that Customer A has sold. As represented by arrow E040, DTC delivers stock to ECC in accordance with Broker A's instructions. As indicated by arrow E041, upon delivery of stock from DTC to ECC, ECC delivers components to DTC in accordance with instructions from Broker A.

The remaining steps in the creation mode are normal equity settlement steps, as indicated in the schematic flow diagram of FIG. 9. Customer B, through Broker B buys the component interest at the Registered Equity Exchange E050. Broker B delivers cash to DTC and receives the component interest from DTC and Customer B receives the interest and delivers cash to Broker B. Comparisons are made by Broker A and Broker B at NSCC through the continuous net settlement (CNS) system.

Referring now more particularly to FIG. 9a, Customer A instructs Broker A (Box E100) to sell and create a component interest in common stock on a Registered Equities Exchange, authorized to trade component interests. Customer A establishes an account with Broker A and deposits shares of a company's common stock in his account with Broker A. Broker A's computer E104 then stores information about Customer A and his stock position in a magnetic memory disk customer data file E102 in his computer system E104. Customer A instructs Broker A to sell and create a component interest in common stock on a Registered Equities Exchange. Broker A's computer E104 communicates with the Registered Equity Exchange's CPU E105.

Broker A's computer E104 queries his account information disk file E102 to ascertain that Customer A has the underlying common stock in his account for the component being sold and created.

Assuming the underlying common stock is there, Broker A enters into his computer transaction file E101 an order to sell the component. The floor traders for each customer, upon completion of the trade enter the trade in each of their computer systems and the specialist enters information about the trade into the exchange's computer exchange transaction file, which may be stored in a memory storage disk. Customer A's account on the Broker's computer system is updated when, upon completion of the trade, Broker A enters the trade into the Broker A transaction file E101 and updates the Customer Data File E102 (both of which may be magnetic memory storage disks) to reflect the sale of a component interest against a long position in Customer A's account. Customer A's account on the Broker's computer system is updated to show that he is short the component sold when confirmation of the sale is received from the registered equity exchange. Each broker's computer system then generates reports for Broker A and Broker B, indicating the results of the trade. Then the brokers report the trade to their respective customers.

For comparison purposes, Broker A's computer and Broker B's computer transmit data about the trade to NSCC's continuous net settlement (CNS) system CPU (Box E201). This information is transmitted to DTC's CPU computer system E301.

Broker A's computer E104 instructs DTC's CPU (Box E301) to transfer shares of common stock from Broker A's participant account to ECC against delivery of the sold component interest. ECC then holds the stock in a pledged account it creates for the benefit of Broker A, as collateral for the sold component.

Broker A's computer instructs ECC's CPU E500 to receive from DTC's CPU common equity stock and create and deliver a component interest to DTC.

ECC's CPU creates an entry in a pledged stock file (E401) which may be a magnetic memory storage disk and creates an entry in the component creation file E402 in anticipation of delivery of stock from DTC.

DTC's CPU E301 delivers the common stock to ECC's CPU E500 and receives back the sold and created component interest. This stock stays in ECC's account at DTC as collateral against the sold and created components. ECC's pledged stock file E401 and component creation file E402, which may be a magnetic memory storage disk, are updated to reflect the receipt of stock and delivery of the sold and created component. Specifically, the ECC component creation file E402 registers the component which Broker A has sold and created.

For each creation sale of a component, ECC's computer system causes a component interest to be created in the computer record of the buying broker's account to complete the trade. After the close of trading, ECC's computers transmit a report showing the net change in position for each component that each broker traded that day. The broker's computer system reconciles this net change with the trades the broker made that day. When this is finished, the individual customer's account information, stored in the broker's computer system, such as Broker A's transaction file E101, which may be stored in a magnetic memory storage disk, is updated to reflect the trades the customers made that day. Each day DTC and the participant member firms reflect the change in value of the net positions they have in component interests at ECC and DTC.

Referring now to FIG. 10, a company E20 utilizes computer means E20A for announcing its intent to solicit votes from its stockholders. The computer means E20A communicates with computer means E21A for notifying participant members of Depository Trust Corporation (DTC) E21 which, on behalf of its participant members may serve as the repository for the company's equity. As it learns of shareholder voting matters, the computer means E21A disseminates this information to its participants. For example, the DTC computer means E21A notifies ECC E23 and the DTC/ECC participant firm E25.

The DTC participant firm E25 has computer means E25A for identifying customer holdings, computer means E25B for reconciling customer holdings (long and short) and including component interest holdings to ASPC and computer means E25C for notifying customers and the company.

DTC E21 maintains records that identify all participant holders with long component holdings of ZIPS$^{SM}$, SPECS$^{SM}$ and DIVS$^{SM}$. DTC E21 utilizes computer means E21A for identifying participants with long component holdings.

An Equities Clearing Corporation (ECC) E23 maintains records that identify all participants with pledged stock and short component holdings. ECC utilizes computer means E23A for identifying participant members with pledged stock and short component holdings.

ASPC E24, owner of the primary computer, utilizes computer means E24A for CUSIP correlation which is necessary to properly apportion component-holder voting rights. ASPC requests from ECC via computer means E23A information that identifies participant holders of record of pledged stock and short positions for specified components pertinent to a shareholder vote. ASPC also requests from DTC via computer means E21A information that identifies participant holders of record of long positions for specified components pertinent to a shareholder vote.

ASPC E24, the owner of the primary computer, has computer means for performing four basic tasks in order to establish the voting rights for eligible component-holders:

1. CUSIP correlation computer means E24A for correlating the equity at issue to the corresponding created components: SPECS$^{SM}$, ZIPS$^{SM}$ and DIVS$^{SM}$;
2. Vote calculation computer means E24B for calculating the proper voting rights for each of these components;
3. Vote apportioning computer means E24C for apportioning the correct number of votes to each DTC/ECC participant (as identified by DTC/ECC) for each component;

4. Computer means E24D notifies all DTC/ECC participant members maintaining component positions of their voting rights.

The DTC/ECC participant firm E25, upon receipt of the voting information utilizes a similar computer system to that of ASPC to further apportion the net long and net short vote among its customers as previously described. Ultimately proxies are forwarded to all eligible holders E26 identifying the customer's detailed, as well as net, voting rights.

The customer E26 votes and returns a proxy E26A to the company E27. The company E27 utilizes computer means E27A for tallying and reconciling all votes submitted, and as indicated by box E27B, takes the appropriate corresponding action at its shareholder meeting.

Referring now to FIG. 11 of the drawings, a company computer (designated in FIG. 11 by its central processing unit CPU) 3 or public channels 2 enters relevant information concerning a stockholder vote into the ASPC computer 1. This information indicates that company 3 wishes to solicit votes from its stockholders.

On the stock of record date the ASPC computer 1 initiates a request for data from the DTC computer 4 in order to identify member firms holding positions of any components. On the stock of record date the ASPC computer 1 also initiates a request for data from the ECC computer 6 over a communication link 7. This is done in order to identify member firms holding positions of pertinent components. This will be more fully explained in connection with FIG. 12.

The ASPC computer 1 then calculates the pro rata voting right applicable to each of the components (as more fully explained in connection with FIG. 13). In order to accomplish this the ASPC computer receives market pricing data from an external market pricing service computer 8 by means of an electronic medium communicated through a communication link 9.

The ASPC computer next apportions the long and short votes among the holders of record identified by DTC and ECC (as will be described in more detail in connection with FIG. 14) and notifies all such DTC and ECC participants 11$n$ of their net applicable long and/or short votes via communication links 12$n$, 13, and 14. While only one DTC and ECC participant 11$n$ and one communication link from the DTC and from the ECC computers are represented in FIG. 11, it will be understood that a plurality of firms are in data communication with the ASPC computer 1. The total number of partial interests and corresponding votes among the DTC and ECC participants is then communicated over a link 10 to the company computer 3 as will be more fully explained in connection with FIG. 15.

The DTC and ECC participant members' computer 11$n$ additionally receives data directly from DTC's computer 4 via communication link 14, as well as the ECC computer 6, via communication link 13 to account properly for all its customers' holdings, including the ASPC-created components, and to apportion voting rights correctly among its customers for the specific vote solicitation, as will be explained more fully in connection with FIG. 16. Individual customers 15$n$ are sent proxies by established means 16$n$ and the total number of proxies (votes) distributed is reported to the company computer 3 as required over link 17. From this point the standard vote solicitation is made by the company.

Referring now to FIG. 12, the ASPC CUSIP correlation computer will be described with reference to the flow chart. The ASPC computer includes a computer portion EA100 for receiving an announcement of a shareholder vote to be taken by a company.

The ASPC computer includes means for manually entering pertinent data concerning the vote to initiate operation of the system. This data includes the equity CUSIP number, the record date and the due date.

A CUSIP file or memory storage means, for example a computer disk, EA121 is loaded into a computer portion EA120 for loading CUSIP component correlation data. This is done in order to match the equity with its multiple ZIPS$^{SM}$, SPECS$^{SM}$ and DIVS$^{SM}$ for each of the Annual and/or Termination Claim (TC$^{SM}$) Series (there being at least one series anticipated per year of maturity). The CUSIP correlation file contains a unique CUSIP number for every series component created by ASPC.

The ASPC computer comprises a portion EA130 for expanding the equity CUSIP to all component CUSIPs. The computer portion matches the equity CUSIP with the component CUSIP numbers. These have been denoted $Z_1$, $S_1$ nd $D_1$, respectively, for the ZIPS$^{SM}$, SPECS$^{SM}$ and DIVS$^{SM}$ of year$_1$, respectively, and continuing through year$_n$.

The ASPC computer includes a portion EA140 for inquiring "are all components processed?" The portion EA140 has a "no" output which is connected back to the input of portion A130 for repeating the matching of the equity CUSIP with the component CUSIP numbers until all the related component CUSIP numbers have been found for the requested equity CUSIP.

The "yes" output of the computer portion EA140 is coupled to a "request member firm net positions by component" computer portion EA150 which requests from OCC the identification of all OCC participant members holding any positions of any of the above mentioned component CUSIP numbers.

The ECC computer portion EA160 and the DTC computer portion EA170 receive the request and return confirmation of the requested identification to ASPC computer portion EA150. A "requests=confirms?" computer portion EA180 insures that the data requested is consistent with the data confirmed. If not, computer portion EA181 is means for manually reconciling any discrepancy and the ECC and DTC computer portions repeat their operation until the data requested is consistent with that which has been confirmed.

The "yes" output of the computer portion EA180 is connected to the ASPC vote calculation computer portion represented in FIG. 13. Referring now to FIG. 13, the vote calculation computer portion includes a "load market price data" computer portion EB100 for loading the market price data supplied from a service EB101 into the system to begin the vote calculation. The pricing preferably is the closing market price as of the close on the stock of record date on any exchange where traded, or as determined by specific contract agreements.

The computer portion EB100 is coupled to a "CUSIP= EQ, $Z_n$, $S_n$, $D_n$?" computer portion EB110. Computer portion EB110 determines that only CUSIP numbers with any claim to a voting right are considered (denoted as EQ, $Z_n$, $S_n$ and $D_n$ for the equity, ZIPS$^{SM}$, SPECS$^{SM}$ and DIVS$^{SM}$ for all series, respectively). All other CUSIP numbers are ignored, as indicated by the "no" output to EB111 "ignore" computer portion from portion EB110.

A "is price greater than 0?" computer portion EB120 determines if a market price exists for a CUSIP (that is, its price is greater than zero dollars). The "yes" output of computer portion EB120 is coupled for storage to the component price history file computer portion EB121 which may be, for example, a computer storage disk.

The "no" output of the computer portion EB120 is coupled to a $$\text{"calculate: price} = \frac{\text{bid} + \text{asked}}{2}\text{"}$$

computer portion EB130. If any equity or component is not traded on a given day (that is, its price is either absent or zero), computer portion EB130 calculates its value by determining the mean of the bid and asked prices. This computed value is stored in the component price history file EB121.

The output of computer portion EB130 is coupled to a "separate components by series (years)" computer portion EB140. In order to establish component voting rights, computer portion EB140 groups all components by series (that is, by Termination Date (TD$^{SM}$) and/or Termination Claim (TC$^{SM}$) in which they mature). The outputs of computer portions EB140 are coupled by year, that is, $YR_1$, $YR_2$ ... $YR_n$ to computer portion EB150 "calculate factors for equity (EQ) & all series components: SPECS$^{SM}$ (S), ZIPS$^{SM}$ (Z), DIVS$^{SM}$ (D)," computer portion EB150. Within each series, the computer portion EB150 segregates the individual components so that unique component factors can be calculated for each. A "factor EQ=1.0" computer portion EB160 sets the component factor for the equity at 1.0.

$$\text{A "factor } S_n = \frac{\text{market price } S_n}{\Sigma \text{ market prices } (S_n + Z_n + D_n)} \text{ " computer}$$

portion EB170 determines the component factor for the SPECS$^{SM}$, for the year$_n$ by dividing the market price of the SPEC$^{SM}_n$ by the sum of the market prices for each of the ZIPS$^{SM}$, SPECS$^{SM}$ and DIVS$^{SM}$ for the same year$_n$.

$$\text{A "factor } Z_n = \frac{\text{market price } Z_n}{\Sigma \text{ market prices } (S_n + Z_n + D_n)} \text{ " computer}$$

portion EB180 determines the component factor for the ZIPS$^{SM}$ for the year$_n$ by dividing the market price of the ZIPS$^{SM}_n$ by the sum of the market prices for each of the ZIPS$^{SM}$, SPECS$^{SM}$ and DIVS$^{SM}$ for the same year$_n$.

$$\text{A "factor } D_n = \frac{\text{market price } D_n}{\Sigma \text{ market prices } (S_n + Z_n + D_n)} \text{ " computer}$$

portion EB190 determines the component factor for the DIVS$^{SM}$ for the year$_n$ by dividing the market price of the DIVS$^{SM}_n$ by the sum of the market prices for each of the ZIPS$^{SM}$, SPECS$^{SM}$ and DIVS$^{SM}$ for the same year$_n$.

A "store component factors" computer portion EB200 then stores the component factors in a factor history file EB201, which may be a computer disk.

The computer portion EB200 is also coupled to an "all CUSIPS processed?" computer portion EB210, having a "no" output coupled to the input of the EB140 computer portion for continuing the operation of the computer until all CUSIPS eligible for voting rights have been calculated and stored.

The "yes" output of the computer portion EB210 is coupled to a print report computer portion EB220 for printing a component factor report EB221, to allow inspection of the data.

As a system control check, a computer portion "$\Sigma(S_n+Z_n+D_n) =1.0$?" computer portion EB230 has a "no" output coupled to a "reconcile factors" computer portion EB231, which is coupled to the input of computer portion EB140. The factors are manually reconciled in computer portion EB231, adjustments are made and the computer operation is repeated until the sum equals 1.0. The computer cannot continue its operation until this condition is met.

The "yes" output of the computer portion B230 is coupled to the vote apportioning computer portion of ASPC, represented in FIG. 14.

Referring now to FIG. 14, a "load participants position data" computer portion EC100 is coupled to the ECC and DTC computers for loading the net ECC and DTC member firm positions into the system. A "print report" computer portion EC110 prints a report which may be entitled "DTC/ECC participant position detail report" (EC111) to allow for inspection of the data. A "$\Sigma \text{position}_L=\Sigma \text{position}_S$?" computer portion EC120 is provided for checking whether the sum of the long positions for all participants equals the sum of the short positions of all participants. If not, the "no" output of computer portion EC120 is coupled to a "reconcile positions" computer portion EC121 for manually investigating and making adjustments which is then coupled to the input of the computer portion EC100. The system check is repeated until the two sums are equal. The computer cannot continue its operation until this condition is met.

The factor history file EC131 is the same factor history file as factor history file EB201 for storing the component factors. The factor history file EC131 is coupled to a "load component factor data" computer portion EC130 to which the "yes" output of computer portion EC120 is applied. An "assign component factors to all participant member firm positions ($F_n$)" computer portion EC140 is coupled to the output of the computer portion EC130 for assigning component factors to all participant positions beginning by reading the data for the first DTC participant member firm ($F_1$).

A computer portion "for all series component positions" computer portion EC150 matches each participant member firm's position against the corresponding component factors for that participant's position (denoted as EQ, $Z_n$, $S_n$ and $D_n$ for the equity, ZIPS$^{SM}$, SPECS$^{SM}$ and DIVS$^{SM}$ for all series, respectively). A "is firm position=0?" computer portion EC160 determines whether the participant maintains a position for a particular component. If the participant does maintain a position (that is, his position is not equal to zero), the vote apportioning system continues its operation. If the participant does not maintain a position for a particular component (that is, his position is either absent or equal to zero), the "yes" output of the computer portion EC160 continues the search as an input to computer portion EC140 for subsequent components.

The "no" output of the computer portion EC160 is coupled to a "is position long?" computer portion EC170. The "yes" output of the computer portion EC170 is applied to a "net long votes=firm position times component factor" computer portion EC171 for multiplying the long position by the ASPC component factor.

If the position is short, the "no" output of computer portion EC170 is applied to a "net short vote=firm position times component factor times (−1)" computer portion EC172 for applying its output together with the output of computer portion EC171 to a "store net long and net short votes by position by firm" computer portion EC180 which applies its output to a firm's vote file memory storage means EC181, which may be a computer disk. The processing continues with the next series components in EC150.

The "yes" output of EC160 is applied to an "All Components Tested?" computer portion EC190. The "No" output goes to EC150 until all series and components of a particular underlying stock have been processed. The "yes" output of EC190 goes to the "All Firms Tested?" computer portion EC195. The "no" output of EC195 goes to EC140 to assign component factors for the next participant member firm. The "yes" output of EC195 is applied to a "print report" computer portion EC200 which prints a report entitled "participant firm net vote report" as indicated by block EC201. The output of computer portion EC190 is coupled through the computer portion EC200 to a "$\Sigma vote_L = \Sigma votes_S$?" computer portion EC210 for determining as a system control check whether the sum of the votes for all long components equals the sum of votes for all short components. If not, the "no" output of computer portion EC210 is coupled to a computer portion EC211 wherein the votes are manually reconciled, adjustments made and the computer operation repeated. The computer operation cannot go forward until this condition is met.

Referring to FIG. 15 of the drawings, the DTC participant member firm's vote file ED101, which may be a storage disk, is reloaded into the ASPC computer system at a "load data" computer portion ED100. A "transmit net position and net vote data to company and firms" computer portion ED110 transmits by telecommunications the net position and net vote data and component factor to the company as well as to each member firm maintaining any component position, as indicated by blocks ED120 and ED130.

The participant member firm's (ED120) computer receives the data and returns confirmation of such to ASPC. This data should be in complete agreement with daily positions as reported by DTC and confirmed with the participant. As indicated by block ED130, the company computer similarly receives the position and vote data and confirms such to the ASPC computer.

A "print report" computer portion ED140 prints a report entitled "the participant firm confirmation report" ED141 to allow for inspection of the data. A "transmits equal confirms?" computer portion ED150 has a "no" output coupled to a "reconcile positions with firm" computer portion ED151 for reconciling the discrepancy if the data transmitted does not agree with the confirmation for the participant firm. The computer repeats this operation until the two positions agree. The "yes" output of computer portion ED150 completes the ASPC computer data processing. At this point the standard proxy solicitation process becomes operative.

Referring now to FIG. 16, the DTC participant member firm computer comprises a "receive data, confirm transmission" computer portion EV100 which responds to the component factors and net long and net short vote position transmitted by ASPC and sends the confirmation of such to ASPC. The participant member firm also receives and reconciles long position data from DTC EV102 and short position data from ECC EV103. An "identify customer holdings as of record date by component" computer portion EV110 accesses the customer account master file EV111, which may be a computer storage disk, in order to identify customers holding any of the relevant components (as identified by their CUSIP numbers) as of the assigned record date.

A "determine voting rights for all customers (C)" computer portion EV120 searches each customer file (denoted $C_1$ through $C_n$) to identify component holders.

A "for equity and all series components" computer portion EV130 considers only CUSIP numbers with any claim to a voting right (denoted as EQ, $Z_n$, $S_n$ and $D_n$) for the equity, ZIPS$^{SM}$, SPECS$^{SM}$ and DIVS$^{SM}$ for all series, respectively. As an eligible component is found, computer portion "vote right=customer position times ASPC component factor" computer portion EV140 establishes the customer's voting right by multiplying the position by the ASPC component factor.

A "store data" computer portion EV150 stores each such position in the participant member firm's customer vote file (EV151), which may be a computer disk.

An "all components processed?" computer portion EV155 has a "no" output connected to the input of computer portion EV130 to repeat the computer operations until all components have been processed for a customer. The "yes" output of computer portion EV155 is coupled to a "calculate net votes for each customer" computer portion EV170 which tabulates the net number of votes assignable to each customer.

If the customer's net vote right is negative (less than zero), the "vote right less than 0?" computer portion EV180 causes the value to be retained for reference but the eligible vote right is set to zero. This could occur when an investor is short more component votes than he is long shares of the underlying stock.

The "yes" output of computer portion EV180 is coupled to a "set vote right=0" computer portion EV181 which has its output applied to a "calculate and store firm total" computer portion EV190. The computer portion EV190 calculates and stores the total eligible votes for each customer and accumulates a total firm vote. This output is applied to a customer vote file EV191, which may be a computer disk. The "no" output of computer portion EV195 "All Customers Processed" is coupled back to computer portion EV120 to get the next customer's position.

The "yes" output of EV195 is coupled to a "print report" computer portion EV200 which prints the customer vote rights report EV201, to allow for inspection of the data.

The output of EV190 is coupled through EV200 to a "$\Sigma votes_C$=net votes ASPC?" which as a system control check determines whether the sum of the eligible customer votes equals the net votes assigned by ASPC. If not, any discrepancies are applied to computer portion EV211 "reconcile votes with ASPC" where any discrepancies are manually reconciled by the participant firm, adjustments are made and the computer operation repeats until the amounts are equal. The computer operation cannot go forward until this condition is met.

The "yes" output of the computer portion EV210 is applied to a "notify company and customers" computer portion EV220, for advising the company of each participant's component holders and their component voting rights, as indicated by EV221. Proxies are then sent to individual customers, as indicated by EV222.

III. Equity Forwards$^{SM}$ Mode

Referring now to FIG. 17 of the drawings, there is represented diagrammatically a transaction involved in the creation and trading in the Equity Forwards$^{SM}$ mode of one or more DIVS$^{SM}$, SPECS$^{SM}$ or ZIPS$^{SM}$.

As represented in FIG. 17, a system for creating Equity Forwards$^{SM}$, each of which represents an interest in a share of stock of an entity comprises computer input and memory means for allocating to a customer's account Equity Forwards$^{SM}$ that are any of: (a) a component interest indicative of the right to receive a partial share of stock equal in value to a stipulated price or a full share of stock of the entity on a predetermined future date, whichever is the lesser value; (b) a component interest indicative of the right to receive a partial share of stock equal in value to the appreciation, if any, of the share of stock above the stipulated price on the predetermined date; (c) a component interest indicative of the right to receive dividends declared with respect to given dates which are prior to the predetermined future date and which goes to zero value at the predetermined future date. The system also includes computer memory means for recording the sale from the customer's account of Equity Forwards$^{SM}$ that are any of components (a), (b), (c), as described more fully with reference to FIG. 17a.

As represented diagrammatically in FIG. 17, Box F100, Customer A is long one share of common stock, by which it is meant that he owns common stock carried in his account at Broker A (Box F200). As represented by arrow F1, Customer A represented by Box F100 pledges his or her stock to Broker A and sells one or more Equity Forwardss$^{SM}$ for DIVS$^{SM}$, ZIPS$^{SM}$ or SPECS$^{SM}$ through Broker A, represented by Box F200.

The sale by Customer A, through Broker A, is done on a registered Equity Forwards$^{SM}$ exchange, represented by Box F600. This exchange preferably has standardized contract specifications arranged in conjunction with the owner of the primary computer (ASPC). As indicated by arrow F2, Broker A establishes and maintains margin (at EFCC) for any Equity Forwards$^{SM}$ component sold by Customer A. EFCC creates and issues an Equity Forwards$^{SM}$ to Broker B's account, represented by Box F400 for credit to Customer B's account, represented by Box F500. As represented by arrow F3, Broker B receives the Equity Forwards$^{SM}$ and as represented by arrow F4, Customer B receives the Equity Forwards$^{SM}$. As represented by arrow F5, Customer B delivers cash to Broker B, who as represented by arrow F6, delivers cash to EFCC. As indicated by arrow F7, Broker A receives cash from EFCC and as represented by arrow F8, Customer A F100 receives cash for the Equity Forwards$^{SM}$ he has sold.

As represented by arrow F9, the sale of the Equity Forwards$^{SM}$ by Broker A is through a registered Equity Forwards$^{SM}$ exchange F600. Broker B buys the Equity Forwards$^{SM}$ from Broker A through the registered Equity Forwards$^{SM}$ exchange F600, as indicated by arrow F10.

Referring now to FIG. 17a, customer A establishes an account with Broker A F200, deposits and pledges shares of a company's common stock in his account with Broker A. Broker A F200 then stores information about Customer A and his stock positions in a magnetic memory disk file F203 in his computer system F201.

Customer A instructs Broker A to sell a component Equity Forwards$^{SM}$ interest in a common stock.

Broker A's computer F201 queries its account information memory disk file F203 for Customer A to ascertain that Customer A has the underlying common stock in his account for the component being sold and created.

Assuming the underlying common stock is there, Broker A enters into his computer transaction file F202 an order to sell the component as an opening transaction. The floor traders for each customer upon completion of the trade enter the trade in each of their computer systems F201 and F401, and the specialist enters information about the trade into the exchange's computer transaction file F602 which may be stored in a memory storage disk. Customer A's account on the broker's computer system is updated to show that he is short the component sold when confirmation of the sale is received from the registered Equity Forwards$^{SM}$ exchange. Each broker's computer systems then generate reports for Broker A F200 and Broker B F400 indicating the results of the trade. Then the brokers report the trade to their respective customers.

When a trade is complete the exchange's computer system F601 transmits data about the trade to the computer system at an Equity Forwards$^{SM}$ Clearing Corporation (EFCC) F301. This computer system accumulates all opening and closing trades for each component by broker. The EFCC component creation file F302, which may be stored in a memory storage disk, registers the component which EFCC has created.

For each opening sale of a component EFCC's computer system F301 causes a component Equity Forwards$^{SM}$ to be created in the computer record of the buying broker's account F401 to complete the trade. After the close of trading EFCC's computers transmit a report showing the net change in position for each component that each broker traded that day. The broker's computer systems reconcile this net change with the trades the broker made that day. When this is finished the individual customer's account information, stored in the broker's computer system, such as Broker A's transaction file F202, which may be stored in a memory storage disk F202, is updated to reflect the trades the customers made that day. Each day EFCC and the participant member firms adjust maintenance margins to reflect the change in value of the net position they have in component Equity Forwards$^{SM}$ at EFCC.

Referring now to FIG. 18, a Company F20 utilizes computer means F20A for announcing its intent to solicit votes from its stockholders. The computer means F2OA communicates with computer means F21A for notifying participant members of Depository Trust Corporation (DTC) F21 which, on behalf of its participant members may serve as the repository for the company's equity. As it learns of shareholder voting matters, the computer means F21A disseminates this information to its participants. For example, the DTC computer means F21A notifies EFCC F23 and the DTC/EFCC participant firm F25.

The EFCC participant firm F25 has computer means F25A for identifying customer holdings, computer means F25B for reconciling component holdings (long and short) to ASPC and computer means F25C for notifying customers and the company.

An Equity Forwards$^{SM}$ Clearing Corporation (EFCC) F23 maintains records that identify all holders (long and short Equity Forwards$^{SM}$ contracts) of ZIPS$^{SM}$, SPECS$^{SM}$ and DIVS$^{SM}$. EFCC F23 utilizes computer means F23A for identifying participant member holdings.

ASPC F24, owner of the primary computer, utilizes computer means F24A for CUSIP correlation which is necessary to properly apportion component-holder voting rights. ASPC requests from EFCC via computer means F23A information that identifies participant holders of record of either long and/or short positions for specified components pertinent to a shareholder vote.

ASPC F24, the owner of the primary computer has computer means for performing four basic tasks in order to establish the voting rights for eligible component-holders:

1. CUSIP correlation computer means F24A for correlating the equity at issue to the corresponding created components: SPECS$^{SM}$, ZIPS$^{SM}$ and DIVS$^{SM}$;
2. vote calculation computer means F24B for calculating the proper voting rights for each of these components;
3. vote apportioning computer means F24C for apportioning the correct number of votes to each EFCC participant (as identified by EFCC) for each component;
4. computer means F24D notifies all EFCC participant members, maintaining component positions of their voting rights.

The EFCC participant firm F25, upon receipt of the voting information utilizes a similar computer system to that of ASPC to further apportion the net long and net short vote among its customers as previously described. Ultimately proxies are forwarded to all eligible holders identifying the customer's F26 detailed, as well as net, voting rights.

The customer F26 votes and returns a proxy F26A to the company F27. The company F27 utilizes computer means F27A for tallying and reconciling all votes submitted and, as indicated by Box F27B, takes appropriate corresponding action at its shareholder meeting.

Referring now to FIG. 19 of the drawings, a company computer F3a or public channels F2a enters relevant information concerning a stockholder vote into the ASPC computer F1a. This information indicates that company F3a wishes to solicit votes from its stockholders.

On the stock of record date the ASPC computer F1a initiates a request for data from the EFCC computer F4a in order to identify member firms holding positions of all components. This communication occurs over a communication link F5a. This will be explained more fully in connection with FIG. 20.

The ASPC computer F1a then calculates the pro rata voting right applicable to each of the components (as more fully explained in connection with FIG. 21). In order to accomplish this, the ASPC computer receives market pricing data from an external market pricing service computer F6a by means of an electronic medium communicated through a communication link F7a.

The ASPC computer next apportions the net long and net short votes among the holders of record identified by EFCC (as will be described in more detail in connection with FIG. 22) and notifies all such EFCC participants F8n of their net applicable long and/or short votes via a communication link F9n. While only one EFCC participant F8n and one communication link F9n are represented in FIG. 19, it will be understood that a plurality of firms are in data communication with the ASPC computer 1. The total number of partial interests and corresponding votes apportioned among the EFCC participants is then communicated over a link F10a to the company computer F3a, as will be explained more fully in connection with FIG. 23.

The EFCC participant member's computer F8n additionally receives data directly from DTC's computer F11a via communication link F12a as well as the EFCC computer F4a via communication link F13a to account properly for all its customers' holdings, including the ASPC-created components, and to apportion voting rights correctly among its customers for the specific vote solicitation, as will be explained more fully in connection with FIG. 24. Individual customers F14n are sent proxies by established means F15n and the total number of proxies (votes) distributed is reported to the company computer F3a as required over link F16a. From this point the standard vote solicitation is made by the company.

Referring now to FIG. 20, the ASPC CUSIP correlation computer will be described with reference to the flow chart. The ASPC computer includes a computer portion FA100 for receiving an announcement of a shareholder vote to be taken by a company.

The ASPC computer includes computer means FA110 for manually entering pertinent data concerning the vote to initiate operation of the system. This data includes the equity CUSIP number, the record date and the due date.

A CUSIP file or memory storage means, for example a computer disk, FA121 is loaded into a computer portion FA120 for loading CUSIP component correlation data. This is done in order to match the equity with its multiple $ZIPS^{SM}$, $SPECS^{SM}$ and $DIVS^{SM}$ for each of the Annual and/or Termination Claim ($TC^{SM}$) Series (there being at least one series anticipated per year of maturity). The CUSIP correlation file contains a unique CUSIP number for every series component created by ASPC.

The ASPC computer comprises a portion FA130 for expanding the equity CUSIP to all component CUSIPs. The computer portion matches the equity CUSIP with the component CUSIP numbers. These have been denoted $Z_1$, $S_1$ and $D_1$, respectively, for the $ZIPS^{SM}$, $SPEC^{SM}$ and $DIVS^{SM}$ of $Year_1$, respectively, and continuing through $Year_n$.

The ASPC computer includes a portion FA140 for inquiring "are all components processed?" The portion FA140 has a "no" output which is connected back to the input of portion FA130 for repeating the matching of the equity CUSIP with the component CUSIP numbers until all the related component CUSIP numbers have been found for the requested equity CUSIP.

The "yes" output of the computer portion FA140 is coupled to a "request member firm net positions by component" computer portion FA150 which requests from EFCC the identification of all EFCC participant members holding any positions of any of the above mentioned component CUSIP numbers.

The EFCC computer portion FA160 receives the request and returns confirmation of the requested identification to ASPC computer portion FA150. A "requests=confirms?" computer portion FA170 insures that the data requested is consistent with the data confirmed. If not, computer portion FA171 is means for manually reconciling any discrepancy and the EFCC computer portions repeat their operation until the data requested is consistent with that which has been confirmed.

The "yes" output of the computer portion FA170 is connected to the ASPC vote calculation computer portion represented in FIG. 21. The vote calculation computer portion includes a "load market price data" computer portion FB100 for loading the market price data supplied from a service FB101 into the system to begin the vote calculation. The pricing preferably is the closing market price as of the close on the stock of record date on any exchange where traded, or as determined by specific contract agreements.

The computer portion FB100 is coupled to a "CUSIP=EQ, $Z_n$, $S_n$, $D_n$?" computer portion FB110. Computer portion FB110 determines that only CUSIP numbers with any claim to a voting right are considered (denoted as EQ, $Z_n$, $S_n$ and $D_n$ for the Equity, $ZIPS^{SM}$, $SPECS^{SM}$ and $DIVS^{SM}$ for all series, respectively). All other CUSIP numbers are ignored, as indicated by the "no" output to FB111 "ignore" computer portion from portion FB110.

A "is price greater than 0?" computer portion FB120 determines if a market price exists for a CUSIP (that is, its price is greater than zero dollars). The "yes" output of computer portion FB120 is coupled for storage to the component price history file computer portion FB121 which may be, for example, a computer storage disk.

The "no" output of the computer portion FB120 is coupled to a $$\text{"calculate: price} = \frac{\text{bid} + \text{asked}}{2}\text{"}$$

computer portion FB130. If any equity or component is not traded on a given day (that is, its price is either absent or zero), computer portion FB130 calculates its value by determining the mean of the bid and asked prices. This computed value is stored in the component price history file FB121.

The output of computer portion FB130 is coupled to a "separate components by series (years)" computer portion FB140. In order to establish component voting rights, computer portion FB140 groups all components by series (that is, by Termination Date ($TD^{SM}$) and/or Termination Claim ($TC^{SM}$) in which they mature). The outputs of computer portions FB140 are coupled by year, that is, $YR_1$, $YR_2$ ... $Y_n$ to computer portion FB150 "calculate factors for equity (EQ) & all series components: SPECS$^{SM}$ (S), ZIPS$^{SM}$ (Z), DIVS$^{SM}$ (D)," computer portion B150. Within each series, the computer portion FB150 segregates the individual components so that unique component factors can be calculated for each. A "factor EQ=1.0" computer portion FB160 sets the component factor for the equity at 1.0.

$$\text{A "factor } S_n = \frac{\text{market price } S_n}{\Sigma \text{ market prices } (S_n + Z_n + D_n)} \text{ "computer}$$

portion FB170 determines the component factor for the SPECS$^{SM}$, for the year$_n$ by dividing the market price of the SPECS$^{SM}{}_n$ by the sum of the market prices for each of the ZIPS$^{SM}$, SPECS$^{SM}$ and DIVS$^{SM}$ for the same year$_n$.

$$\text{A "factor } Z_n = \frac{\text{market price } Z_n}{\Sigma \text{ market prices } (S_n + Z_n + D_n)} \text{ "computer}$$

portion FB180 determines the component factor for the ZIPS$^{SM}$ for the year$_n$ by dividing the market price of the ZIPS$^{SM}{}_n$ by the sum of the market prices for each of the ZIPS$^{SM}$, SPECS$^{SM}$ and DIVS$^{SM}$ for the same year$_n$.

$$\text{A "factor } D_n = \frac{\text{market price } D_n}{\Sigma \text{ market prices } (S_n + Z_n + D_n)} \text{ "determines the}$$

component factor for the DIVS$^{SM}$ for the year$_n$ by dividing the market price of the DIVS$^{SM}{}_n$ by the sum of the market prices for each of the ZIPS$^{SM}$, SPECS$^{SM}$ and DIVS$^{SM}$ for the same year$_n$.

A "store component factors" computer portion FB200 then stores the component factors in a factor history file FB201, which may be a computer disk.

The computer portion FB200 is also coupled to an "all CUSIPS processed?" computer portion FB210, having a "no" output coupled to the input of the FB140 computer portion for continuing the operation of the computer until all CUSIPS eligible for voting rights have been calculated and stored.

The "yes" output of the computer portion FB210 is coupled to a print report computer portion FB220 for printing a component factor report FB221, to allow inspection of the data.

As a system control check, a computer portion "$\Sigma(S_n + Z_n + D_n) = 1.0$?" computer portion FB230 has a "no" output coupled to a "reconcile factors" computer portion FB231, which is coupled to the input of computer portion FB140. The factors are manually reconciled in computer portion FB231, adjustments are made and the computer operation is repeated until the sum equals 1.0. The computer cannot continue its operation until this condition is met.

The "yes" output of the computer portion FB230 is coupled to the vote apportioning computer portion of ASPC, represented in FIG. 22.

Referring now to FIG. 22, a "load EFCC position data" computer portion FC100 is coupled to the EFCC (FC 101) computer for loading the net EFCC member firm positions into the system. A "print report" computer portion FC110 prints a report which may be entitled "EFCC participant position detail report" (FC111) to allow for inspection of the data. A "$\Sigma \text{position}_L = \Sigma \text{position}_S$?" computer portion FC120 is provided for checking whether the sum of the long positions for all participants equals the sum of the short positions of all participants. If not, the "no" output of computer portion FC120 is coupled to a "reconcile positions" computer portion FC121 for manually investigating and making adjustments which is then coupled to the input of the computer portion FC100. The system check is repeated until the two sums are equal. The computer cannot continue its operation until this condition is met.

The factor history file FC131 is the same factor history file as factor history file FB201 for storing the component factors. The factor history file FC131 is coupled to a "load component factor data" computer portion FC130 to which the "yes" output of computer portion FC120 is applied. An "assign component factors to all participant member firm positions ($F_n$)" computer portion FC140 is coupled to the output of the computer portion FC130 for assigning component factors to all participant positions beginning by reading the data for the first EFCC participant member firm ($F_1$).

A computer portion "for all series component positions" computer portion FC150 matches each participant member firm's position against the corresponding component factors for that participant's position (denoted as $Z_n$, $S_n$ and $D_n$ for the ZIPS$^{SM}$, SPECS$^{SM}$ and DIVS$^{SM}$ for all series, respectively). A "is firm position=0?" computer portion FC160 determines whether the participant maintains a position for a particular component. If the participant does maintain a position (that is, his position is not equal to zero), the vote apportioning system continues its operation. If the participant does not maintain a position for a particular component (that is, his position is either absent or equal to zero), the "yes" output of the computer portion FC160 continues the search as an input to computer portion FC140 for subsequent components.

The "no" output of the computer portion FC160 is coupled to a "is position long?" computer portion FC170. The "yes" output of the computer portion FC170 is applied to a "net long vote=firm position times component factor" computer portion FC171 for multiplying the long position by the ASPC component factor.

If the position is short, the "no" output of computer portion FC170 is applied to a "net short vote=firm position times component factor times (−1)" computer portion FC172 for applying its output together with the output of computer portion FC171 to a "store net long and net short votes by position by firm" computer portion FC180 which applies its output to a firm's vote file memory storage means FC181, which may be a computer disk. The processing continues with the next series of components in FC150.

The "yes" output of FC160 is applied to an "All Components Tested?" computer portion FC190. The "no" output goes to FC150 until all series and components of a particular underlying stock have been processed. The "yes" output of FC190 goes to the "All Firms Tested?" computer portion FC195. The "no" output of FC195 goes to FC140 to assign component factors for the next participant member firm. The "yes" output of FC195 is applied to a "print report" computer portion FC200 which prints a report entitled "participant firm net vote report" as indicated by block FC201. The output of computer portion FC190 is coupled through the computer portion FC200 to a "$\Sigma \text{vote}_L = \Sigma \text{votes}_S$?" computer portion FC210 for determining as a system control check whether the sum of the votes for all long components equals the sum of votes for all short components. If not, the "no" output of computer portion FC210 is coupled to a computer portion FC211 wherein the votes are manually reconciled, adjustments made and the computer operation repeated. The computer operation cannot go forward until this condition is met.

Referring to FIG. 23 of the drawings, the EFCC participant member firm's vote file FD101, which may be a storage disk, is reloaded into the ASPC computer system at a "load data" computer portion FD100. A "transmit net long and net short positions and net vote data to company and firms" computer portion FD110 transmits by telecommunications the net long and net short positions and net vote data and component factor to the company as well as to each member firm maintaining any component position, as indicated by blocks FD120 and FD130.

The participant member firm's (FD120) computer receives the data and returns confirmation of such to ASPC. This data should be in complete agreement with daily positions as reported by EFCC and confirmed with the participant. As indicated by block FD130, the company computer similarly receives the position and vote data and confirms such to the ASPC computer.

A "print report" computer portion FD140 prints a report entitled "the participant firm confirmation report" FD141 to allow for inspection of the data. A "transmits equal confirms?" computer portion FD150 has a "no" output coupled to a "reconcile positions with firm" computer portion FD151 for reconciling the discrepancy if the data transmitted does not agree with the confirmation for the participant firm. The computer repeats this operation until the two positions agree. The "yes" output of computer portion FD150 completes the ASPC computer data processing. At this point the standard proxy solicitation process becomes operative.

Referring now to FIG. 24, the EFCC participant member firm computer comprises a "receive data, confirm transmission" computer portion FV100 which responds to the component factors and net long and net short vote position transmitted by ASPC and sends the confirmation of such to ASPC. The participant member firm also receives and reconciles position data from EFCC and DTC. An "identify customer holdings as of record date by component" computer portion FV110 accesses the customer account master file FV111, which may be a computer storage disk, in order to identify customers holding any of the relevant components (as identified by their CUSIP numbers) as of the assigned record date.

A "determine voting rights for all customers (C)" computer portion FV120 searches each customer file (denoted $C_1$ through $C_n$) to identify component holders.

A "for equity and all series components" computer portion FV130 considers only CUSIP numbers with any claim to a voting right (denoted as EQ, $Z_n$, $S_n$ and $D_n$) for the equity, ZIPS$^{SM}$, SPECS$^{SM}$ and DIVS$^{SM}$ for all series, respectively. As an eligible component is found, computer portion "vote right=customer position times ASPC component factor" computer portion FV140 establishes the customer's voting right by multiplying the position by the ASPC component factor.

A "store data" computer portion FV150 stores each such position in the participant member firm's customer vote file (FV151), which may be a computer disk.

An "all components processed?" computer portion FV155 has a "no" output connected to the input of computer portion FV130 to repeat the computer operations until all components have been processed for a customer. The "yes" output of computer portion FV155 is coupled to a "calculate net votes for each customer" computer portion FV170 which tabulates the net number of votes assignable to each customer.

If the customer's net vote right is negative (less than zero), the "vote right less than 1?" computer portion FV180 causes the value to be retained for reference but the eligible vote right is set to zero. This could occur when an investor is short more component votes than he is long shares of the underlying stock.

The "yes" output of computer portion FV180 is coupled to a "set vote right=0" computer portion FV181 which has its output applied to a "calculate and store firm total" computer portion FV190. The computer portion FV190 calculates and stores the total eligible votes for each customer and accumulates a total firm vote. This output is applied to a customer vote file FV191, which may be a computer disk. The "no" output of computer portion FB195 "All Customers Processed" is coupled back to computer portion FV120 to get the next customer's position.

The "yes" output of FV195 is coupled to a "print report" computer portion FV200 which prints the customer vote rights report FV201, to allow for inspection of the data.

The output of FV190 is coupled through FV200 to a "Σvotes$_c$=net votes ASPC?" which as a system control check determines whether the sum of the eligible customer votes equals the net votes assigned by ASPC. If not, any discrepancies are applied to computer portion FV211 "reconcile votes with ASPC" where any discrepancies are manually reconciled by the participant firm, adjustments are made and the computer operation repeats until the amounts are equal. The computer operation cannot go forward until this condition is met.

The "yes" output of the computer portion FV210 is applied to a "notify company and customers" computer portion FV220, for advising the company of each participant's component holders and their component voting rights, as indicated by block FV221. Proxies are then sent to individual customers, as indicated by FV222.

Standard proxy solicitation then is made by the company.

IV. Corporate Creation and Exchange Mode

Referring now to FIG. 25 of the drawings, there is represented diagrammatically the creation system in the Corporate Creation and Exchange mode of one or more DIVS$^{SM}$, SPECS$^{SM}$ or ZIPS$^{SM}$.

As represented in FIG. 25, a system for creating stock interests, each of which represents an interest in a share of stock of an entity, comprises computer input and memory means for allocating to a customer's account stock interests that are any of:

(a) a component interest indicative of the right to receive a partial share of stock equal in value to a stipulated price or a full share of stock of the entity on a predetermined future date, whichever is the lesser value;

(b) a component interest indicative of the right to receive a partial share of stock equal in value to the appreciation, if any, of the share of stock above the stipulated price on the predetermined future date;

(c) a component interest indicative of the right to receive dividends declared with respect to given dates which are prior to the predetermined future date and which goes to zero value at the predetermined future date.

The system also includes computer memory means for recording the sale from the customer's account of stock interests that are any of components (a), (b), (c), as described more fully with reference to FIG. 25a.

As represented diagrammatically in FIG. 25, Box CF010, Investor (Customer A) is long one share of common stock, by which it is meant that he owns common stock carried in his account at Broker A (Box CF020). As represented by arrow CF100, Customer A, represented by Box CF010, delivers stock of the soliciting company to Broker A and instructs Broker A to exchange the stock for component interests, DIVS$^{SM}$, ZIPS$^{SM}$ or SPECS$^{SM}$, of the soliciting company.

The instruction CF100 and exchange by Customer A, through Broker A, is done through DTC (Box CF030). DTC preferably has standardized contract specifications for the DIVS$^{SM}$, ZIPS$^{SM}$ and SPECS$^{SM}$ created in conjunction with the owner of the primary computer (ASPC) and the corporation. As indicated by arrow CF200, Broker A instructs DTC to deliver Customer A's stock to the company against creation and exchange of components. As represented by arrow CF300, DTC delivers stock to the company (Box CF040) in accordance with Broker A's instructions. As indicated by arrow CF400, upon delivery of stock from DTC to the company, the company delivers components to DTC.

As indicated by arrow CF500, DTC credits the Broker's account for DIVS$^{SM}$, SPECS$^{SM}$ and ZIPS$^{SM}$ received from the company. The Broker then credits the customer's account for the DIVS$^{SM}$, SPECS$^{SM}$ and ZIPS$^{SM}$, as indicated by arrow CF600.

Referring now more particularly to FIG. 25a, Customer A CE100 establishes an account with Broker A and deposits shares of a company's common stock in his account CE010 with Broker A. Broker A's computer CE104 then stores information CE020 about Customer A and his stock position in a magnetic memory disk customer data file CE102 in his computer system CE104. Customer A instructs Broker A to tender common stock to the soliciting company in exchange for component interests. Broker A's computer CE104 communicates CE030 with DTC's computer CE105 to initiate the transfer of the stock to the company's account at DTC.

As indicated by arrow CE040, DTC's computer sends commands to the company's computer to cause the company to issue DIVS$^{SM}$, SPECS$^{SM}$ and ZIPS$^{SM}$ in exchange for the customer's stock.

As indicated by arrow CE050, the company's computer CE106 creates an entry in the Component Creation File CE107 indicating the exchange of DIVS$^{SM}$, SPECS$^{SM}$ and ZIPS$^{SM}$ for the stock and sends commands to DTC's computer CE105 as represented by arrow CE060 indicating that the components can be credited to the broker's account.

As indicated by arrow CE070, DTC's computer CE105 sends a confirmation of the component creation to the broker's computer and debits the stock from the broker's account and credits the broker with the DIVS$^{SM}$, SPECS$^{SM}$ and ZIPS$^{SM}$ created. As indicated by arrow CE080, the broker's computer CE104 debits the stock from the customer's account which may be a hard disk file CE102 and credits the account for the DIVS$^{SM}$, SPECS$^{SM}$ and ZIPS$^{SM}$ created.

Referring now to FIG. 26, a company C20 utilizes computer means C20A for announcing its intent to solicit votes from its stockholders. The computer means C20A communicates with computer means C21A for notifying participant members of Depository Trust Corporation (DTC) C21 which, on behalf of its participant members may serve as the repository for the company's equity. As it learns of shareholder voting matters, the computer means C21A disseminates this information to its participants. For example, the DTC computer means C21A notifies participant firm C25.

The DTC participant firm C25 has computer means C25A for identifying customer holdings, computer means C25B for reconciling customer holdings (long and short) and computer means C25C for notifying customers and the company.

DTC C21 maintains records that identify all participant holders with long component holdings of ZIPS$^{SM}$, SPECS$^{SM}$ and DIVS$^{SM}$. DTC C21 utilizes computer means C21A for identifying participants with long component holdings.

ASPC C24, owner of the primary computer, utilizes computer means C24A for CUSIP correlation which is necessary to properly apportion component-holder voting rights. ASPC requests from DTC via computer means C21A information that identifies participant holders of record of long positions for specified components pertinent to a shareholder vote.

ASPC C24, the owner of the primary computer, has computer means for performing four basic tasks in order to establish the voting rights for eligible component-holders:

1. CUSIP correlation computer means C24A for correlating the equity at issue to the corresponding created components: SPECS$^{SM}$, ZIPS$^{SM}$ and DIVS$^{SM}$;
2. Vote calculation computer means C24B for calculating the proper voting rights for each of these components;
3. Vote apportioning computer means C24C for apportioning the correct number of votes to each DTC participant (as identified by DTC) for each component;
4. Computer means C24D notifies all DTC participant members maintaining component positions of their voting rights.

The DTC participant firm C25, upon receipt of the voting information utilizes a similar computer system to that of ASPC to further apportion the net long and net short vote among its customers as previously described. Ultimately proxies are forwarded to all eligible holders C26 identifying the customer's voting rights.

The customer C26 votes and returns a proxy C26A to the company C27. The company C27 utilizes computer means C27A for tallying and reconciling all votes submitted, and as indicated by box C27B, takes the appropriate action directed in the proxy at its shareholder meeting.

Referring now to FIG. 27 of the drawings, a company computer (designated in FIG. 27 by its central processing unit CPU) C3 or public channels C2 enters relevant information concerning a stockholder vote into the ASPC computer C1. This information indicates that company C3 wishes to solicit votes from its stockholders.

On the stock of record date the ASPC computer C1 initiates a request for data from the DTC computer C4 in order to identify member firms holding positions of any components. On the stock of record date the ASPC computer C1 also initiates a request for data from the market pricing service computer C6 over a communication link C7. This will be more fully explained in connection with FIG. 28.

The ASPC computer C1 then calculates the pro rata voting right applicable to each of the components (as more fully explained in connection with FIG. 29). In order to accomplish this the ASPC computer receives market pricing data from an external market pricing service computer C6 by means of an electronic medium communicated through a communication link C7.

The ASPC computer next apportions votes among the holders of record identified by DTC (as will be described in more detail in connection with FIG. 30) and notifies all such DTC participants C9$_n$ of their votes via communication links C10$_n$. While only one DTC participant C9$_n$ and one communication link from the DTC computer is represented in FIG. 27, it will be understood that a plurality of firms are in data communication with the ASPC computer C1. The total number of partial interests and corresponding votes among the DTC participants is then communicated over a link C14 to the company computer C3 as will be more fully explained in connection with FIG. 31.

The DTC participant members' computer C9$_n$ additionally receives data directly from DTC's computer C4 via communication link C11, to account properly for all its customers' holdings, including the ASPC-created components, and to apportion voting rights correctly among its customers for the specific vote solicitation, as will be explained more fully in connection with FIG. 32. Individual customers $C12_n$ are sent proxies by established means $C13_n$ and the total number of proxies (votes) distributed is reported to the company computer C3 as required over link C14.

Referring now to FIG. 28, the ASPC CUSIP correlation computer will be described with reference to the flow chart. The ASPC computer includes a computer portion CA100 for receiving an announcement of a shareholder vote to be taken by a company.

The ASPC computer includes means for manually entering pertinent data CA110 concerning the vote to initiate operation of the system. This data includes the equity CUSIP number, the record date and the due date.

A CUSIP file or memory storage means, for example a computer disk, CA121 is loaded into a computer portion CA120 for loading CUSIP component correlation data. This is done in order to match the equity with its multiple ZIPS$^{SM}$, SPECS$^{SM}$ and DIVS$^{SM}$ for each of the Annual and/or Termination Claim (TC$^{SM}$) Series (there being at least one series anticipated per year of maturity). The CUSIP correlation file contains a unique CUSIP number for every series component created by ASPC.

The ASPC computer comprises a portion CA130 for expanding the equity CUSIP to all component CUSIPs. The computer portion matches the equity CUSIP with the component CUSIP numbers. These have been denoted $Z_1$, $S_1$ and $D_1$, respectively, for the ZIPS$^{SM}$, SPECS$^{SM}$ and DIVS$^{SM}$ of year$_1$, respectively, and continuing through year$_n$.

The ASPC computer includes a portion CA140 for inquiring "are all components processed?" The portion CA140 has a "no" output which is connected back to the input of portion CA130 for repeating the matching of the equity CUSIP with the component CUSIP numbers until all the related component CUSIP numbers have been found for the requested equity CUSIP.

The "yes" output of the computer portion CA140 is coupled to a "request member firm net positions by component" computer portion CA150 which requests from DTC the identification of all DTC participant members holding any positions of any of the above mentioned component CUSIP numbers. ASPC notifies the company of the number of votes due to components from each DTC participant firm. The company confirms receipt of same. Much of this information may already be available to the company from DTC.

The DTC computer portion CA170 receives the request and returns confirmation of the requested identification to ASPC computer portion CA150. A "requests=confirms?" computer portion CA180 insures that the data requested is consistent with the data confirmed. If not, computer portion CA181 is means for manually reconciling any discrepancy and the DTC computer portions repeat their operation until the data requested is consistent with that which has been confirmed.

The "yes" output of the computer portion CA180 is connected to the ASPC vote calculation computer portion represented in FIG. 29. Referring now to FIG. 29, the vote calculation computer portion includes a "load market price data" computer portion CB100 for loading the market price data supplied from a service CB101 into the system to begin the vote calculation. The pricing preferably is the closing market price as of the close on the stock of record date on any exchange where traded, or as determined by specific contract agreements.

The computer portion CB100 is coupled to a "CUSIP= EQ, $Z_n$, $S_n$, $D_n$?" computer portion CB110. Computer portion CB110 determines that only CUSIP numbers with any claim to a voting right are considered (denoted as EQ, $Z_n$, $S_n$ and $D_n$ for the equity, ZIPS$^{SM}$, SPECS$^{SM}$ and DIVS$^{SM}$ for all series, respectively). All other CUSIP numbers are ignored, as indicated by the "no" output to CB111 "ignore" computer portion from portion CB110.

A "is price greater than 0?" computer portion CB120 determines if a market price exists for a CUSIP (that is, its price is greater than zero dollars). The "yes" output of computer portion CB120 is coupled for storage to the component price history file computer portion CB121 which may be, for example, a computer storage disk.

The "no" output of the computer portion CB120 is coupled to a $$\text{"calculate: price} = \frac{\text{bid} + \text{asked}}{2} \text{"}$$

computer portion CB130. If any equity or component is not traded on a given day (that is, its price is either absent or zero), computer portion CB130 calculates its value based on specific contract agreements. This computed value is stored in the component price history file CB121.

The output of computer portion CB130 is coupled to a "separate components by series (years)" computer portion CB140. In order to establish component voting rights, computer portion CB140 groups all components by series (that is, by Termination Date (TDSM) and/or Termination Claim (TC$^{SM}$) in which they mature).

The outputs of computer portions CB140 are coupled by year, that is, YR$_1$, YR$_2$ ... YR$_n$ to computer portion CB150 "calculate factors for equity (EQ) & all series components: SPECS$^{SM}$ (S), ZIPS$^{SM}$ (Z), DIVS$^{SM}$ (D)". Within each series, the computer portion CB150 segregates the individual components so that unique component factors can be calculated for each. A "factor EQ=1.0" computer portion CB160 sets the component factor for the equity at 1.0.

$$\text{A "factor } S_n = \frac{\text{market price } S_n}{\Sigma \text{ market prices } (S_n + Z_n + D_n)} \text{" computer}$$

portion CB170 determines the component factor for the SPECS$^{SM}$, for the year$_n$ by dividing the market price of the SPEC$^{SM}_n$ by the sum of the market prices for each of the ZIPS$^{SM}$, SPEC$^{SM}$ and DIVS$^{SM}$ for the same year$_n$.

$$\text{A "factor } Z_n = \frac{\text{market price } Z_n}{\Sigma \text{ market prices } (S_n + Z_n + D_n)} \text{" computer}$$

portion CB180 determines the component factor for the ZIPS$^{SM}$ for the year$_n$ by dividing the market price of the ZIPS$^{SM}_n$ by the sum of the market prices for each of the ZIPS$^{SM}$, SPECS$^{SM}$ and DIVS$^{SM}$ for the same year$_n$.

$$\text{A "factor } D_n = \frac{\text{market price } D_n}{\Sigma \text{ market prices } (S_n + Z_n + D_n)} \text{" computer}$$

portion CB190 determines the component factor for the DIVS$^{SM}$ for the year$_n$ by dividing the market price of the DIVS$^{SM}_n$ by the sum of the market prices for each of the ZIPS$^{SM}$, SPECS$^{SM}$ and DIVS$^{SM}$ for the same year$_n$.

A "store component factors" computer portion CB200 then stores the component factors in a factor history file CB201, which may be a computer disk.

The computer portion CB200 is also coupled to an "all CUSIPS processed?" computer portion CB210, having a "no" output coupled to the input of the CB140 computer portion for continuing the operation of the computer until all CUSIPS eligible for voting rights have been calculated and stored.

The "yes" output of the computer portion CB210 is coupled to a print report computer portion CB220 for printing a component factor report CB221, to allow inspection of the data.

As a system control check, a computer portion "$\Sigma(S_n + Z_n + D_n) = 1.0$?" computer portion CB230 has a "no" output coupled to a "reconcile factors" computer portion CB231, which is coupled to the input of computer portion CB140. The factors are manually reconciled in computer portion CB231, adjustments are made and the computer operation is repeated until the sum equals 1.0. The computer cannot continue its operation until this condition is met.

The "yes" output of the computer portion C230 is coupled to the vote apportioning computer portion of ASPC, represented in FIG. 30.

Referring now to FIG. 30, a "load participants position data" computer portion CC100 is coupled to the DTC computer CC101 for loading the net DTC member firm positions into the system. ASPC receives position data by component via communication means from the company CC102. A "print report" computer portion CC110 prints a report which may be entitled "DTC participant position report" (CC111) to allow for inspection of the data. A "$\Sigma \text{position}_{DTC} = \Sigma \text{position}_{CO}$?" computer portion CC120 is provided for checking whether the sum of the long positions for all participants equals the sum of the created positions recorded at the corporation (CO.). If not, the "no" output of computer portion CC120 is coupled to a "reconcile positions" computer portion CC121 for manually investigating and making adjustments which is then coupled to the input of the computer portion CC100. The system check is repeated until the two sums are equal. The computer cannot continue its operation until this condition is met.

The factor history file CC131 is the same factor history file as factor history file CB201 for storing the component factors. The factor history file CC131 is coupled to a "load component factor data" computer portion CC130 to which the "yes" output of computer portion CC120 is applied. An "assign component factors to all participant member firm positions ($F_n$)" computer portion CC140 is coupled to the output of the computer portion CC130 for assigning component factors to all participant positions beginning by reading the data for the first DTC participant member firm ($F_1$).

A computer portion "for all series component positions" computer portion CC150 matches each participant member firm's position against the corresponding component factors for that participant's position (denoted as $Z_n$, $S_n$ and $D_n$ for the ZIPS$^{SM}$, SPECS$^{SM}$ and DIVS$^{SM}$ for all series, respectively). An "is component position=0?" computer portion CC160 determines whether the firm has a position in each individual component. The "no" output, meaning that the firm has a position, is coupled to a "vote=firm position x component factor" computer portion CC170. The "Store votes by position by firm" computer portion CC180 stores the votes due to each component position in the "firms vote file" CC181 which may be a computer disk. The processing continues with the next series component in CC150.

The "yes" output of CC160 is coupled to an "All Components Tested?" computer portion CC190. The "no" output is coupled to CC150 to continue with the next series component. The "yes" output is coupled to an "All Firms Tested?" computer portion CC195. The "no" output from computer portion CC195 is coupled to the input of computer portion CC140 to continue the previously described operations until the computer has operated for all remaining DTC participant member firms ($F_2$ through $F_n$).

The "yes" output of computer portion CC195 is coupled to a "print report" computer portion CC200 which prints a report entitled "participant firm vote report" as indicated by block CC201. The output of computer portion CC200 is coupled to computer portion CC210 "$\Sigma \text{vote}_F = \Sigma \text{votes}_{CO}$?" for determining as a system control check whether the sum of the votes for all participant firms (F) for all long components equals the sum of votes indicated by the company (CO.). If not, the "no" output of computer portion CC210 is coupled to a computer portion CC211 wherein the votes are manually reconciled, adjustments made and the computer operation repeated. The computer operation cannot go forward until this condition is met.

Referring to FIG. 31 of the drawings, the DTC participant member firm's vote file CD101, which may be a storage disk, is reloaded into the ASPC computer system at a "load data" computer portion CD100. A "transmit position and vote data to company and firms" computer portion CD110 transmits by telecommunications the position and vote data and component factor to the company as well as to each member firm maintaining any component position, as indicated by blocks CD120 and CD130.

The participant member firm's (CD120) computer receives the data and returns confirmation of such to ASPC. This data should be in complete agreement with daily positions as reported by DTC and confirmed with the participant. As indicated by block CD130, the company computer similarly receives the position and vote data and confirms such to the ASPC computer.

A "print report" computer portion CD140 prints a report entitled "the participant firm confirmation report" CD141 to allow for inspection of the data. A "transmits equal confirms?" computer portion CD150 has a "no" output coupled to a "reconcile positions with firm" computer portion CD151 for reconciling the discrepancy if the data transmitted does not agree with the confirmation for the participant firm. The computer repeats this operation until the two positions agree. The "yes" output of computer portion CD150 completes the ASPC computer data processing. At this point the standard proxy solicitation process becomes operative at the participant member firms.

Referring now to FIG. 32, the DTC participant member firm computer comprises a "receive data, confirm transmission" computer portion CV100 which responds to the component factors and vote position transmitted by ASPC and sends the confirmation of such to ASPC. The participant member firm also receives and reconciles position data from DTC CV102. An "identify customer holdings as of record date by component" computer portion CV110 accesses the customer account master file CV111, which may be a computer storage disk, in order to identify customers holding any of the relevant components (as identified by their CUSIP numbers) as of the assigned record date.

A "determine voting rights for all customers (C)" computer portion CV120 searches each customer file (denoted $C_1$ through $C_n$) to identify component holders.

A "all series components" computer portion CV130 considers only CUSIP numbers with any claim to a voting right (denoted as $Z_n$, $S_n$ and $D_n$) for the ZIPS$^{SM}$, SPECS$^{SM}$ and DIVS$^{SM}$ for all series, respectively. As an eligible component is found, computer portion "vote right=customer position times ASPC component factor" computer portion CV140 establishes the customer's voting right by multiplying the position by the ASPC component factor.

A "store data" computer portion CV150 stores each such position in the participant member firm's customer vote file (CV151), which may be a computer disk.

An "all components processed?" computer portion CV155 has a "no" output connected to the input of computer portion CV130 to repeat the computer operations until all components have been processed for a customer. The "yes" output of computer portion CV155 is coupled to a "calculate net votes for each customer" computer portion CV170 which tabulates the net number of votes assignable to each customer. The output from CV170 is coupled to a "calculate and store firm total" computer portion CV190. The computer portion CV190 calculates and stores the total eligible votes for each customer and the firm total. This output is applied to a customer vote file CV191, which may be a computer disk.

A "print report" computer portion CV200 prints a customer vote rights report CV201, to allow for inspection of the data.

The output of CV190 is coupled through CV200 to a "Σvotes,=net votes ASPC?" which as a system control check determines whether the sum of the eligible customer votes equals the net votes assigned by ASPC. If not, any discrepancies are applied to computer portion CV211 "reconcile votes with ASPC" where any discrepancies are manually reconciled by the participant firm, adjustments are made and the computer operation repeats until the amounts are equal. The computer operation cannot go forward until this condition is met.

The "yes" output of the computer portion CV210 is applied to a "notify company and customers" computer portion CV220, for advising the company of each participant's component holders and their component voting rights, as indicated by CV221. Proxies are then sent to individual customers, as indicated by CV222.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A data processing system for processing the voting of partial stock equity interests comprising:
    (a) first computer means for calculating and storing component factors for equity component interests and vote component factors corresponding to each of said component factors, wherein each said vote component factor is indicative of the right to receive a partial vote attributed to each of said equity component interests, and including means for generating data indicative of a broker's component positions;
    (b) said first computer means generating data for a broker's computer means showing a component factor for each of said equity component interests and a number of votes allocated to the broker's position in each of said component interests;
    (c) a broker's computer means being responsive to said first computer means for identifying customer holdings of equity component interests;
    (d) a communications link between said first computer means and said broker's computer means for transmitting said data generated by said first computer means to said broker's computer means;
    (e) a company's computer means being responsive to said first computer means for identifying equity component interests and votes by broker and to said broker's computer means for receiving and identifying customer votes;
    (f) a communications link between said first computer means and said company's computer means for transmitting data generated by said first computer means to said company's computer means;
    (g) said broker's computer means allocating votes to said customers based on said component factors for equity component interests;
    (h) said broker's computer means generating a proxy having indicia including votes due to equity including equity components of each customer.

2. A data processing system for processing the voting of partial stock equity interests, comprising:
    (a) first computer means for calculating and storing equity component factors for equity component interests and vote component factors corresponding to each of said component factors, wherein each said vote component factor is indicative of the right to receive a partial vote attributed to each of said equity component interests, and including a company's computer means, responsive to an equity clearing corporation's computer means, for identifying equity component interests by broker;
    (b) said first computer means generating data for a broker's computer means showing a component factor for each of said equity component interests and a number of votes allocated to the broker's position in each of said equity component interests;
    (c) a broker's computer means responsive to said first computer means for identifying customer holdings of equity component interests;
    (d) a communications link between said first computer means and said broker's computer means for transmitting said data generated by said first computer means to said broker's computer means;
    (e) said company's computer means being responsive to said broker's computer means for receiving and identifying customer votes;
    (f) said broker's computer means allocating votes to said customers based on said component factors for equity component interests;
    (g) said broker's computer means generating a proxy having indicia including votes due to equity including equity components of each customer.

3. A data processing system for processing the voting of partial stock interests via equity components, comprising:
    (a) control computer means for calculating and storing component factors for equity component interests and vote component factors corresponding to each of said component factors, wherein each said vote component factor is indicative of the right to receive a partial vote attributed to each of said equity component interests, and including means for requesting data indicative of a broker's component positions;
    (b) an equity clearing corporation's computer means for generating for said control computer means data showing a broker's position in each of said equity component interests and including means for transmitting data indicative of the broker's position in each of said equity component interests;
    (c) a communications link between said control computer means and said equity clearing corporation's computer means for transmitting said requested data to said control computer means;
    (d) said control computer means generating data for a broker's computer means showing a component factor for each of said equity component interests and a number of votes allocated to the broker's position in each of said equity component interests;

(e) a broker's computer means, being responsive to said control computer means, for identifying customer holdings of equity component interests;

(f) a communications link between said control computer means and said broker's computer means for transmitting said data generated by said control computer means to said broker's computer means;

(g) a company's computer means being responsive to said control computer means for identifying equity component interests and votes by broker and to said broker's computer means for receiving and identifying customer votes;

(h) a communications link between said control computer means and said company's computer means for transmitting data generated by said control computer means to said company's computer means;

(i) said broker's computer means allocating votes to said customers based on said component factors for equity component interests;

(j) said broker's computer means generating a proxy having indicia including votes due to equity including equity components of each customer.

4. A data processing system for processing the voting of partial stock interests via equity components, comprising:

(a) control computer means for calculating and storing component factors for equity component interests and vote component factors corresponding to each of said component factors, wherein each said vote component factor is indicative of the right to receive a partial vote attributed to each of said equity component interests;

(b) an equity clearing corporation's computer means responsive to said control computer means for generating for said control computer means data showing a broker's position in each of said equity component interests;

(c) a communications link between said control computer means and said equity clearing corporation's computer means for transmitting data indicative of the broker's component position to said control computer means;

(d) said control computer means generating data for a broker's computer means showing a component factor for each of said equity component interests and a number of votes allocated to the broker's position in each of said equity component interests;

(e) a broker's computer means, being responsive to said control computer means, for identifying customer holdings of equity component interests;

(f) a communications link between said control computer means and said broker's computer means for transmitting data generated by said control computer means to said broker's computer means;

(g) a company's computer means being responsive to said control computer means for identifying equity component interests and votes by broker and to said broker's computer means for receiving and identifying customer votes;

(h) a communications link between said control computer means and said company's computer means for transmitting data generated by said control computer means to said company's computer means;

(i) said broker's computer means allocating votes to customers based on said component factors for equity components;

(j) said broker's computer means generating a proxy having indicia including votes due to equity including equity components of each customer;

(k) said broker's computer means generating a proxy having indicia including votes due to equity including equity components of each customer.

5. A data processing system for processing the voting of partial stock interests via equity components, comprising:

(a) control computer means for calculating and storing equity component factors and vote component factors corresponding to each of said equity factors wherein each said vote component factor is indicative of the right to receive a partial vote attributed to each of said equity component factors, wherein said equity component factors are at least two of:

(i) a component interest indicative of the right to receive a partial share of stock equal in value to a stipulated price or a full share of stock of the company on a predetermined future date, whichever is the lesser value;

(ii) a component interest indicative of the right to receive a partial share of stock equal in value to the appreciation, if any, of the share of stock above the stipulated price on the predetermined date;

(iii) a component interest indicative of the right to receive substitute payments equal in amount to dividends declared with respect to a given date which is prior to the predetermined future date and which goes to zero value at the predetermined future date;

(b) an equity clearing corporation's computer means responsive to said control computer means for generating for said control computer means data showing a broker's position in each of said equity component interests;

(c) a communications link between said control computer means and said equity clearing corporation's computer means for transmitting data indicative of the broker's component position to said control computer means;

(d) said control computer means generating data for a broker's computer means showing a component factor for each of said equity component interests and a number of votes allocated to the broker's position in each of said equity component interests;

(e) a broker's computer means, being responsive to said control computer means, for identifying customer holdings of equity component interests;

(f) a communications link between said control computer means and said broker's computer means for transmitting data generated by said control computer means to said broker's computer means;

(g) a company's computer means being responsive to said control computer means for identifying equity component interests and votes by broker and to said broker's computer means for receiving and identifying customer votes;

(h) a communications link between said control computer means and said company's computer means for transmitting data generated by said control computer means to said company's computer means;

(i) said broker's computer means allocating votes to customers based on said component factors for equity components;

(j) said broker's computer means generating a proxy having indicia including votes due to equity including equity components of each customer.

6. A system in accordance with claim 5 in which said control computer means comprises means for calculating and storing said component factors for equity components as of a record date for each of said component interests (i), (ii) and (iii).

7. A data process system for processing the voting of partial stock interests via equity components comprising:

(a) control computer means for calculating and storing component factors for equity component interests and vote component factors corresponding to each of said equity factors, wherein each said vote component factor is indicative of the right to receive a partial vote attributed equity component interest, wherein said equity component interests;

(b) an equity clearing corporation's computer means with associated first communication means;

(c) second communication means associated with said control computer means for establishing a communications link to said first communications means associated with said equity clearing corporation's computer means to request data showing a broker's position in each of said component interests;

(d) said equity clearing corporation's computer means generating said broker's position data;

(e) said first communications means associated with said equity clearing corporation's computer means establishing a communications link to said control computer means and said second communication means associated therewith, and said first communication means delivering to said control computer means said broker's position data;

(f) said communication means associated with said control computer means acknowledging receipt of said broker position report;

(g) said control computer means generating data for a broker showing a component factor for each of said equity component interests and a number of votes allocated to said broker's position in each of said equity component interests;

(h) a broker's computer means and communication means associated therewith;

(i) said communication means associated with said control computer establishing a communications link to said broker's communication means to transmit said broker's vote allocation data to said broker's computer, and said broker's computer means and associated communication means acknowledging receipt of said transmission;

(j) said control computer means and communication means associated therewith;

(k) a company's computer means and communication means associated therewith;

(l) said control computer means and associated communication means transmitting data representing said component interests and votes by broker to said company's computer means and said communication means associated therewith;

(m) said company's communication means acknowledging receipt of said equity component interests and votes by broker data;

(n) said broker's computer means generating vote allocation data for customers based on said equity component factors.

(o) said broker's computer means generating a proxy having indicia including votes due to equity including equity components of each customer.

8. A system in accordance with claim 7 in which said communication means are telecommunication means.

* * * * *